(12) United States Patent
Sugimoto et al.

(10) Patent No.: US 7,973,994 B2
(45) Date of Patent: Jul. 5, 2011

(54) SPATIAL LIGHT MODULATOR

(75) Inventors: Naoya Sugimoto, Hino (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 266 days.

(21) Appl. No.: 12/291,921

(22) Filed: Nov. 13, 2008

(65) Prior Publication Data
US 2009/0080059 A1 Mar. 26, 2009

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/003,374, filed on Nov. 16, 2007.

(51) Int. Cl.
*G02B 26/00* (2006.01)
*G02F 1/00* (2006.01)

(52) U.S. Cl. .................................. 359/237; 359/290

(58) Field of Classification Search .......... 359/290–292, 359/298, 237; 345/30–32, 40
See application file for complete search history.

(56) References Cited

U.S. PATENT DOCUMENTS

| | | | |
|---|---|---|---|
| 4,229,732 A | 10/1980 | Hartstein et al. | |
| 4,571,603 A | 2/1986 | Hornbeck et al. | |
| 4,969,730 A | 11/1990 | van den Brandt | |
| 5,061,049 A | 10/1991 | Hornbeck | |
| 5,096,279 A | 3/1992 | Hornbeck et al. | |
| 5,214,420 A | 5/1993 | Thompson et al. | |
| 5,285,407 A | 2/1994 | Gale et al. | |
| 5,452,024 A | 9/1995 | Sampsell | |
| 5,612,713 A | 3/1997 | Bhuva et al. | |
| 5,673,139 A | 9/1997 | Johnson | |
| 5,682,174 A * | 10/1997 | Chiu | ............................. 345/84 |
| 5,686,939 A | 11/1997 | Millward et al. | |
| 5,903,383 A | 5/1999 | Bernstein et al. | |
| 6,128,121 A | 10/2000 | Choi et al. | |
| 6,140,983 A | 10/2000 | Quanrud | |
| 6,388,661 B1 | 5/2002 | Richards | |
| 6,538,800 B2 | 3/2003 | Huibers | |
| 6,552,840 B2 | 4/2003 | Knipe | |
| 6,556,739 B1 | 4/2003 | Kruglick | |

(Continued)

*Primary Examiner* — Ricky L. Mack
*Assistant Examiner* — Brandi N Thomas
(74) *Attorney, Agent, or Firm* — Bo-In Lin

(57) ABSTRACT

The present invention provides a spatial light modulator, comprising: a plurality of pixel units configured as a pixel array wherein each of the pixel units further comprises a memory circuit. The spatial light modulator further includes a bit line for transmitting a data signal to the memory circuit. The spatial light modulator further includes a word line for selecting and writing the data signal to the selected memory circuit. The spatial light modulator further includes a plate line for controlling the memory; and an address decoder for selecting the plate line, wherein the address decoder comprises an address judgment unit constituted by a plurality of first judgment units and further includes a second judgment unit for changing an output from the second judgment unit depending on a result generated by the first judgment unit.

7 Claims, 59 Drawing Sheets

U.S. PATENT DOCUMENTS

| | | |
|---|---|---|
| 6,571,029 B1 | 5/2003 | Kruglick et al. |
| 6,756,976 B2 * | 6/2004 | Richards .................. 345/204 |
| 6,778,304 B1 | 8/2004 | Muller |
| 6,809,977 B1 | 10/2004 | Richards |
| 6,856,447 B2 | 2/2005 | Richards et al. |
| 6,888,521 B1 | 5/2005 | Richards |
| 6,999,224 B2 | 2/2006 | Huibers |
| 7,012,592 B2 | 3/2006 | Richards |
| 7,019,884 B2 | 3/2006 | Kirch et al. |
| 7,022,249 B2 | 4/2006 | Valette |
| 7,027,205 B2 | 4/2006 | Richards |
| 7,106,316 B2 | 9/2006 | Tanaka |
| 7,239,564 B2 | 7/2007 | Mutaguchi |
| 7,304,782 B2 | 12/2007 | Kimura et al. |
| 2002/0067417 A1 | 6/2002 | Tan et al. |
| 2003/0011863 A1 | 1/2003 | Muller |
| 2006/0066931 A1 | 3/2006 | Ogikubo et al. |
| 2006/0098216 A1 | 5/2006 | Sugimoto |
| 2006/0279496 A1 | 12/2006 | Ogikubo et al. |
| 2007/0007849 A1 | 1/2007 | Ogikubo et al. |
| 2007/0041078 A1 | 2/2007 | Pan |
| 2007/0126759 A1 | 6/2007 | Hwang |
| 2007/0258124 A1 | 11/2007 | Chen et al. |
| 2007/0258130 A1 | 11/2007 | Chen et al. |
| 2007/0258312 A1 | 11/2007 | Richards |

* cited by examiner

FIG. 3 Transistor array

FIG. 4 Mirror Cell structure

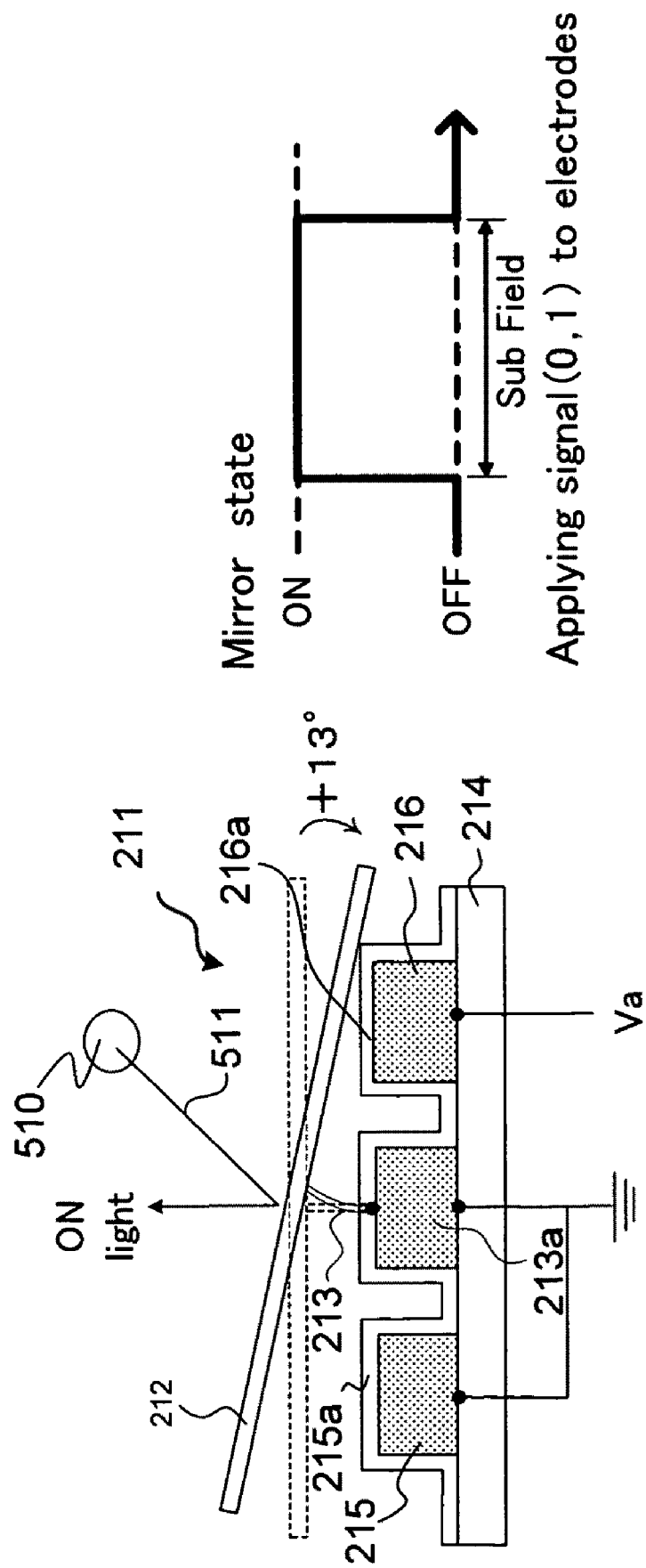

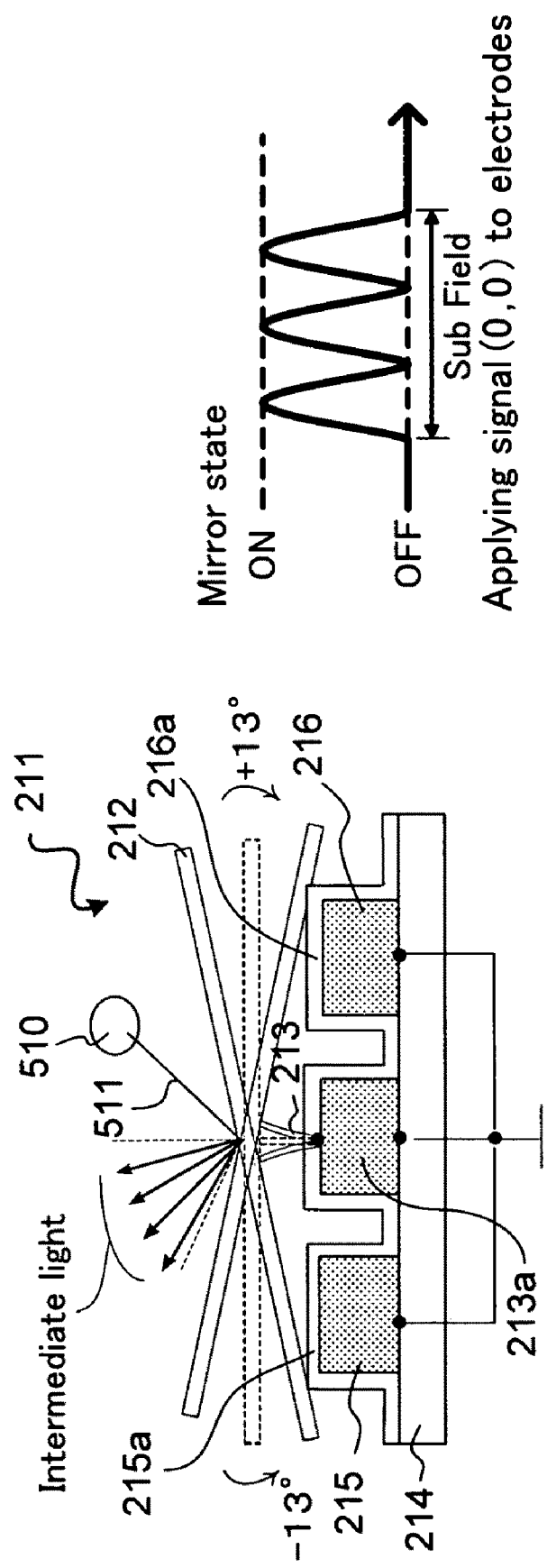

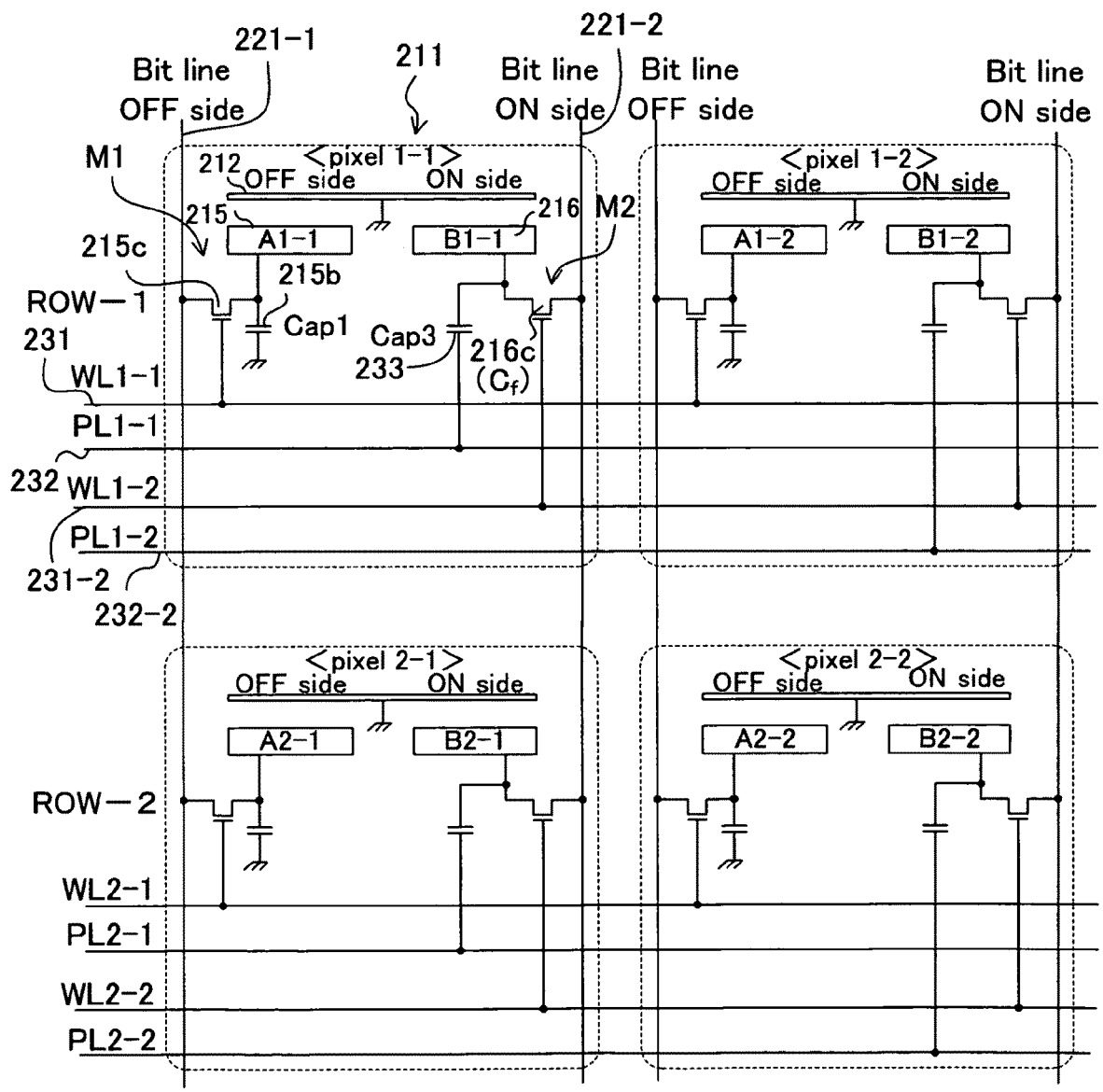
Fig. 10E  Mirror Cell structure

| Intermediate | latch out | Bitline OFF side | Bitline ON side |
|---|---|---|---|
| 1 (SW ON) | 1 | 0 | 1 |
| 1 (SW ON) | 0 | 1 | 0 |
| 0 (SW OFF) | 1 | 0 | 0 |
| 0 (SW OFF) | 0 | 1 | 0 |

SPATIAL LIGHT MODULATOR

CROSS REFERENCE TO RELATED APPLICATIONS

This application is a Non-provisional Application claiming a Priority date of Nov. 16, 2007 based on a previously filed Provisional Application 61/003,374 and a Non-provisional patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are Ser. No. 10/698,620 filed on Nov. 1, 2003 now abandoned, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates generally to systems and methods to configure a projection apparatus comprising a spatial light modulator. More particularly this invention relates to systems and methods for implementing a new and improved spatial light modulator in a projection apparatus to achieve a higher quality of image display.

2. Description of the Related Art

After the dominance of CRT technology in the display industry for over 100 years, Flat Panel Display (FPD) and Projection Display have gained popularity because of their space efficiency and larger screen size. Projection displays using micro-display technology are gaining popularity among consumers because of their high picture quality and lower cost. There are two types of micro-displays used for projection displays in the market. One is micro-LCD (Liquid Crystal Display) and the other is micro-mirror technology. Because a micro-mirror device uses un-polarized light, it produces better brightness than micro-LCD, which uses polarized light.

Although significant advances have been made in technologies of implementing electromechanical micro-mirror devices as spatial light modulators, there are still limitations in their high quality images display. Specifically, when display images are digitally controlled, image quality is adversely due to an, insufficient number of gray scales.

Electromechanical micro-mirror devices have drawn considerable interest because of their application as spatial light modulators (SLMs). A spatial light modulator requires an array of a relatively large number of micro-mirror devices. In general, the number of required devices ranges from 60,000 to several million for each SLM. Referring to FIG. 1A, an image display system 1 including a screen 2 is disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of gray scale lead to a degradation of the display image.

Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states that include a state 1 when is Node A high and Node B low, and a state 2 when Node A is low and Node B is high.

The control circuit positions the micro-mirrors to be at either an ON or an OFF angular orientation, as that shown in FIG. 1A. The brightness, i.e., the number of gray scales of display for a digitally control image system, is determined by the length of time the micro-mirror stays at an ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

Meanwhile, higher levels of resolution and higher grades of gray scales required for better quality display images are in demand for projection apparatuses, especially in recent years due to the increased availability of video images, such as that provided by high definition television (HDTV) broadcasting.

However, in the gray scale control by the pulse width modulation (PWM), as shown in FIG. 1D, the expressible gray scale is limited by the length of the time period determined by the LSB. An attempt to add a new control structure to a memory cell of the above described SRAM structure in order to overcome the aforementioned limitation creates another problem, that is, the structure of a complex memory cell, with a larger number of transistors than, for example, the memory cell of a DRAM structure, increases the size of the mechanism.

That is, in order to obtain a higher definition display image, a large number of mirror elements are required. Each of these mirror elements, comprising an SRAM-structured memory cell, must be reduced in size to fit in the space of a certain mounting size (e.g., a predefined package size or chip size). However, the addition of a new control structure to an SRAM-structured memory cell in order to attain a higher level gray scale display image increases the size of the memory cell, thereby inhibiting a higher level display image.

SUMMARY OF THE INVENTION

The present invention aims at providing a technique for enabling both a higher level of definition and a higher grade of gray scale of a projection image in a projection technique using a spatial light modulator.

A first exemplary embodiment of the present invention provides a spatial light modulator, comprising: a plurality of pixel units configured as a pixel array; each of the pixel units further comprises a memory circuit; a bit line for transmitting a data signal to the memory circuit; a word line for selecting and writing the data signal to the selected memory circuit; a plate line for controlling the memory circuit; and an address decoder for selecting the plate line, wherein the address decoder comprises an address judgment unit further comprising a plurality of first judgment units and a second judgment unit for changing an output from the second judgment unit depending on a result generated by the first judgment unit.

A second exemplary embodiment of the present invention provides the spatial light modulator according to the first aspect; wherein the number of said address judgment units is the same as or more than the number of said plate lines.

A third exemplary embodiment of the present invention provides the spatial light modulator according to the first aspect, wherein the address judgment units further comprise a third judgment unit for changing an output from the third judgment unit depending on a result generated by the second judgment unit.

A fourth exemplary embodiment of the present invention provides a spatial light modulator, comprising: a plurality of pixel units configured as a pixel array; each of the pixel units comprises a memory circuit; a bit line for transmitting a data signal to the memory circuit; a word line for selecting and writing the data signal to the selected memory circuit; and an address decoder for selecting the word line, wherein the address decoder comprises an address judgment unit comprising a plurality of first judgment units and a second judgment unit for changing an output from the second judgment unit depending on a result generated by the first judgment unit.

A fifth exemplary embodiment of the present invention provides the spatial light modulator according to the fourth aspect, wherein the number of said address judgment units is the same as or more than the number of said word lines.

A sixth exemplary embodiment of the present invention provides the spatial light modulator according to the fourth aspect, wherein the address judgment units further comprise a third judgment unit for changing an output from the third judgment unit depending on a result generated by the second judgment unit.

BRIEF DESCRIPTION OF THE DRAWINGS

The present invention is described in detail below with reference to the following Figures.

FIG. 7A is a cross-sectional diagram showing the ON state of a micromirror.

FIG. 7B is a chart showing the quantity of light projected in the ON state of a micromirror.

FIG. 7E is a cross-sectional diagram showing the oscillation state of a micromirror.

FIG. 7F is a chart showing the quantity of light projected in the oscillation state of a micromirror.

FIG. 10E is a conceptual diagram illustrating a possible modification of a pixel array comprised in a display system according to a preferred embodiment of the present invention.

FIG. 12F is a truth table for regulating the operation of the bit line driver unit (Bitline Driver) shown in FIG. 12E.

DESCRIPTION OF THE PREFERRED EMBODIMENTS

The following is a description, in detail, of the preferred embodiment of the present invention with reference to the accompanying drawings.

Figure 2:
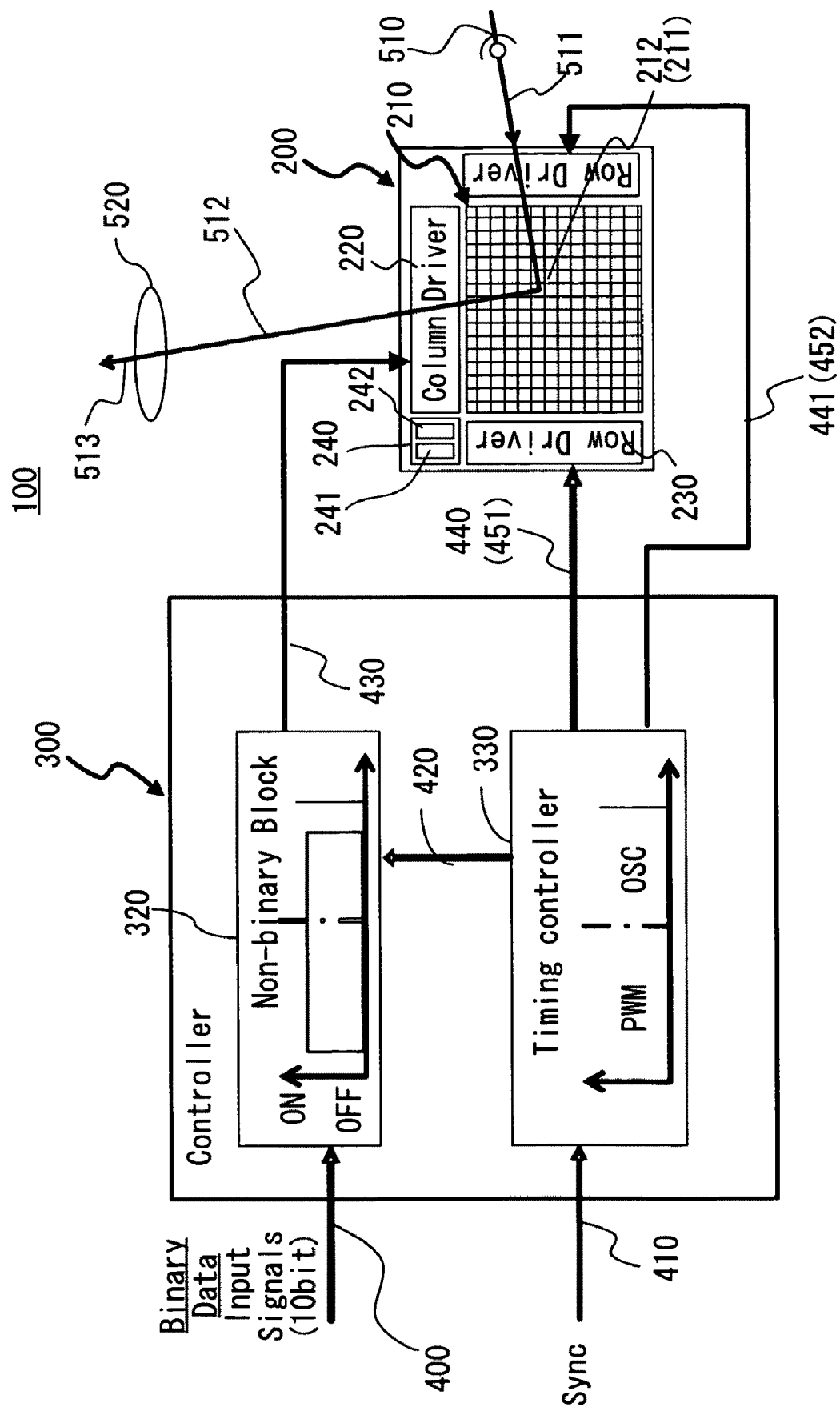
FIG. 2 is a functional block diagram for illustrating the configuration of a display system according to a preferred embodiment of the present invention.
Figure 3:
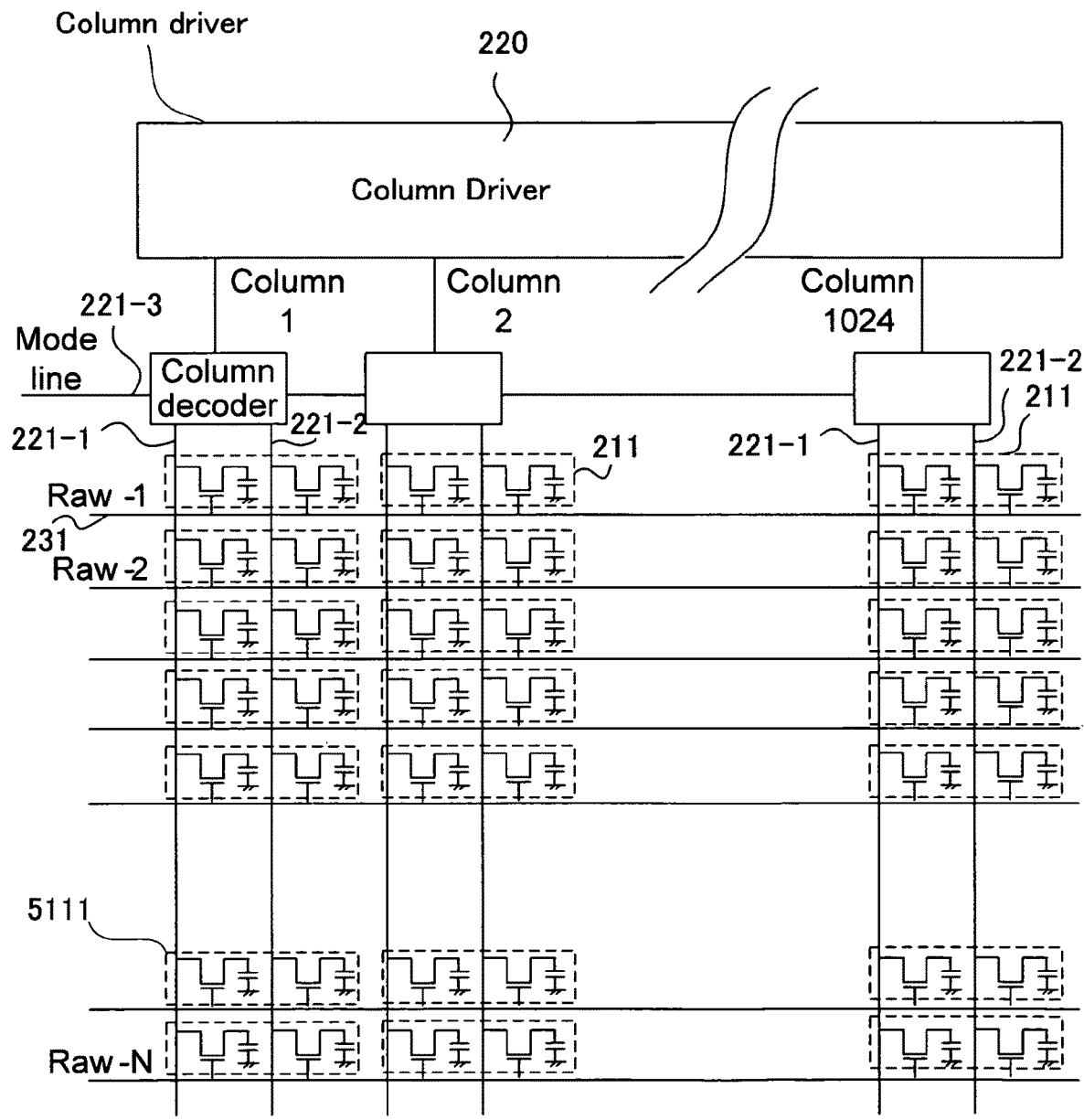
FIG. 3 is a block diagram illustrating the configuration of a spatial light modulator constituting a display system according to a preferred embodiment of the present invention.
Figure 4:
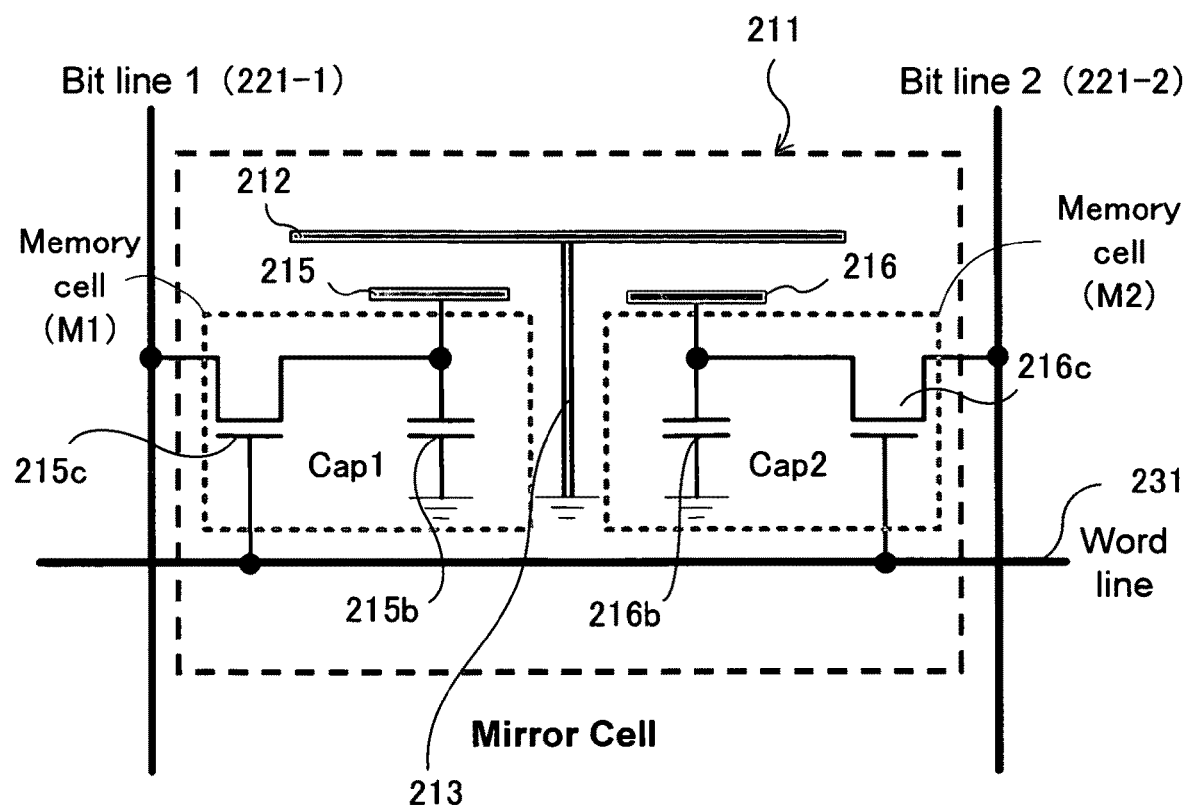
FIG. 4 is a cross-sectional outline diagram of one mirror element on the line II-II of the spatial light modulator shown in FIG. 5.

FIG. 2 is a conceptual diagram for illustrating the configuration of a display system according to a preferred embodiment of the present invention. FIG. 3 is a block diagram illustrating the configuration of a spatial light modulator constituting a display system according to a preferred embodiment of the present invention. FIG. 4 is a cross sectional view showing a schematic diagram for illustrating the configuration of a pixel unit 211 implemented in a spatial light modulator shown according to the present embodiment.

The following description first describes a configuration of a projection apparatus 100 according to the present embodiment, which serves as a premise for the individual embodiments, whose descriptions are also included.

The projection apparatus 100 according to the present embodiment comprises a spatial light modulator 200, a control apparatus 300, a light source 510, and a projection optical system 520.

Figure 5:
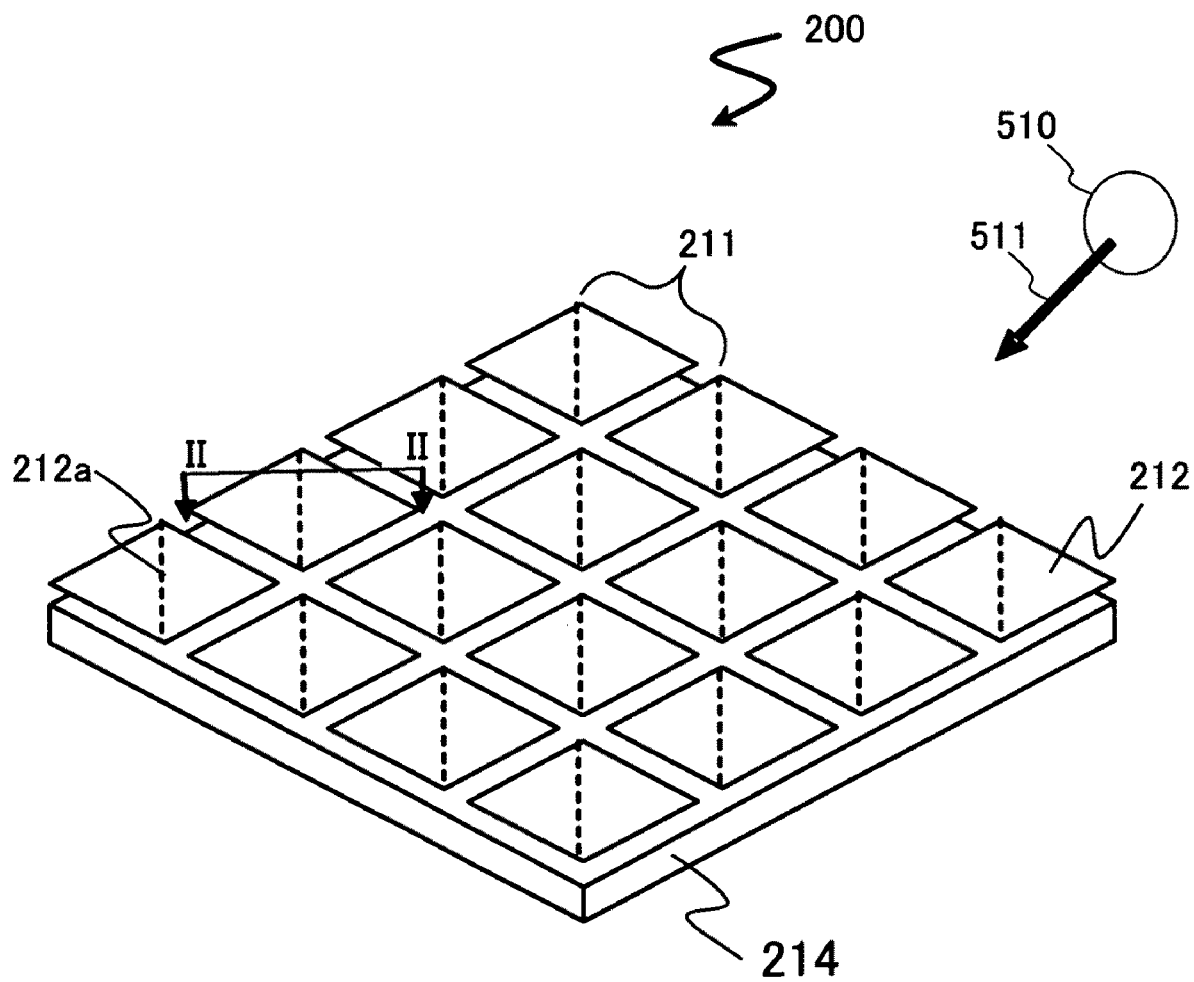
FIG. 5 is a diagonal view diagram showing a part of the configuration of a spatial light modulator constituting a display system according to a preferred embodiment of the present invention.

FIG. 5 is a diagram for showing a perspective view along a diagonal direction of a spatial light modulator in which multiple mirror elements (i.e., pixel units) for modulating the reflecting direction of incident light by deflecting mirrors are formed as a two-dimensional array on a device substrate.

As shown in FIG. 5, the spatial light modulator 200 is configured with the pixel units 211 arranged as a two-dimensional array on a substrate 214. Each pixel unit comprises an address electrode (not shown in the drawing here), an elastic hinge (not shown in the drawing here), and a mirror 212 supported by the elastic hinge. According to the configuration shown in FIG. 5, pixel units 211 having square mirrors 212 arranged in a two-dimensional array on substrate 214. Voltages applied to an address electrode formed on the substrate 214 control the mirror 212 in each pixel unit 211 to move to different deflection angles.

Meanwhile, in consideration of the number of pixels required by a super high definition television, the pitch, i.e., the interval between adjacent mirrors 212, is set between 4 μm and 14 μm, or, preferably, between 5 μm and 10 μm, to achieve the resolution of a full HD TV, e.g., 2048 by 4096, or a non-full TD TV, and of the size of mirror devices. More specifically, the pitch is defined as the distance between the deflection axes of adjacent mirrors 212. In an exemplary embodiment, the area of a mirror 212 may be between 16 μm² and 196 μm², or, preferably, between 25 μm² and 100 μm². Note that the shape mirror 212 or the pitch between the mirrors 212 may be flexibly adjusted according to specific requirements of display resolution.

The drawing also shows a dotted line as a deflection axis 212a of the mirror 212. Specifically, when the light emitted from a light source 510 is a coherent light, the angle of incident to mirror 212 is configured along a orthogonal or diagonal direction relative to deflection axis 212a. The light source 510 emits a coherent light when the light source is implemented as a laser light source.

The following description further explains the control processes and the operation of the pixel unit 211 with reference to the cross-sectional diagram across the line II-II over a pixel unit of the spatial light modulator 200 shown in FIG. 5. Specifically, FIG. 4 is a cross-sectional outline diagram for showing a cross-section of one mirror element of the spatial light modulator on the line II-II in FIG. 5.

As illustrated in FIGS. 3 and 4, a spatial light modulator 200 according to the present embodiment comprises a pixel array 210, a bit line driver part 220, and a word line driver unit 230.

In pixel array 210, multiple pixel units 211 are arrayed on a grid at each of the positions where bit lines 221 extending vertically from the bit line driver part 220 cross word lines 231 extending horizontally from the word line driver unit 230.

As illustrated in FIG. 4, each pixel unit 211 comprises a mirror 212 that freely tilts and is supported on the substrate 214 by a hinge 213.

An OFF electrode 215 and an OFF stopper 215a are placed symmetrically across hinge 213 that comprises a hinge electrode 213a on the substrate 214, and likewise an ON electrode 216 and an ON stopper 216a are placed thereon.

A predetermined voltage applied to the OFF electrode 215 draws mirror 212 with a Coulomb force to tilt to an angular position abutting the OFF stopper 215a. The mirror 212 thus reflects the incident light 511 to the light path along an OFF direction away from the optical axis of a projection optical system 130.

A predetermined voltage applied to the ON electrode 216 draws the mirror 212 with a Coulomb force to tilt to an angular position abutting the ON stopper 216a. The mirror 212 reflects the incident light 311 to the light path along an ON direction coincident with the optical axis of the projection optical system 130.

FIG. 4 shows an OFF capacitor 215b is connected to the OFF electrode 215 and to the bit line 221-1 by way of a gate transistor 215c that is implemented as a field effect transistor (FET). An ON capacitor 216b is connected to the ON electrode 216, and to the bit line 221-2 by way of a gate transistor 216c that is implemented as a field effect transistor (FET).

The signal on the wordline 231 controls the turning ON and OFF of the gate transistor 215c.

Specifically, a select signal on a word line 231 simultaneously selects all the pixel units 211 connected to the horizontal word line 231. The signals on the bitlines 221-1 and 221-2 control the charging and discharging of the OFF capacitor 215b and ON capacitor 216b. Therefore, the micromirror 212 in each pixel unit 211 along a horizontal row is controlled to turn ON and OFF.

A memory cell M1 configured with a DRAM structure includes an OFF capacitor 215b and gate transistor 215c on the side of the OFF electrode 215. Likewise, the memory cell M2 also configured with a DRAM structure includes an ON capacitor 216b and gate transistor 216c on the side of the ON electrode 216. With this configuration, the tilting operation of the mirror 212 is controlled in accordance with the presence and absence data written to the respective memory cells of the OFF electrode 215 and ON electrode 216.

The light source 510 emits an incident light 511 to illuminate the spatial light modulator 200. The individual micromirrors 212 then reflects the incident light 511 as the reflection light 512. Reflection light 512 on the light path passes through a projection optical system 520 and is projected onto a screen (not shown in a drawing herein) or the like, as projection light 513.

The descriptions below explain the operation of a control apparatus 300 according to the present embodiment. The control apparatus controls the spatial light modulator 200 to operate in the ON/OFF states (i.e., an ON/OFF modulation) and oscillation state (i.e., an oscillation modulation) of mirror 212 of the spatial light modulator 200 to achieve a higher level of gray scales by operating with an intermediate gray scale.

A non-binary block 320 generates non-binary data 430 used for controlling mirror 212 by converting, into non-binary data, a binary video image signal 400 that is externally input binary data. In this event, the LSB is different for the period of ON/OFF states of the mirror 212 and the period of intermediate oscillation state.

A timing control unit 330 generates a drive timing 420 for the non-binary block 320, a PWM drive timing 440, and an OSC drive timing 441 for the mirror 212 on the basis of an input synchronous signal 410 (Sync).

Figure 6:
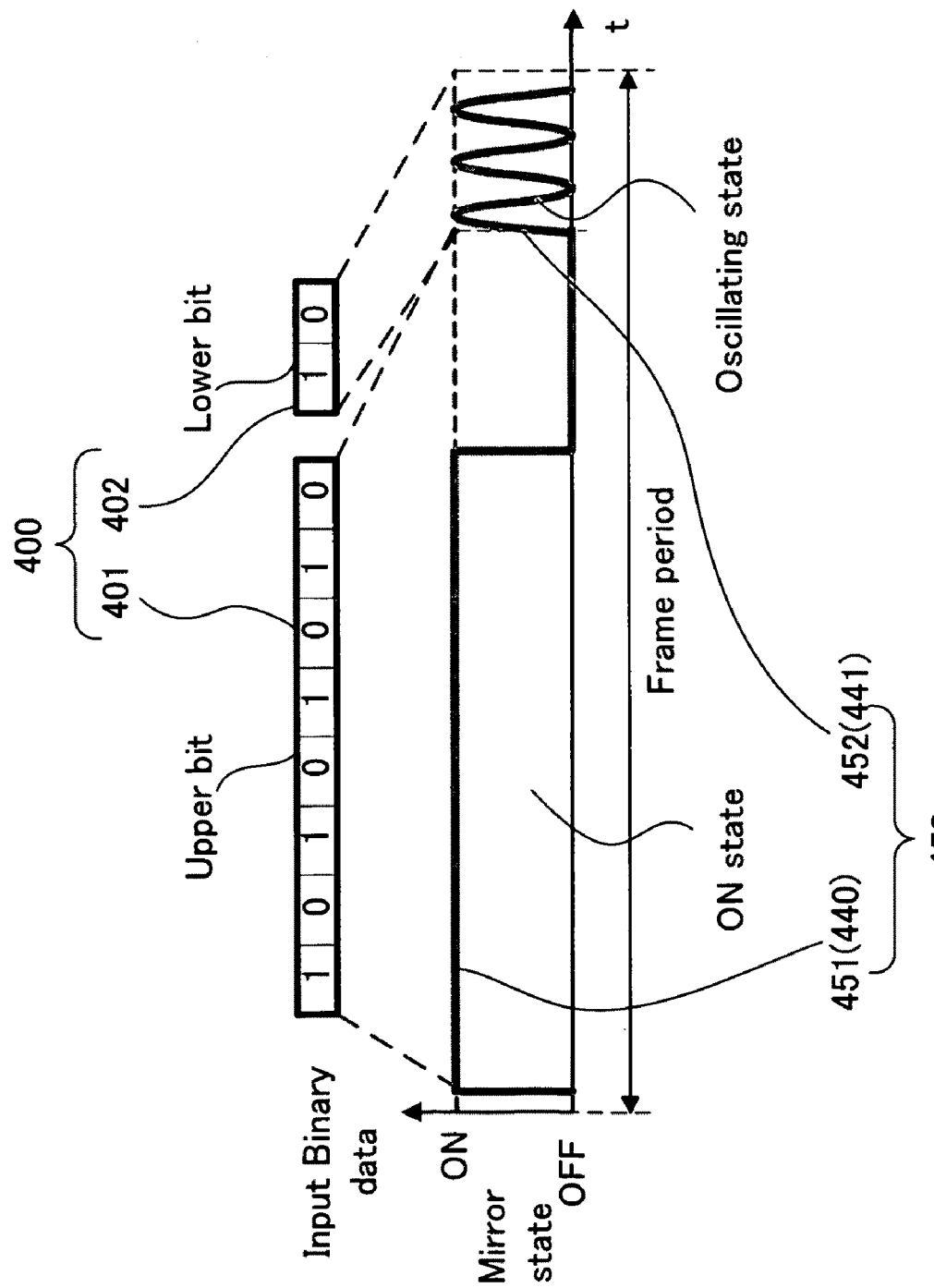
FIG. 6 is a chart illustrating a mirror control profile used in a display system according to a preferred embodiment of the present invention.

As illustrated in FIG. 6, the present embodiment is configured such that a desired number of bits of the upper bits 401 of the binary video image signal 400 is assigned to the ON/OFF control for the mirror and the remaining lower number of bits 402 is assigned to the oscillation control. The control is such that the ON/OFF (positioning) state is controlled by the PWM drive timing 440 from the timing control unit 330 and the non-binary data 430, while the oscillation state is controlled by the PWM drive timing 440 and OSC drive timing 441 from the timing control unit 330 and the non-binary data 430.

The following is a description of the basic control of a micromirror 212 of a spatial light modulator 200 according to the present embodiment.

Note that "Va (1, 0)" indicates an application of a predetermined voltage Va to the OFF electrode 215 and no application of voltage to the ON electrode 216 in the following description.

Also, "Va (0, 1)" indicates no application of voltage to the OFF electrode 215 and an application of a voltage Va to the ON electrode 216.

Also, "Va (1, 1)" indicates the application of a voltage Va to both the OFF electrode 215 and ON electrode 216.

FIGS. 7A, 7B, 7C, 7D, 7E and 7F show the configuration of a pixel unit 211 comprising a mirror 212, a hinge 213, OFF electrode 215, and ON electrode 216, and a basic example of how a mirror 212 is controlled under an ON/OFF state and under an oscillating state.

FIG. 7A shows the mirror 212 having been tilted from the neutral state by being attracted by the ON electrode 216, thus tilting to an ON state, as a result of applying a predetermined voltage (i.e., Va (0, 1)) to only the ON electrode 216. In the ON state of micromirror 212, reflection light 512 by way of mirror 212 is captured by projection optical system 520 and projected as projection light 513. FIG. 7B shows the quantity of light projected in the ON state.

Figure 7D:
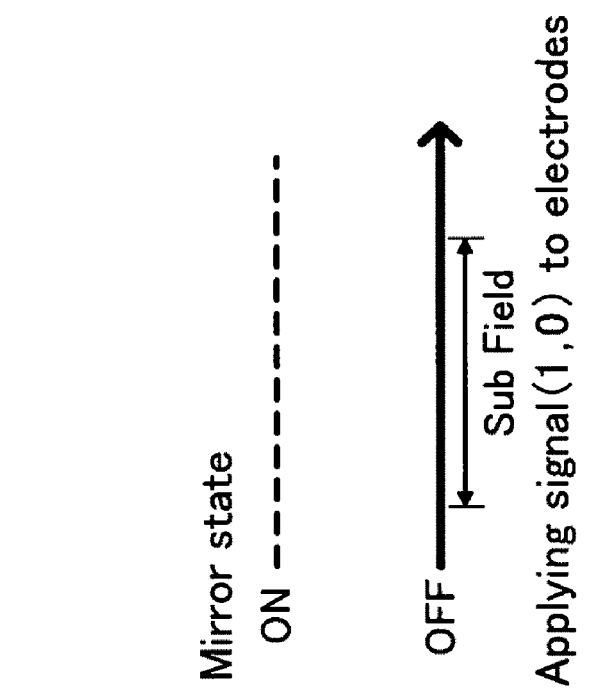
FIG. 7D is a chart showing the quantity of light projected in the OFF state of a micromirror.
Figure 7C:
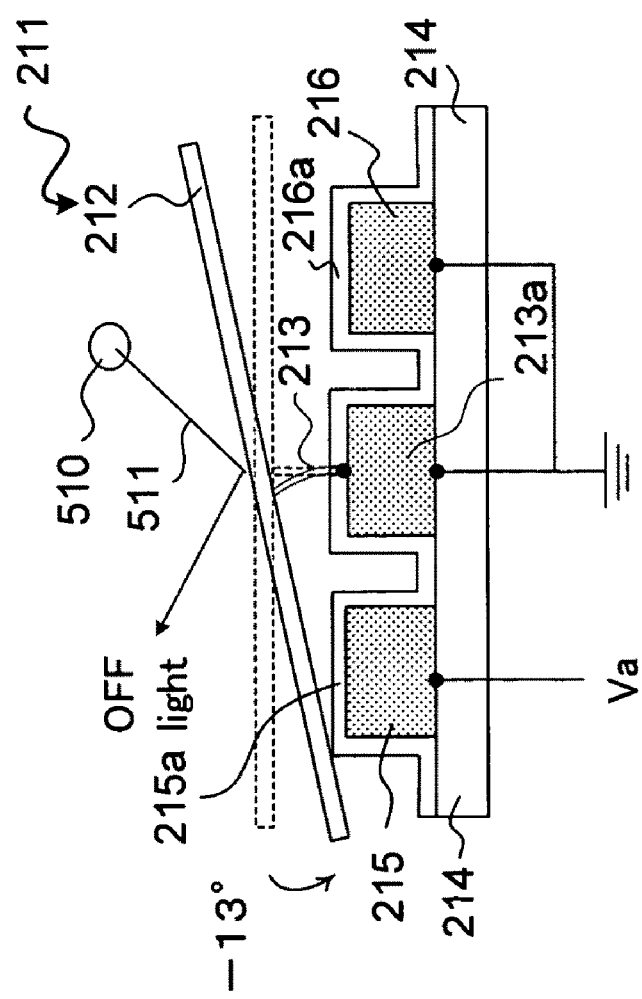
FIG. 7C is a cross-sectional diagram showing the OFF state of a micromirror.

FIG. 7C shows the mirror 212 having been tilted from the neutral state by being attracted by the OFF electrode 215, thus tilting to an OFF state, as a result of applying a predetermined voltage (i.e., Va (1, 0)) to only the OFF electrode 215. In the OFF state of micromirror 212, reflection light 512 is deflected away from projection optical system 520, and therefore does not transmit light along the optical path of the projection light 513. The right side of FIG. 7B shows the quantity of light projected in the OFF state. FIG. 7D shows the quantity of light projected in the OFF state.

FIG. 7E illustrates mirror 212 performing a free oscillation in the maximum amplitude of A0 between a tilted position (i.e., a Full ON), contacting with the ON electrode 216, and another tilted position (i.e., a Full OFF), contacting with the OFF electrode 215 (at Va (0, 0)).

Incident light 511 is projected onto the micromirror 212 at a prescribed angle, and the quantity of light resulting from incident light 511 reflecting in the ON direction. A portion of the quantity of light (i.e. the quantity of light of the reflection light 512) reflecting in a direction that is between the ON direction and OFF direction are incident to projection optical system 520 so as to be projected as the brightness of the image (i.e., the projection light 513). FIG. 7F shows the quantity of light projected in an oscillation state.

That is, in the ON state of mirror 212 shown in FIG. 7A, the flux of light of reflection light 512 proceeds to the ON direction so as to be captured almost entirely by projection optical system 520 and projected as projection light 513.

In the OFF state of mirror 212, shown in FIG. 7C, reflection light 512 proceeds to an OFF direction shifted from projection optical system 520, and thus a light projected as projection light 513 does not exist.

In the oscillating state of mirror 212, shown in FIG. 7E, a portion of the light flux of reflection light 512, diffraction light, diffusion light, and the like are captured by projection optical system 520 and projected as projection light 513.

Note that the examples shown in FIGS. 7A, 7B, 7C, 7D, 7E and 7F described above have been described for in the case of applying the voltage Va represented by a binary value of "0" or "1" to OFF electrode 215 and ON electrode 216. However, a more precise control of the tilting angle of mirror 212 is possible by increasing the steps of Coulomb force generated between mirror 212 and OFF electrode 215 or ON electrode 216 by increasing the step of the voltage value Va to multiple values.

Also note that the examples shown in FIGS. 7A, 7B, 7C, 7D, 7E and 7F described above presume that mirror 212 (i.e., the hinge electrode 213a) is set at the ground potential. However, a more precise control of the tilting angle of the mirror 212 is possible by applying an offset voltage thereto.

The present embodiment is configured to apply the voltages, i.e., Va (0, 1), Va (1, 0) and Va (0, 0), at the appropriate times during the tilting of the mirror 212 between the ON and OFF states as described below so as to generate a free oscillation in an amplitude that is smaller than the maximum amplitude between the ON and OFF states, thereby producing a more refined gray scale.

The following describes a method for displaying a video image using the projection apparatus according to the present embodiment.

Non-binary data 430, a PWM drive timing 440, and an OSC drive timing 441 are generated when a binary video image signal 400 and a synchronous signal 410 are input to a control apparatus 300.

Non-binary block 320 and timing control unit 330 calculate the period of time for controlling mirror 212 under an ON state. That is, they calculate the time for controlling the mirror 212 under an oscillation state, or the number of times for oscillating the mirror 212 for each mirror 212 of spatial light modulator 200, which displays the pixels of a video image in accordance with binary video image signal 400 and drive timing 420. Drive timing 420 is generated by timing control unit 330 from synchronous signal 410, and it generates non-binary data 430, a PWM drive timing 440, and an OSC drive timing 441.

Here, non-binary block 320 and timing control unit 330, that are comprised in control apparatus 300, use the ratio of the quantity of light of a projection light 513, obtained by oscillating a predetermined mirror 212 in an oscillation time T, to the quantity of light of a projection light 513, obtained by controlling mirror 212 under an ON state during the oscillation time T. This ratio is used to calculate the period of time for controlling mirror 212 under an ON state, the period of time for controlling the mirror 212 under the oscillation state, or the number of oscillations of mirror 212.

Non-binary data 430, PWM drive timing 440, and OSC drive timing 441 are generated on the basis of the calculated value of the time or the number of oscillations used to perform the ON/OFF control and oscillation control for each of the mirrors 212 constituting one frame of video image.

Figure 8A:
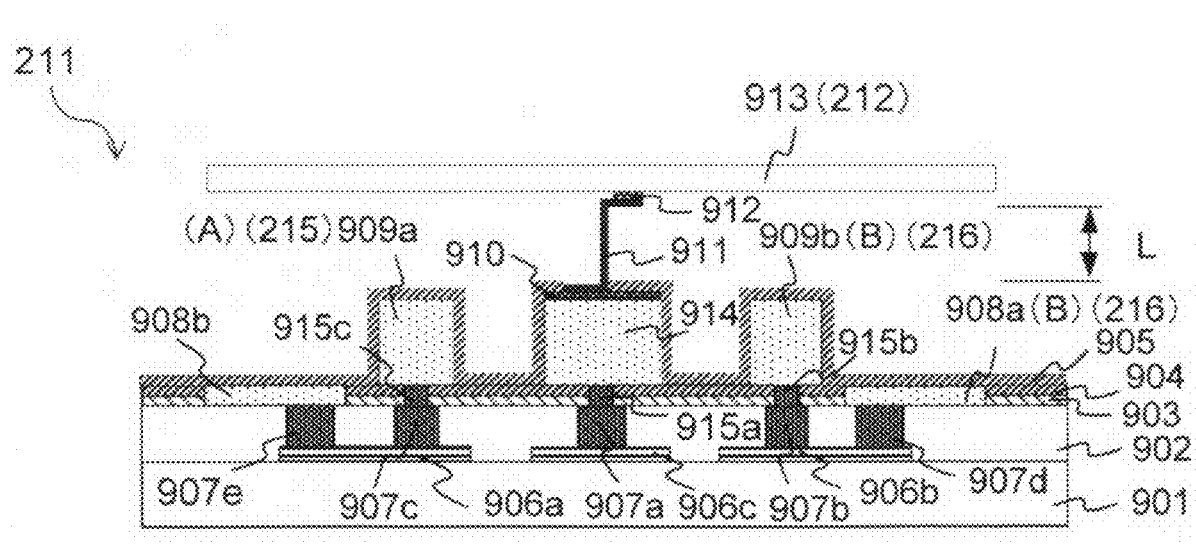
FIG. 8A is a cross-sectional diagram illustrating the specific configuration of a pixel unit in a display system according to a preferred embodiment of the present invention.

FIG. 8A is a cross-sectional diagram illustrating the specific configuration of a pixel unit 211 in the above described spatial light modulator 200.

The mirror element shown in FIG. 8A comprises wirings 1) 906a, 906b, and 906c of a drive circuit used for driving and controlling a mirror 913, 2) first Vias 907a, 907b, 907c, 907d, 907d, and 907e, all of which are connected to the wirings 906a, 906b, and 906c of the drive circuit, and 3) a first insulation layer 902, which is on a substrate 901. Wiring 906a on the left side is implemented with two first Vias 907a and 907e, and with first insulation layer 902 separating the two Vias. Likewise, wiring 906b on the right side is also implemented with two first Vias 907b and 907d, and with first insulation layer 902 separating the two Vias. Wiring 906c in the center is implemented with only one first via 907a. In summary, the present embodiment is implemented with five first Vias each has an insulation layer.

The present embodiment is also implemented with the wirings on the left and right sides with two first Vias. The number of first Vias may be different between the left and right sides. The number of first Vias may also be greater or fewer than in the present embodiment.

Furthermore, on the first Vias 907a, 907b, 907c, 907d, 907d, and 907e are formed second Vias 915a, 915b, and 915c and surface electrodes 908a and 908b, all of which are formed on the right and left sides the second Vias, respectively.

The second via 915a is formed on the first via 907a, which has been formed on wiring 906c at the center. The second Vias 915b and 915c are formed on first Vias 907b and 907c, respectively, both of which are formed on the wirings 906a and 906b on the left and right sides, respectively. Surface electrodes 908a and 908b are formed on first Vias 907d and 907e, respectively, whereas second Vias 915a, 915b, or 915c is not formed on wirings 906a and 906b.

Furthermore, a first protective layer 903 is laid on the first insulation layer 902, and a second protective layer 904 is laid on the first protective layer 903.

Substrate 901 is preferably a silicon substrate.

Wirings 906a, 906b, and 906c of the drive circuit are preferably aluminum wirings.

First Vias 907a, 907b, 907c, 907d, 907d, and 907e and second Vias 915a, 915b, and 915c are preferably made of a metallic material containing tungsten and/or copper.

Surface electrodes 908a and 908b may be made of a material similar to that of first Vias 907a, 907b, 907c, 907d, 907d, and 907e and second Vias 915a, 915b, and 915c (e.g., tungsten), or of a material with high electrical conductivity, such as aluminum. The form of the surface electrodes 908a and 908b is arbitrary. FIG. 8 illustrates an example of placing the surface electrodes 908a and 908b on first Vias 907d and 907e, respectively. They may alternatively be placed directly on wirings 906a and 906b.

First insulation layer 902, first protective layer 903, and second protective layer 904 are preferably layers containing silicon such as silicon carbide (SiC), amorphous silicon, or silicon dioxide ($SiO_2$).

If aluminum is used for surface electrodes 908a and 908b, a direct contact between the amorphous silicon and aluminum electrode corrodes the aluminum surface electrodes 908a and 908b, and therefore a silicon carbide (SiC) layer between the amorphous silicon and aluminum surface electrodes 908a and 908b is recommended. Alternatively, an electrode may be formed by mixing aluminum with an impurity, such as silicon; alternatively, a barrier layer may be provided by using a material other than a SiC layer. Such a barrier layer may comprise two layers or more.

For example, first insulation layer 902 of FIG. 8A is a layer made of silicon carbide (SiC). First insulation layer 902 may be made of another material such as titanium nitride (TiN), or the like, which takes into consideration the etching of a dispensable layer with hydrogen fluoride (HF), which is employed for producing a mirror element; this also takes into consideration the stiction of between a mirror element and electrode 909a or 909b when the former deflects and abuts onto the latter.

The mirror element, according to the present embodiment, is equips electrodes 909a, 909b, and 914 so as to a secure electrical connection to second Vias 915a, 915b, and 915c, respectively.

Electrodes 909a, 909b, and 914 may preferably use a high electrically conductive material such as aluminum.

Electrode 914, shown in FIG. 8A, (constituting a hinge electrode later) is an electrode equipped with an elastic hinge 911 and is configured to be the same height as electrodes 909a and 909b on the left and right. Configuring individual electrodes 909a, 909b, and 914 to be the same height as the center, left, and right makes it possible to form the three electrodes 909a, 909b and 914 in the same production process. Furthermore, a barrier layer 910 made of tantrum, titanium, or such is placed on electrode 914 at the center. Barrier layer 910 may comprise two layers or more.

Furthermore, an appropriate modification of the height of the electrode at the center makes it possible to determine the height for placing an elastic hinge 911 at the center described below. The height of the placement of elastic hinge 911 may be determined by adjusting the height of barrier layer 910.

Elastic hinge 911 is placed on electrode 914 at the center, on which barrier layer 910 has been laid, so as to be connected to barrier layer 910.

Elastic hinge 911 is made of a material such as amorphous silicon. The thickness of elastic hinge 911 (in the left and right direction of the drawing of FIG. 8A) is preferably between approximately 150 and 400 angstroms.

Multiple elastic hinges may be provided for one mirror and the mirror may be supported by such elastic hinges that are reduced in width. For example, two elastic hinges narrower than the conventional configuration may be used one mirror at either end of the mirror.

Elastic hinge 911 is preferably applied with In-Situ doping (such as arsenic and phosphorus), an ion implanting, a diffusion of metallic silicide, such as nickel silicide (NiSi), titanium silicide (TiSi), so as to possess electric conductivity.

Furthermore, the mirror element according to the present embodiment provides a second insulation layer 905 on the surface of the substrate where electrodes 909a, 909b, and 914 have been placed.

Second insulation layer 905 is preferably a layer containing silicon, such as silicon carbide (SiC), amorphous silicon, or silicon dioxide ($SiO_2$). This layer is provided to prevent corrosion by hydrogen fluoride (HF) if the electrodes 908a, 908b, 909a, 909b, and 914 are made of aluminum as described above.

The upper surface of elastic hinge 911 may be provided with a joinder layer, which can be configured to be the same form and size as mirror 913 described below. The present embodiment is configured so that the joinder layer is the smallest possible size. Such a configuration makes it possible to prevent mirror 913 from being deformed or warped by the difference in thermal expansion coefficients between mirror 913 and the joinder layer.

Furthermore, a metallic layer 912 is laid on the joinder layer of elastic hinge 911 in order to provide electric conductivity between elastic hinge 911 and mirror 913, while eliminating a variation in heights between individual mirror elements.

Metallic layer 912 is made of a material containing tungsten or titanium; a material containing another metal may also be used.

If mirror 913 is made of aluminum and elastic hinge 911 is made with a silicon material, then a barrier layer (not shown in a drawing herein) may further be laid on and under metallic layer 912 in order to prevent mirror 913 from touching elastic hinge 911. Such a barrier layer may comprise two layers or more.

The barrier layer is made of a material containing tantrum, or titanium, et cetera.

Furthermore, the mirror element according to the present embodiment is configured by placing a mirror 913 on metallic layer 912 of elastic hinge 911.

Mirror 913 is preferably made of a material with high light reflectivity, such as aluminum.

Mirror 913 is also preferably has an approximately square shape, with one side measuring between 4.5 and 11 μm. The gap between individual mirrors 913 is preferably between 0.15 and 0.55 μm. The aperture ratio of each individual mirror element is preferably about 90%.

Such is the configuration of the mirror element according to the present embodiment shown in FIG. 8A.

Figure 8B:
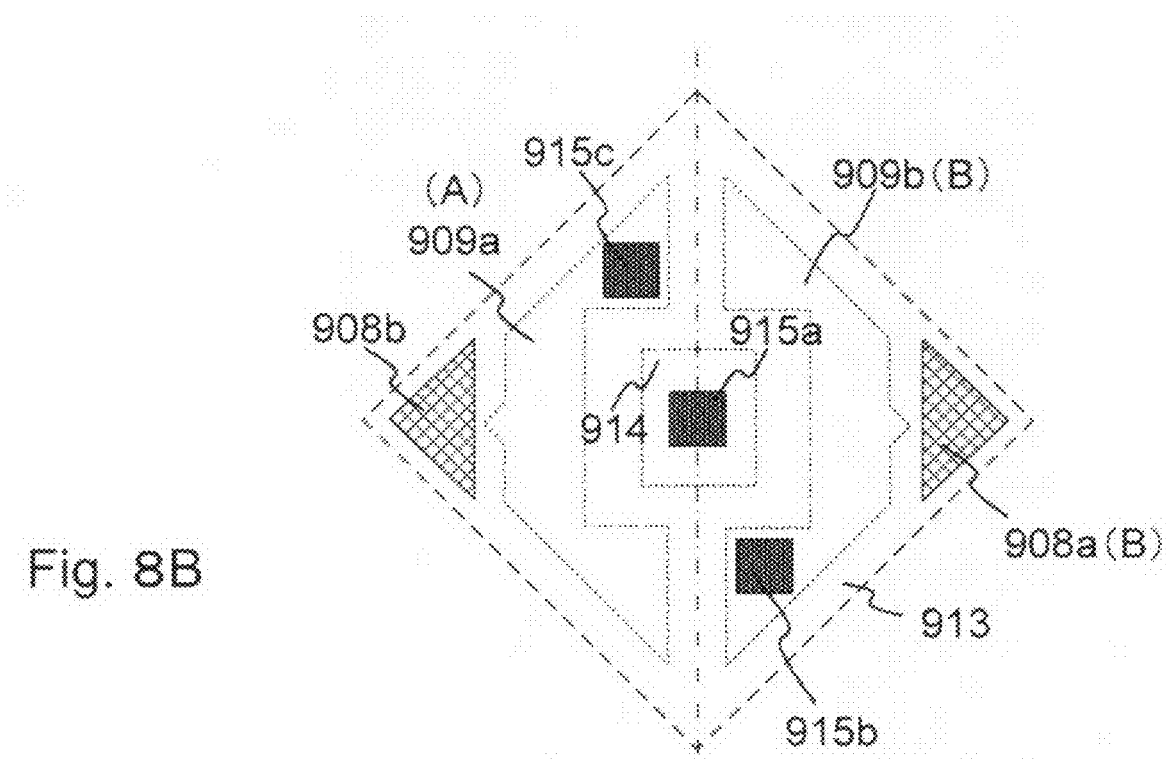
FIG. 8B is a plain view diagram of the surface of the pixel unit of FIG. 8A.

FIG. 8B is a plain view diagram of the surface of the substrate of the mirror device according to the present embodiment.

Note that surface electrodes 909a and 909b on the left and right, and the hinge electrode 914, at the center, which are formed on mirror 913 and the second Vias 915a, 915b, and 915c are delineated by the dotted lines. Also, the deflection axis of mirror 913 is indicated by chain lines.

As shown in FIG. 8B, second Vias 915a, 915b, and 915c for electric conduction to electrodes 909a, 909b, and 914 are placed under electrodes 909a, 909b, and 914. Surface electrodes 908a and 908b, placed so as to increase a Coulomb force for deflecting the mirror 913, are placed under the mirror 913.

Figure 8C:
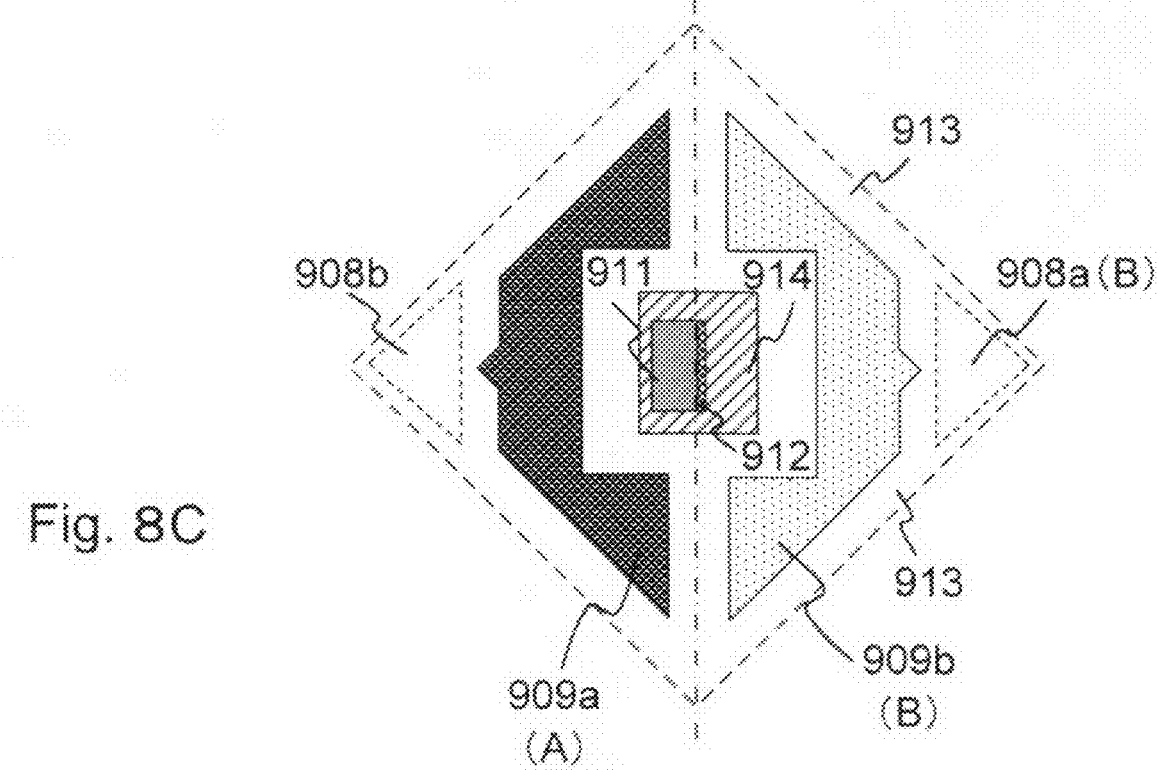
FIG. 8C is a plain view diagram of FIG. 8A with the mirror removed from the pixel unit.

FIG. 8C is a plain view diagram with mirror 913 of the mirror element, according to the present embodiment, is removed. The position of mirror 913 is indicated by dotted lines.

As shown in FIG. 8C, the respective apexes of electrodes 909a and 909b at both end of mirror 913 are formed as protrusions. This design ensures that the deflection angle of mirror 913 is at a prescribed angle as a result of mirror 913 hitting the protrusions of electrodes 909a and 909b when mirror 913 is deflected.

Note than the tips of electrodes 909a and 909b are preferably designed so as to make the deflection angle of mirror 913 between 12 and 14 degrees. Such a deflection angle of mirror 913 is preferably designed in compliance to the design of the light source and optical system of a projection apparatus. Furthermore, the length of elastic hinge 911 of each mirror element is preferably no larger than 2 μm, and mirror 913 is preferably an approximate square, with the length of one side being 10 μm or smaller.

The surface of the substrate is formed with the electrodes 909a and 909b and hinge electrode 914 such that the substrate has convex and concave surfaces.

Figure 8D:
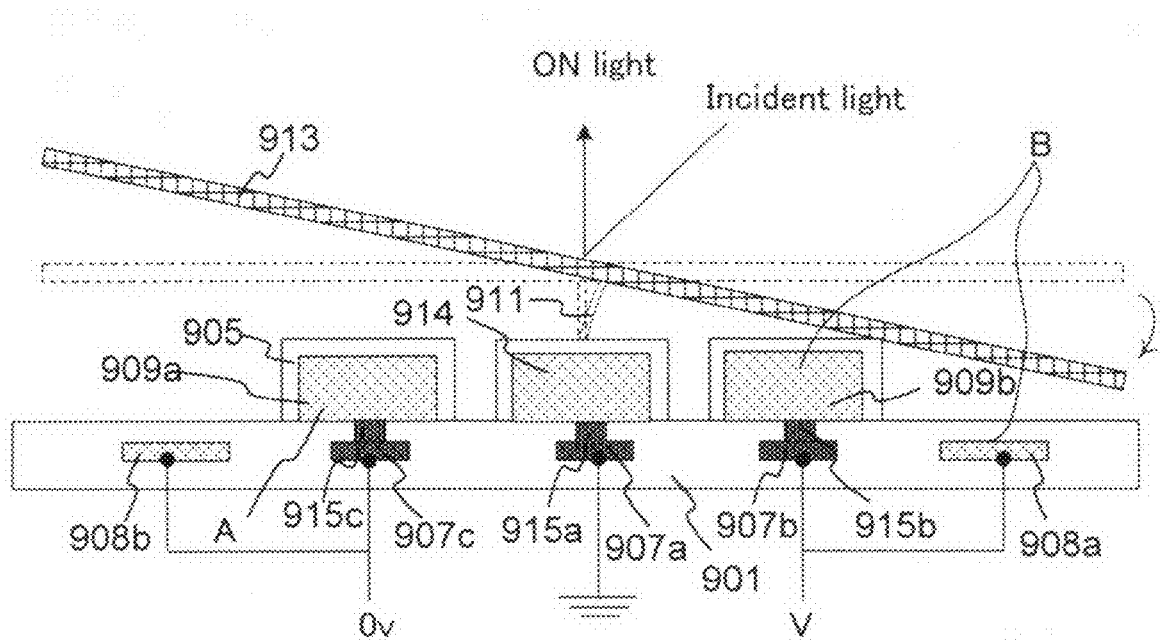
FIG. 8D is a cross-sectional diagram of the mirror element shown in FIG. 8A deflected in an ON state.

FIG. 8D is a cross-sectional diagram the mirror element shown in FIG. 8A deflected in an ON state.

The present embodiment presumes a configuration in which the light emitted from a light source is an ON light when mirror 913, shown in FIG. 8A, is deflected to the right side, while the light emitted from a light source is an OFF light when the mirror 913 is deflected to the left side.

When a voltage is not applied to individual surface electrodes 908a or 908b on the left and right, or to the individual surface electrodes 909a or 909b, the elastic hinge 911 is not deformed and the mirror 913 is therefore maintained in a horizontal position.

When a voltage to surface electrode 909b on the right side and to surface electrode 908a on the right side is applied, a Coulomb force determined by the following expression is generated:

$$[\text{top surface area size of electrode}] * [\text{voltage applied to electrode}] * [\text{the second power of the distance between aluminum and mirror}].$$

This Coulomb force is generated between the right surface electrode 909b and mirror 913 and between the right surface electrode 908a and mirror 913. Mirror 913 is deflected by the total Coulomb force generated between the right surface electrode 909b and mirror 913 and between the right side surface electrode 908a and mirror 913.

In this event, the distance between mirror 913 and right surface electrode 908a is longer than that between mirror 913 and right surface electrode 909b, and the area of right surface electrode 908a is smaller than that of the right surface electrode 909b. Therefore, the generated Coulomb force is also smaller than that generated between the right surface electrode 909b and mirror 913.

Furthermore, when mirror 913 is attracted to right surface electrode 908a as the mirror is deflected as a result, mirror 913 is deflected to an angle between 12 and 14 degrees, and there is a strong reactive force of the elastic hinge due to its resilience. The Coulomb force attracts the tip of mirror 913 to the right surface electrode 908a placed on the substrate surface so that mirror 913 can be attracted by a smaller Coulomb force due to the type of movement characteristic of a rigid body. As a result, the right surface electrode 908a is capable of retaining the deflection of mirror 913 in a state for a low voltage to be applied thereto.

When mirror 913 is deflected to the right side, the surface electrode 908b on the other side (that is, the left side) and the left side surface electrode 909a are put in the same potential and are grounded.

Figure 8E:
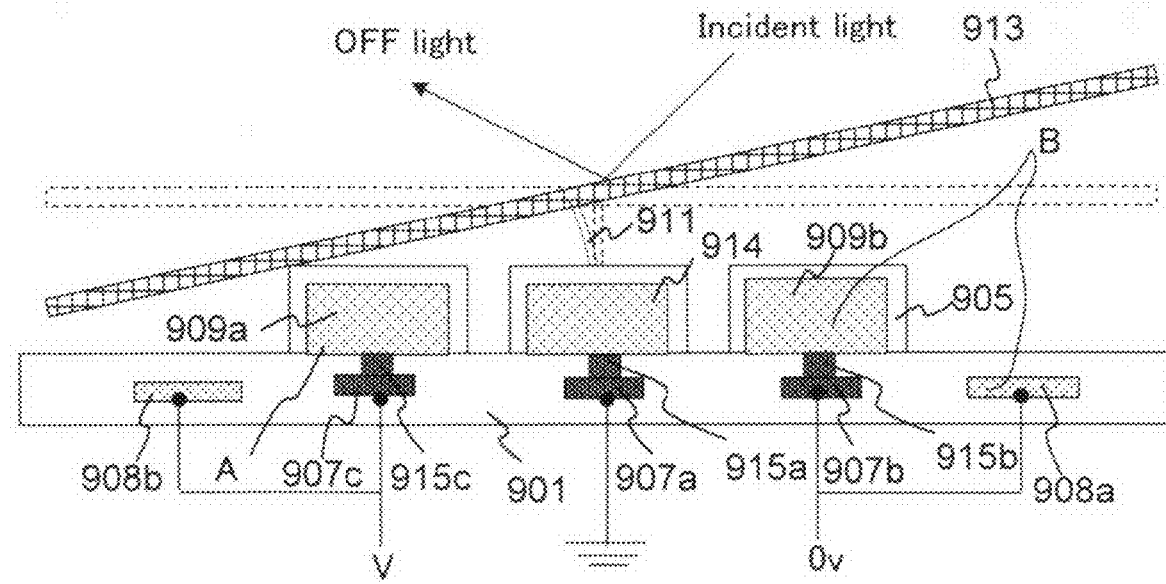
FIG. 8E is a cross-sectional diagram of the mirror element shown in FIG. 8A deflected in an OFF state.

FIG. 8E is a cross-sectional diagram of the mirror element shown in FIG. 8A deflected to an OFF state.

In FIG. 8E, the application of a voltage to left side surface electrode 909a and left side surface electrode 908b makes it possible to deflect mirror 913 to the left side, like to the process described for FIG. 8D.

The principles in operation and the action of the Coulomb force in this case are similar to those noted for FIG. 8D and therefore further descriptions are not provided here.

Incidentally, if the forms of mirror 913 and elastic hinge 911 are changed between the right and left sides of the mirror element, and if the resilience of elastic hinge 911 is different for the right and left sides of the mirror element, and if the deflection control for mirror 913 is different for the right and left sides of the mirror element, then the area, height, and placement of the respective surface electrodes 908a and 908b, or the respective surface electrodes 909a, 909b, and 914, on the right and left sides of the mirror element may be changed so as to apply the appropriate voltage to thereby control the deflection of mirror 913.

Furthermore, an alternative control may also be performed so that voltages are applied in multiple steps to the respective surface electrodes 908a and 908b and respective surface electrodes 909a and 909b on the right and left sides of the mirror element.

Furthermore, the circuits and voltages for driving surface electrode 908a (or 908b) and surface electrode 909a (or 909b) on either one side of surface electrode 908a (and surface electrode 909b) on the right side of the mirror element and the surface electrode 908b (and surface electrode 909a) on the left side of the mirror element may be appropriately changed. In other words, surface electrodes 908a and 909b are driven together, or surface electrodes 908b and 909a are driven together.

Furthermore, both or either one of surface electrode 908a (or 908b) and 909a (or 909b) of surface electrodes 908a and 909b on the right side of the mirror element or surface electrode 908b and electrode 909a on the left side of the mirror element may protrude from the surface of the substrate.

Furthermore, both or either one of surface electrode 908a (or 908b) and electrode 909a (or 909b) of surface electrodes 908a and 909b on the right side of the mirror element or surface electrode 908b and electrode 909a on the left side of the mirror element may be placed on the surface of the substrate.

As such, mirror 913 of the mirror element according to the present embodiment is deflected, and thus the reflecting direction of the illumination light can appropriately be changed.

The following is a description of the benefits of placing surface electrode 909b and surface electrode 909a on the ON side apart from each other in the present embodiment, with reference to FIGS. 9A, 9B, 9C, and 9D.

Figure 9A:
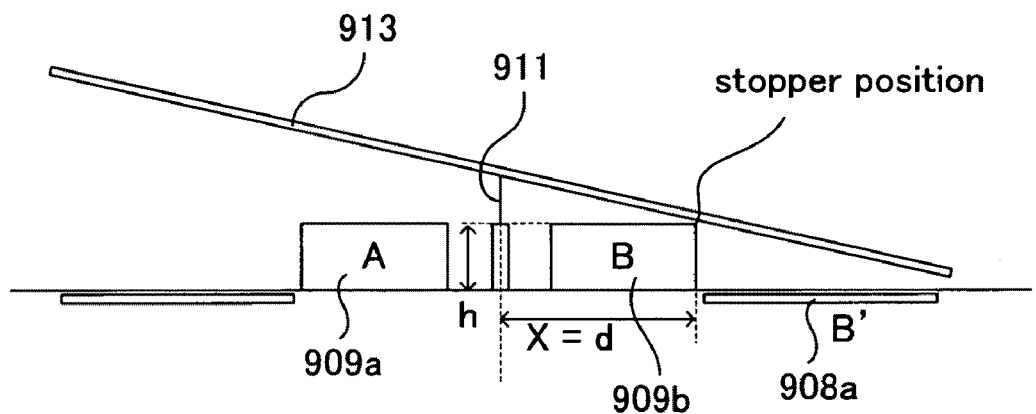
FIG. 9A is a conceptual diagram illustrating the action of a pixel unit of the configuration shown in FIGS. 8A through 8E.

FIG. 9A is a conceptual diagram illustrating the advantage of the structure of pixel unit 211, also illustrated in the above described FIG. 8A, et cetera.

FIG. 9A shows 1) the use of surface electrode 909a (i.e., the electrode A) as a stopper located near elastic hinge 911, which supports mirror 913, and 2) the use of surface electrode 909b of the surface electrode 909b (i.e., the electrode B) and surface electrode 908a (i.e., the electrode B') as stoppers also. In this case, electrode A is placed on substrate 901, while electrode B' is placed under the surface of substrate 901.

If the position of each stopper (i.e., electrode A and B) is at a short distance (i.e., a distance d) from elastic hinge 911, the deflection angle of mirror 913 is determined by h/d. Where "h" is the height of the base of elastic hinge 911, this calculation is less accurate than when "h" is the height of the electrodes A and B, in which case the accuracy of the calculation is good.

Furthermore, the position of each stopper (i.e., the electrode A or B) is close to elastic hinge 911 and therefore the spring force (i.e., the rigidity) of elastic hinge 911 may be decreased to counter stiction (i.e., the force attributable to an intermolecular attraction) between mirror 913 and each stopper. This makes possible the advantageous decrease in size of the mirror element.

Figure 9B:
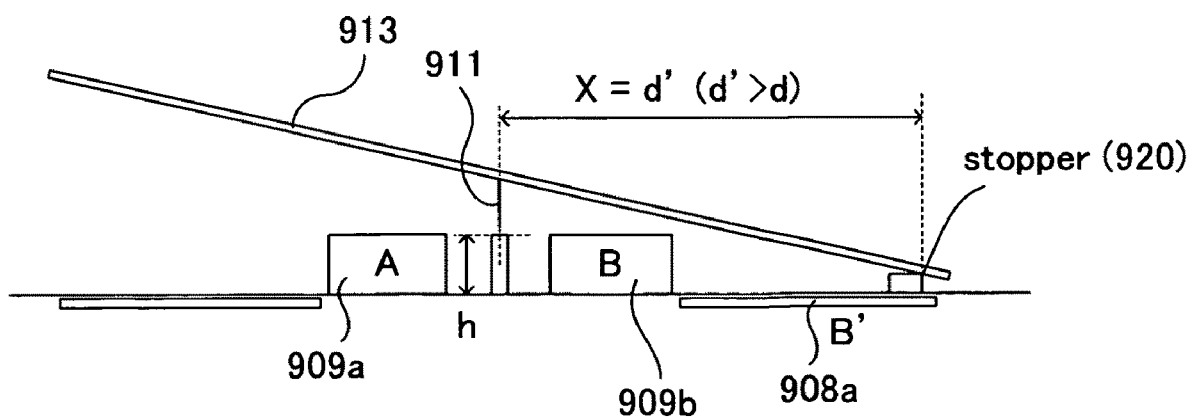
FIG. 9B is a conceptual diagram illustrating the action of a pixel unit of the configuration shown in FIGS. 8A through 8E.

FIG. 9B illustrates a stopper placed far from elastic hinge 911 of electrodes B and B'.

In this case, if the position of each stopper (i.e., the electrode A or B) is at a far distance (i.e., a distance d') from elastic hinge 911, the deflection angle of mirror 913 is achieved with greater accuracy.

In order to detach mirror 913 from a stopper 920 by a spring force that is larger than the stiction between mirror 913 and stopper 920, however, a stronger spring force is required than in the configuration shown in the above described FIG. 9A.

At the same time, a stronger spring force of elastic hinge 911 will be needed to increase the voltage applied to electrodes B and B' to control mirror 913.

Figure 9C:
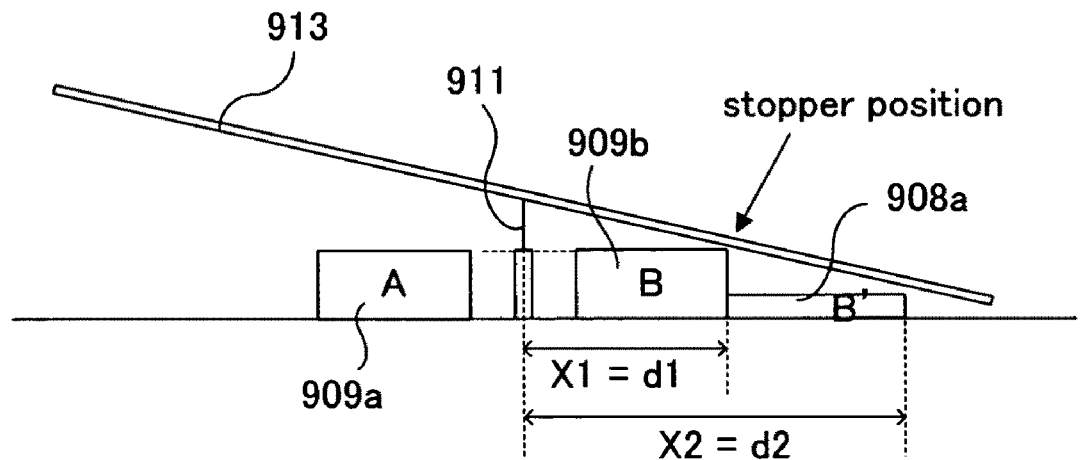
FIG. 9C is a conceptual diagram illustrating the action of a pixel unit of the configuration shown in FIGS. 8A through 8E.
Figure 9D:
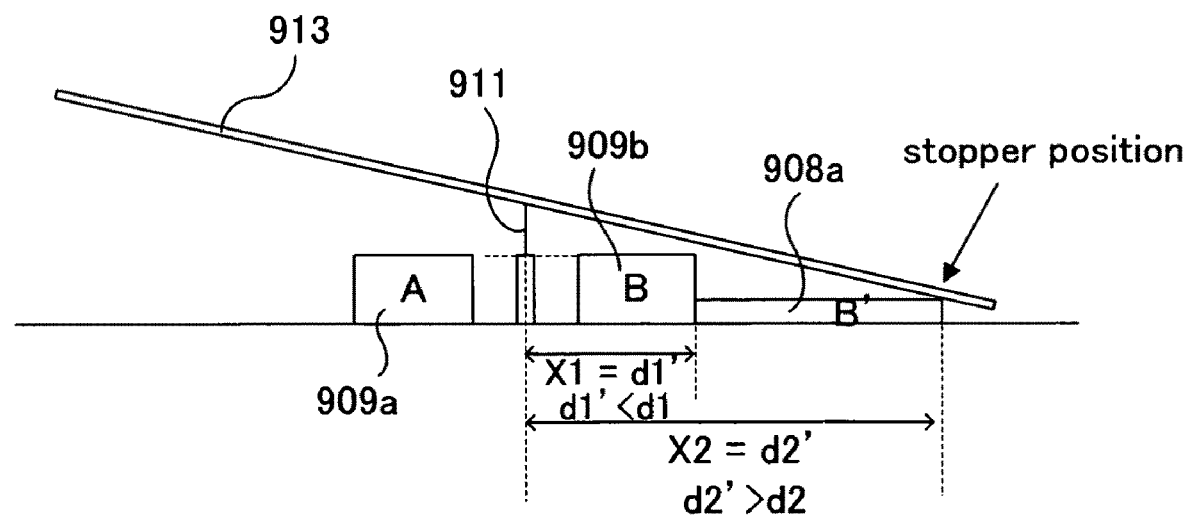
FIG. 9D is a conceptual diagram illustrating the action of a pixel unit of the configuration shown in FIGS. 8A through 8E.

FIGS. 9C and 9D illustrate the placing of electrodes B and B' on substrate 901.

FIG. 9C illustrates the edge (at a distance d1 from elastic hinge 911) of the electrode B functioning as a stopper, while FIG. 9D illustrates electrode B' functioning as stopper.

In FIG. 9C, the distance d2 of the edge of electrode B' from elastic hinge 911 is set at a value in order to prevent electrode B' from touching mirror 913.

In contrast, in of FIG. 9D, the distance d1' of the edge of electrode B from elastic hinge 911 is set at a value smaller than the above described distance d1, and the distance d2' of the edge of electrode B' from elastic hinge 911 is set at a value larger than the above described distance d2 so that the edge of electrode B' functions as a stopper for mirror 913.

In this case, electrodes B and B' exist on the substrate 901 and therefore the voltage applied to electrodes B and B' decreases as the distance between mirror 913 and electrodes B/B' decreases, when the area of electrodes B and B' is the same as in the above described FIGS. 9A and 9B.

In FIGS. 9C and 9D, if the length of elastic hinge 911 is the same, the configuration illustrated in FIG. 9C makes it possible to enlarge the area of electrode B.

In contrast, the area of electrode B' can therefore be enlarged in the configuration shown in FIG. 9D.

As described above, the placement of electrodes on the ON side separately according to the present embodiment optimizes the area of the electrode, the distance between mirror 913 and electrode B (and B'), and the distance of between electrode B (and B') and elastic hinge 911. This is achieved by using multiple electrodes B and B', thereby providing a layout to reduce the drive voltage.

Figure 10A:
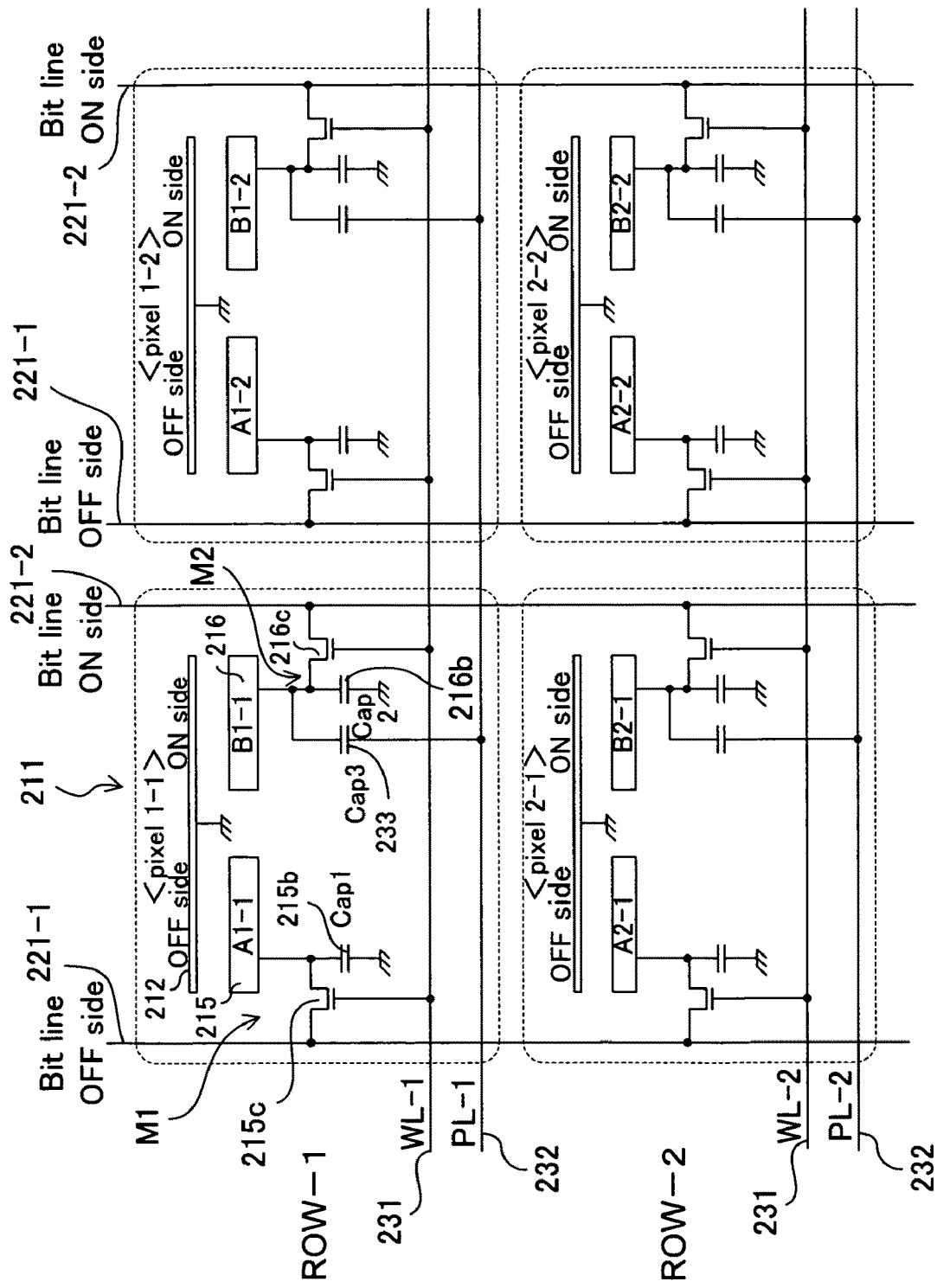
FIG. 10A is a conceptual diagram illustrating an example of a configuration of a pixel unit comprised in a display system according to a preferred embodiment of the present invention.

With the above described configuration serving as a premise, the following is a description of an exemplary configuration, with reference to FIG. 10A, of a pixel unit 211 implemented in a pixel array 210 of a spatial light modulator 200 according to the present embodiment.

In contrast to the configuration of pixel unit 211, as illustrated in FIG. 4, described above, in which one pixel is implemented with a mirror, two electrodes, and two DRAM-structured memory cells, the present embodiment 1 is configured with the addition of plate lines 232 (PL-n; where "n" represents the number of ROW lines) to respective ROW lines and interconnect the plate line 232 (PL) and ON electrode 216 by way of a second ON capacitor 233 (Cap 3).

This configuration enables the control of ON electrodes 216 (i.e., B1-1, B1-2 and so on) of the same ROW line even with lines other than bit line (bit line 221-1 and bit line 221-2) and word line 231 (WL-1).

The present embodiment is configured such that the memory cell used for controlling mirror 212 is a simple DRAM structure requiring only one transistor in individual pixel unit 211 constituting the pixel array. Therefore the size of the structure of the memory cell can be kept at a minimum, even if plate line 232 and the second ON capacitor 233 are added. Therefore, a high resolution is easily achieved through an arrangement of a larger number of pixel units 211 within a pixel array of a certain size.

Furthermore, the addition of plate line 232 and second ON capacitor 233 makes it possible to greatly expand the gray scale expression through a combination of the ON/OFF control and oscillation control of mirror 212. This achieves a greater gray scale expression than that achieved through a simple PWM control, as described below.

In other words, it is possible to attain both higher definition and a higher level of gray scale for a projection image by using a spatial light modulator such as spatial light modulator 200.

The following is a description of an operation of pixel unit 211, configured as shown in FIG. 10A.

On the word line 231 (WL) and plate line 232 (PL), both of which are placed on the same ROW line, plate line 232 (PL) is made active when word line 231 (WL) is not selected (L) and when ON electrode 216 is discharged (e.g., 0 volts).

With this, ON electrode 216 is charged. The charge voltage is determined by the ratio of the capacitance of ON capacitor 216b (Cap 2) to that of the second ON capacitor 233 (Cap 3). The charge voltage of ON electrode 216 is no less than twice the voltage of plate line 232 (PL) when the capacitance ratio is set at Cap 3>Cap 2.

When word line 231 (WL) is in a selected state (H level), plate line 232 (PL) is discharged (e.g., 0 volts).

Figure 10B:
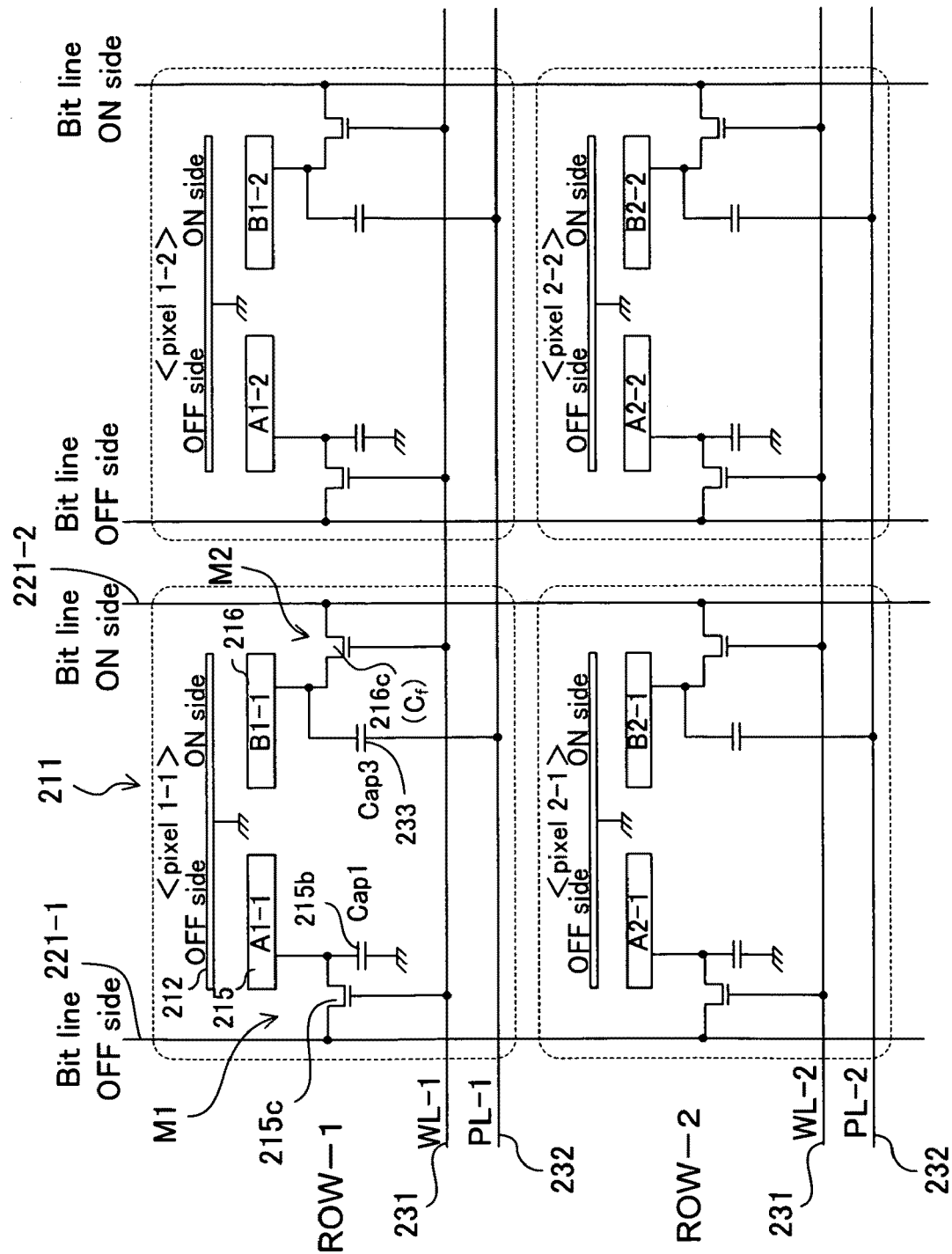
FIG. 10B is a conceptual diagram illustrating an example of a modification of a pixel unit comprised in a display system according to a preferred embodiment of the present invention.

FIG. 10B is a diagram showing a possible modification of the configuration of pixel unit 211 according to the present embodiment.

The configuration shown in FIG. 10B eliminates the ON capacitor 216b (Cap 2) connected to ON electrode 216 from the configuration illustrated in the above described FIG. 10A.

However, gate transistor 216c has a floating capacitance Cf at the source terminal that is connected to ON electrode 216, and the floating capacitance Cf produces an effect similar to the effect produced by the eliminated Cap 2.

In this case, the capacitance of the second ON capacitor 233 is set at approximately the same capacitance as that of OFF capacitor 215b (i.e., Cap 3=Cap 1). The floating capacitance Cf is usually very small, making Cap 3>>Cf and, thus, the charge of ON electrode 216 becomes close to the voltage of plate line 232 (PL).

Figure 10C:
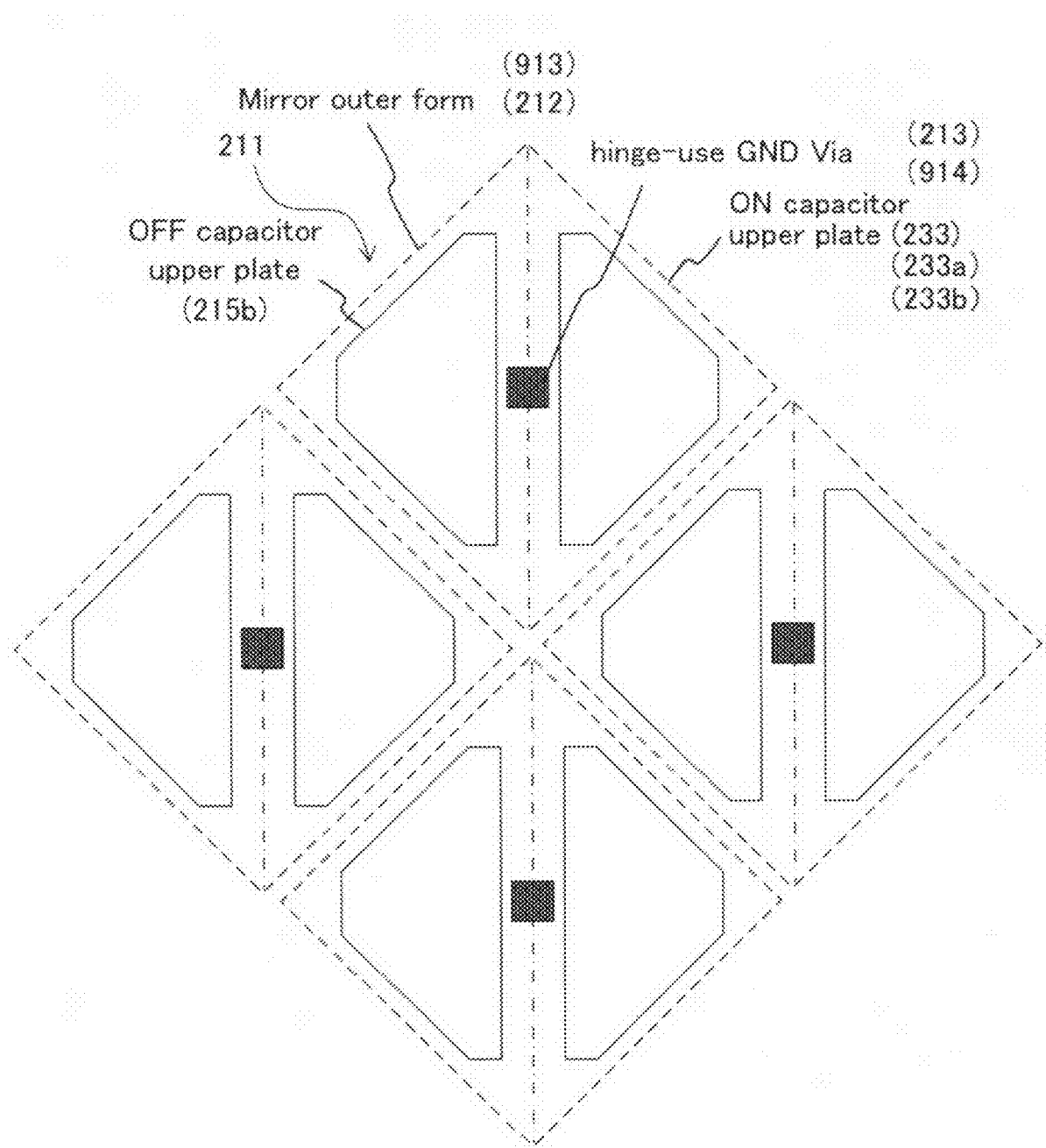
FIG. 10C is a plain view diagram illustrating the layout of a capacitor used in a possible modification of a pixel unit comprised in a display system according to a preferred embodiment of the present invention.

FIG. 10C is a plain view diagram of an example layout within pixel unit 211, of 1) OFF capacitor 215b in the configuration illustrated in FIG. 10B and of 2) second ON capacitor 233 connected to the line 232, with the same delineations used in FIGS. 8A through 8C.

FIG. 10C is a diagram with a perspective from the top surface of mirror 212 (or mirror 913), showing a layer on which upper plate 233a of second ON capacitor 233 (and OFF capacitor 215b) are placed.

The upper plate 233a and lower plate 233b, which includes the present second ON capacitor 233 are of the same size, with lower plate 233b placed right under upper plate 233a.

Furthermore, the size of upper plate 233a and lower plate 233b is smaller than that of mirror 212 (or the mirror 913). This configuration prevents the size of the mirror device from increasing due to the area of the second ON capacitor 233 jutting out of the contour of mirror 212.

Figure 10D:
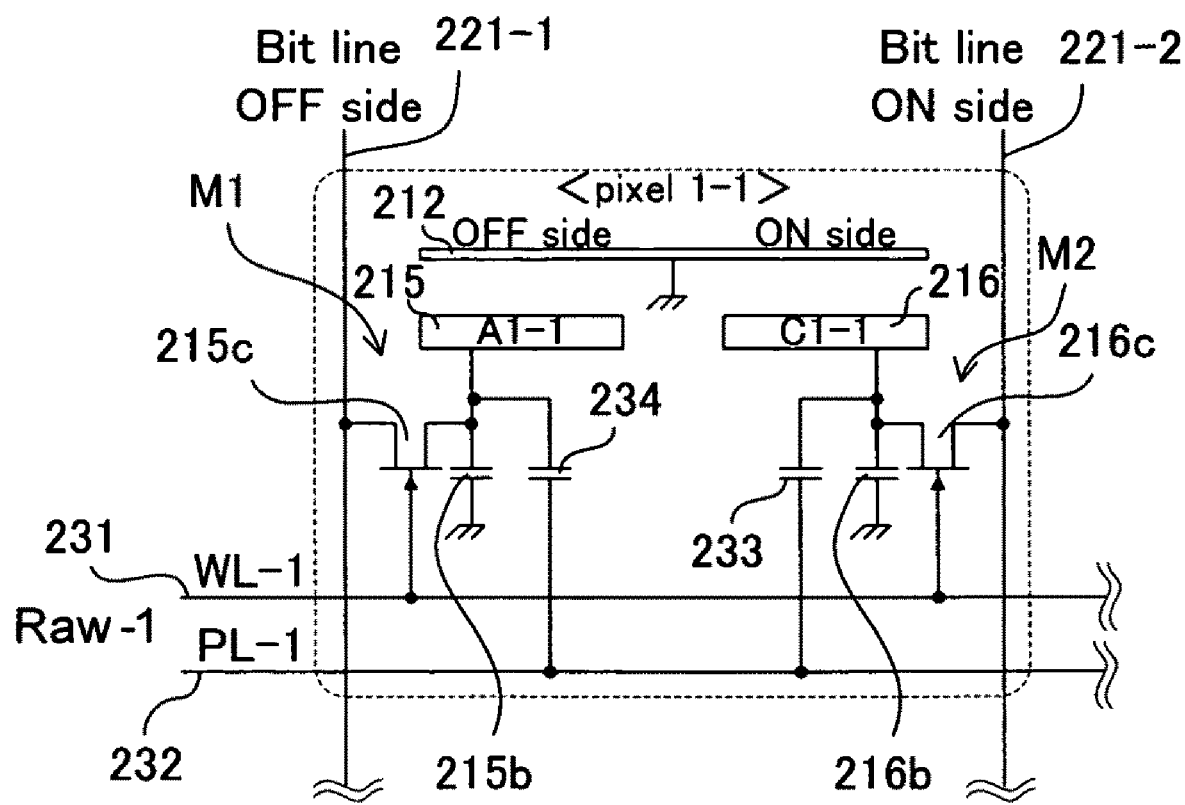
FIG. 10D is a conceptual diagram illustrating another modification of a pixel unit comprised in a display system according to a preferred embodiment of the present invention.

FIG. 10D is a description diagram showing another possible modification of the configuration of pixel unit 211 shown in the above described FIG. 10A.

The modification shown in FIG. 10D is configured with a second OFF capacitor 234 between plate line 232 and OFF electrode 215, in addition to adding the second ON capacitor 233.

This configuration enables a control of the electric potential on the side of the OFF electrode 215 by way of plate line 232 (PL), thus enabling a diverse control of the mirror 212.

FIG. 10E shows an example configuration in which a second word line 231-2 and a second plate line 232-2 are added to the pixel array 210 (i.e., the pixel unit 211) illustrated in the above described FIG. 10A.

The configuration of FIG. 10E is such that, in each of multiple pixel units 211 belonging to the same ROW line (ROW-n), a gate transistor 215c is connected to a word line 231, and a gate transistor 216c is connected to a second word line 231-2.

Furthermore, in each of the multiple pixel units 211 belonging to the same ROW line (ROW-n), the second ON capacitor 233 is connected to plate line 232 or second plate line 232-2, respectively. For example, in pixel unit 1-1, the second ON capacitor 233 is connected to plate line 232, while in next pixel unit 1-2; the second ON capacitor 233 is connected to second plate line 232-2.

The following is a description of the area around the ON electrode 216 of one pixel <pixel 1-1> shown in the above described FIG. 10A, and the operations of word line 231 (WL-1) and plate line 232 (PL-1) with reference to FIGS. 11A, 11B, 11C, 11D, and 11E.

Figure 1A:
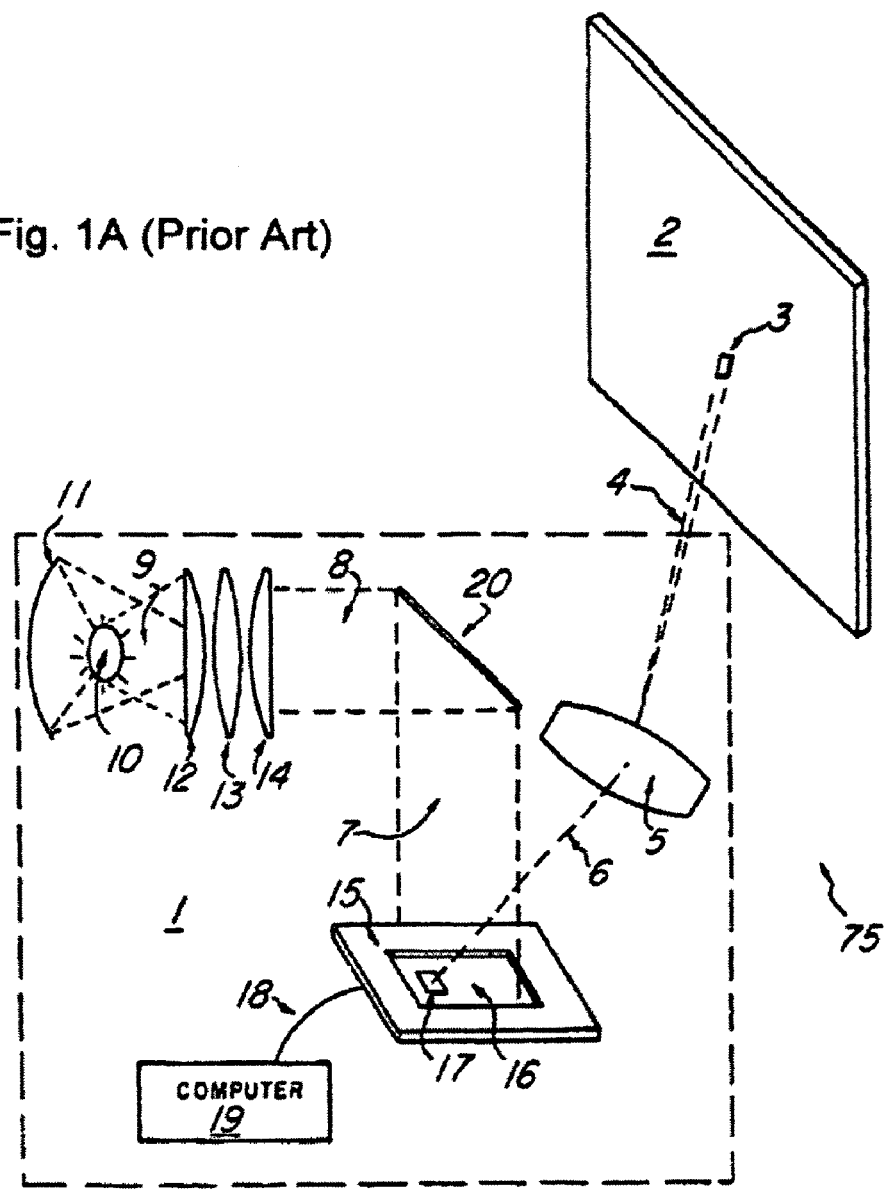
FIG. 1A illustrates the basic principle of a projection display using a micromirror device.
Figure 1B:
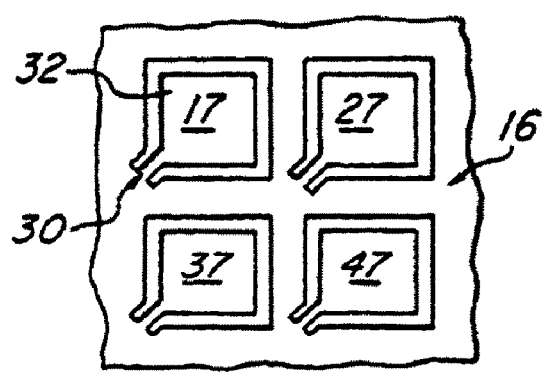
FIG. 1B illustrates the basic principle of a micromirror device used for projection display.
Figure 1C:
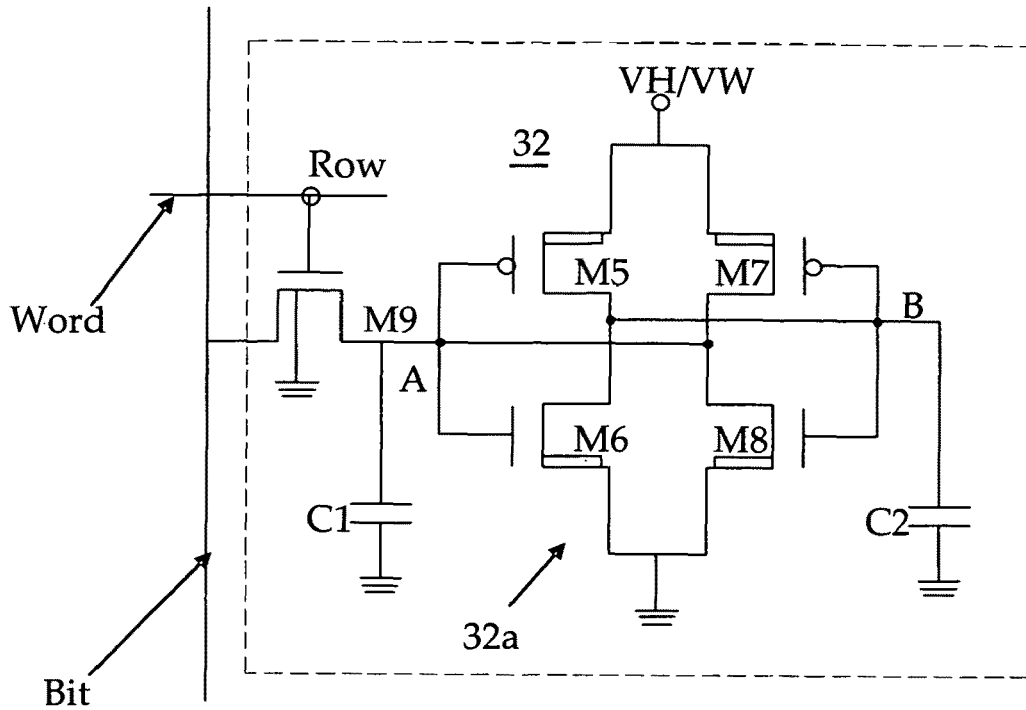
FIG. 1C shows an exemplary driving circuit of a related art.
Figure 1D:
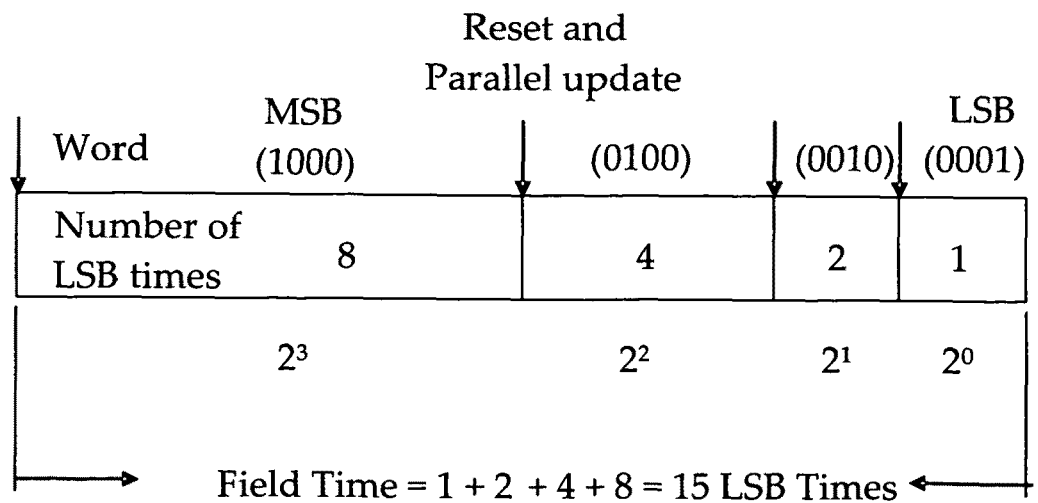
FIG. 1D shows the scheme of Binary Pulse Width Modulation (Binary PWM) of conventional digital micromirrors for generating grayscale.

Referring to FIG. 1A, plate line 232 (PL-1) is at L level (0 volts), and "0" volts of bit line 221-2 (Bitline) is applied to ON electrode 216 by means of the H level (5 volts) of word line 231 (WL-1).

Figure 11A:
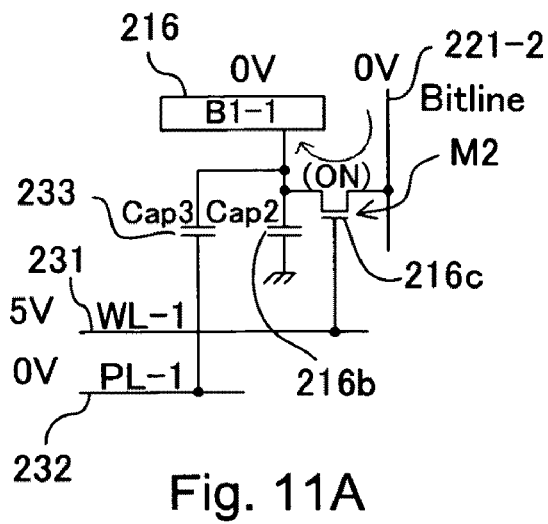
FIG. 11A is a conceptual diagram illustrating the action of a pixel unit comprised in a display system according to a preferred embodiment of the present invention.
Figure 11B:
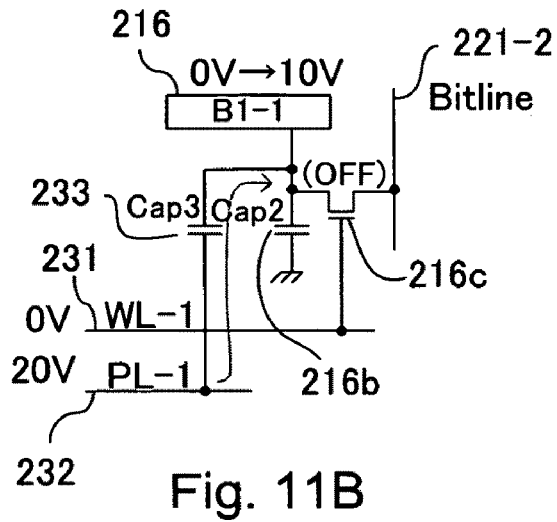
FIG. 11B is a conceptual diagram illustrating the action of a pixel unit comprised in a display system according to a preferred embodiment of the present invention.

In the transition between the states shown in shifting of the state of FIG. 11A to that of FIG. 11B, in which word line 231 (WL-1) is shifted to L level (e.g., 0 volts), the gate transistor 216c is shifted to OFF and ON electrode 216 is separated from bit line 221-2 (Bitline), shifting plate line 232 (PL-1) to H level (e.g., 20 volts), and thereby a 10-volt is applied to ON electrode 216 on the basis of the ratio of the capacitance (e.g., 1:1) of the second ON capacitor 233 (Cap 3) to that of ON capacitor 216b (Cap 2).

Figure 11C:
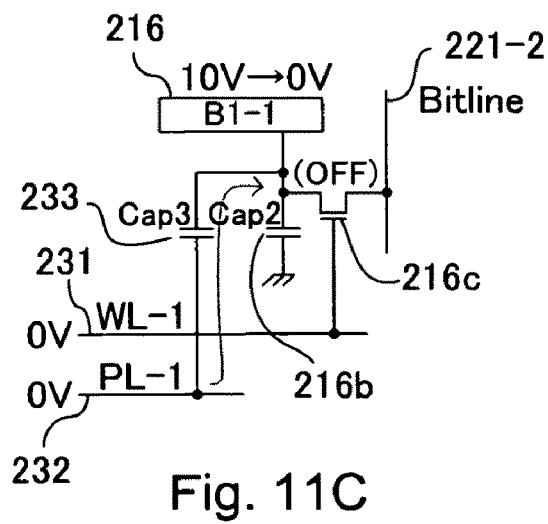
FIG. 11C is a conceptual diagram illustrating the action of a pixel unit comprised in a display system according to a preferred embodiment of the present invention.
Figure 11D:
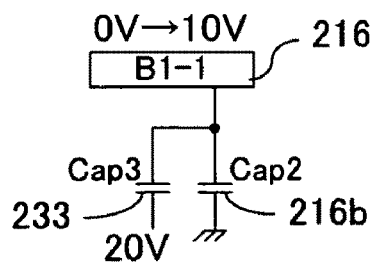
FIG. 11D is a conceptual diagram showing in greater detail the equalization circuit of FIG. 11B.

FIG. 11D shows an equivalent circuit in the state illustrated in FIG. 11B.

Referring to FIG. 11B, while word line 231 (WL-1) remains at L level (0 volts), the shifting of plate line 232 (PL-1) to L (0 volts) changes the potential of ON electrode 216 to 10 volts.

Figure 11E:
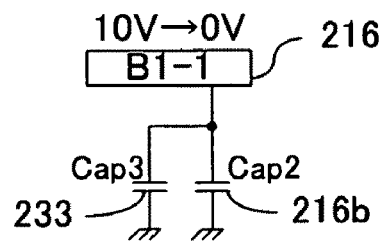
FIG. 11E is a conceptual diagram showing in greater detail the equalization circuit of FIG. 11C.

FIG. 11E shows an equivalent circuit in the state illustrated in FIG. 11C.

The above description has illustrated one case of Cap 2=15 femto farad (fF) and Cap 3=15 fF; if Cap 2 is only the floating capacitance Cf of gate transistor 216c, a voltage close to the potential of plate line 232 (PL-1) will be applied to ON electrode 216.

Figure 12A:
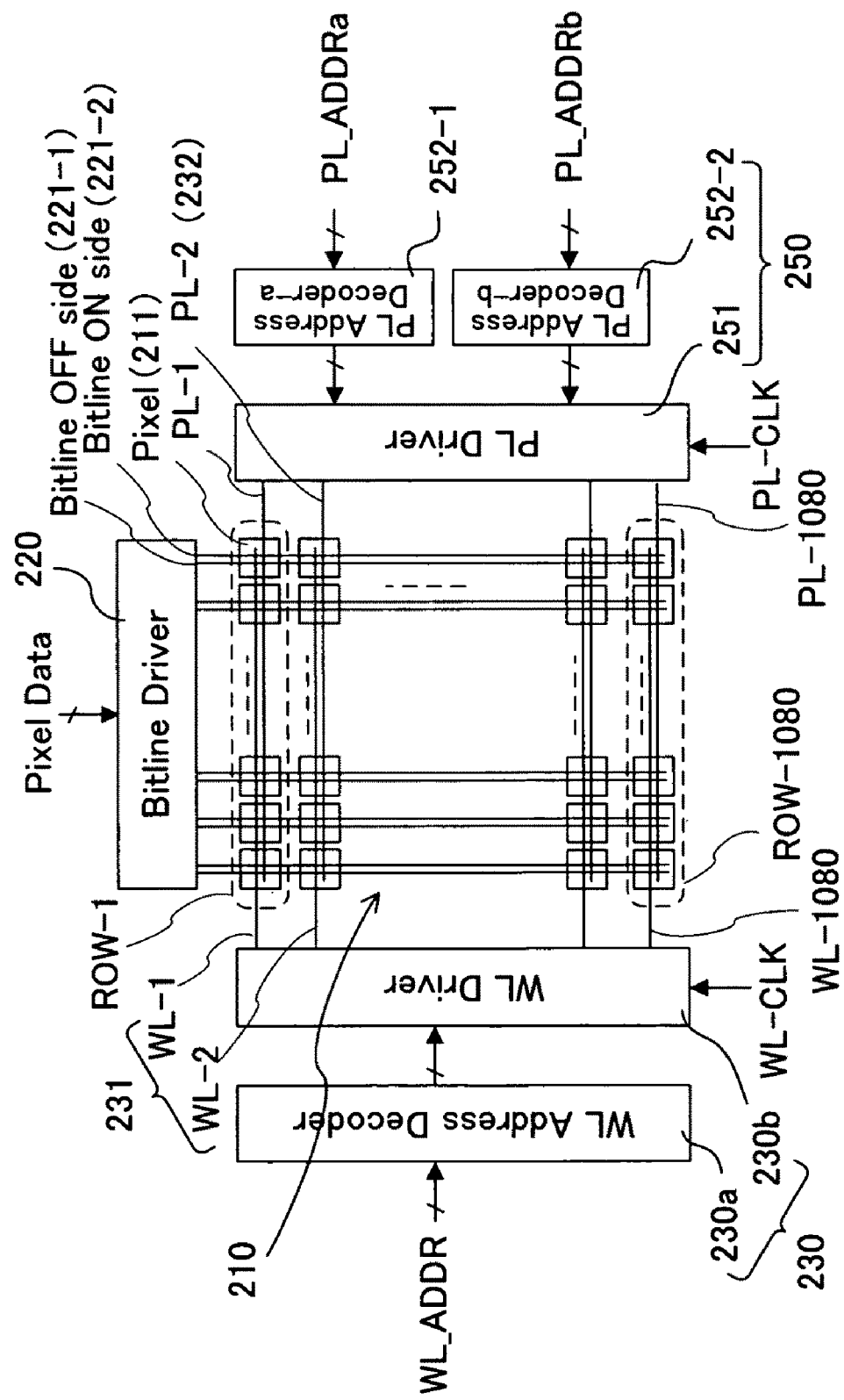
FIG. 12A is a conceptual diagram illustrating the placement of the peripheral circuit of a pixel array comprised in a display system according to a preferred embodiment of the present invention.

FIG. 12A illustrates a configuration placing the control circuit of pixel array 210 that arranges pixel units 211 as shown in the above described FIG. 10A.

In order to control plate line 232, which is added to the configuration of pixel array 210, as illustrated in the above described FIG. 3, a plate line driver unit 250 is added.

That is, the present embodiment is configured so that a plate line driver unit 250 is added to the area near pixel array 210, in addition to the provision of bit line driver part 220 and word line driver unit 230.

Word line driver unit 230 comprises a first address decoder 230a and a word line driver 230b, which are used for selecting word lines 231 (WL).

Plate line driver unit 250 comprises a plate line driver 251, and plate line address decoders 252-1 and 252-2, all of which are used for selecting plate lines 232 (PL).

Each pixel unit 211 is connected to bit lines 221-1 and 221-2 of the bit line driver unit 220 (bit line driver) so that data is written to pixel units 211, which belongs to the ROW line selected by a word line 231 (WL).

For a word line 231 (WL), externally input serial data WL_ADDR1 is made parallel to the first address decoder 230a (WL Address Decoder) and is changed to a required voltage by word line driver 230b (WL Driver).

ON electrode 216 of an individual pixel unit 211 is controlled by plate line 232 (PL) separately from word line 231 (WL-1), and, for plate line 232 (PL), externally input serial data PL_ADDRa and PL_ADDRb are made parallel to plate line address decoders 252-1 (PL Address Decoder-a) and 252-2 (PL Address Decoder-b), respectively, so that either value is converted by plate line driver 251 (PL Driver) to the required voltage.

Here, the number of ROM lines comprising multiple pixel units 211 on one horizontal line can be, for example, 720 lines or more.

In such a case, each data signal input to memory cells M1 and M2 from the bit line 221-1 and 221-2, respectively, is transmitted to individual pieces of memory on one ROW line at the speed of 23 nanoseconds (nsec.) or slower.

That is, in order to process 720 ROW lines by dividing and assigning a display period into four colors (red (R), green (G), blue (B) and white (W)) at the rate of 60 frames per second, with each color in 256-bit gray scale, the transmission speed is as follows:

1/60 [sec]/4 [divisions]/256 [bit gray scale]/720 [lines]=22.6 nsec.

Furthermore, in order to process 1080 ROW lines by dividing and assigning a display period into three colors (R, G and B) at the rate of 60 frames per second, with each color in 256-bit gray scale, the transmission speed is as follows:

1/60/3/256/1080=20 nsec.

Figure 12B:
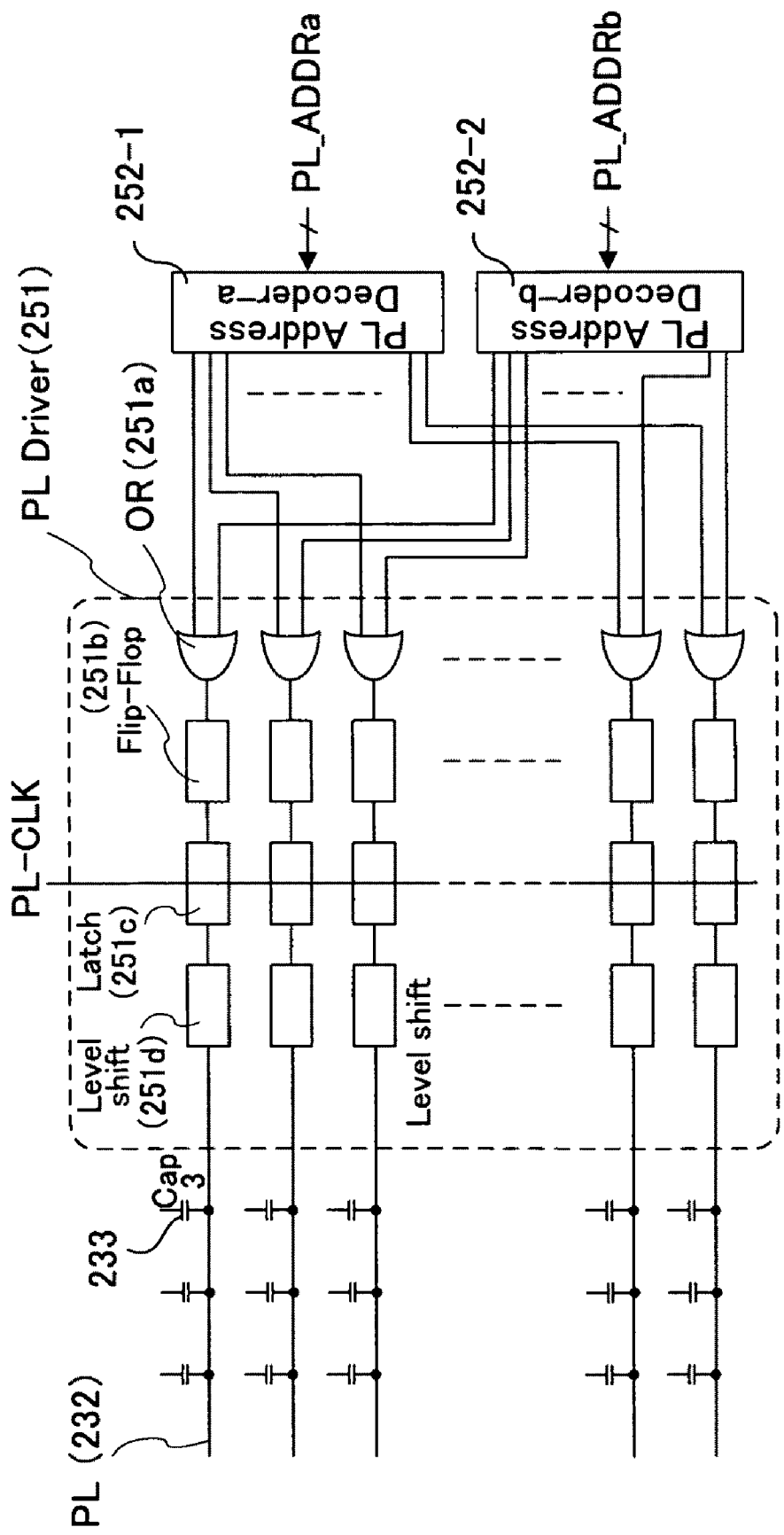
FIG. 12B is a conceptual diagram illustrating the internal configuration of a plate line driver (PL Driver) shown in FIG. 12A.

FIG. 12B is a conceptual diagram illustrating the internal configuration of plate line driver 251 (PL Driver) shown in the above described FIG. 12A.

The internal configuration of plate line driver 251 (PL Driver) comprises circuits provided to correspond to plate lines 232 (PL).

In plate line driver 251, an OR circuit 251a is equipped at the initial stage so as to enable either plate line address decoder 252-1 (PL Address Decoder-a) or plate line address decoder 252-2 (PL Address Decoder-b) to select a plate line 232 (PL).

The output of OR circuit 251a is input to flip-flop 251b (Flip-Flop) and the output value is retained therein.

Then, the output value is latched at latch 251c (Latch) with a WL-CLK in order to synchronize with bit line driver part 220 (bit line driver). It is then converted by level shift circuit 251d (Level shift) into the required voltage for applying to ON electrode 216.

Figure 12C:
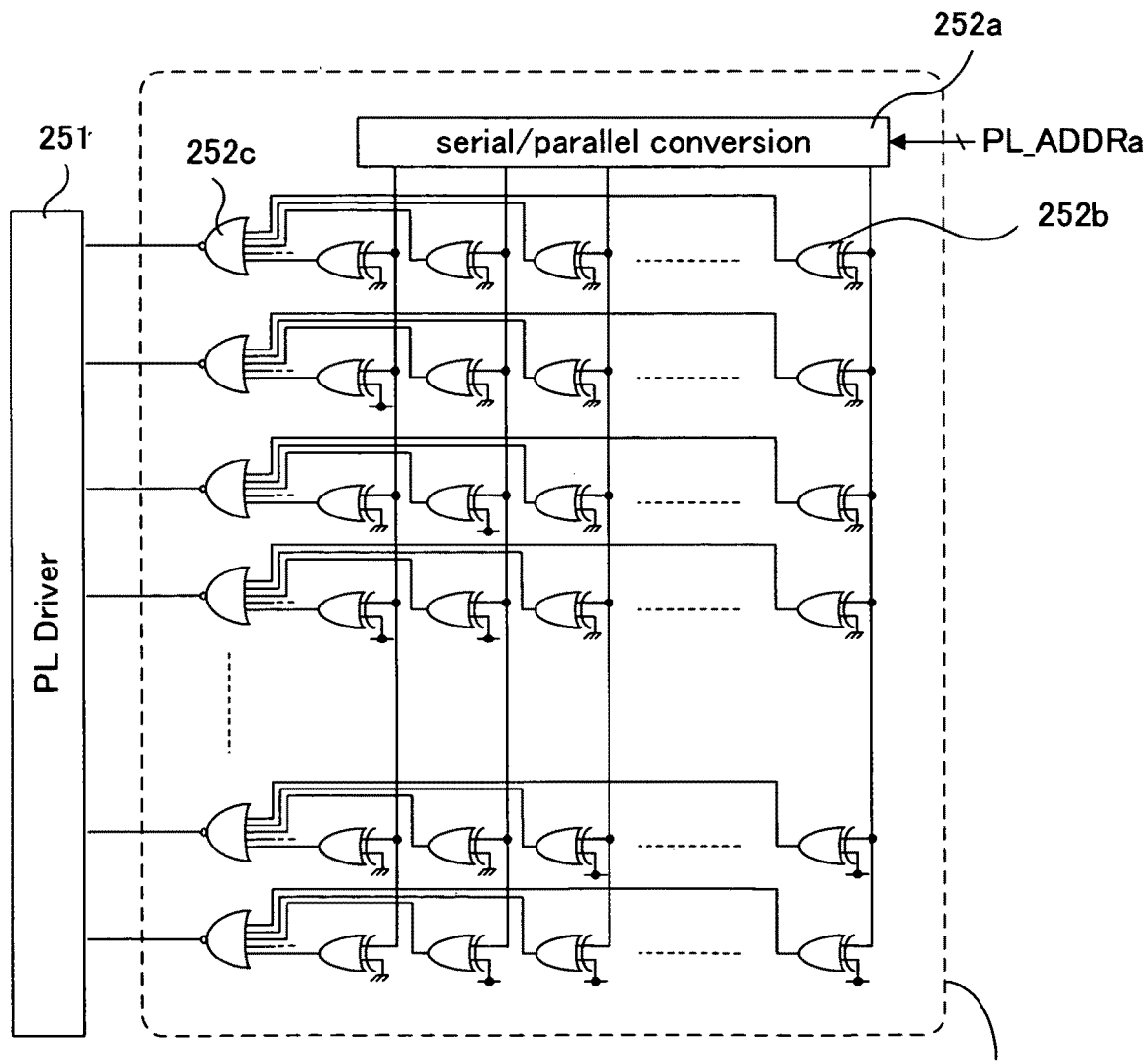
FIG. 12C is a conceptual diagram illustrating the internal configuration of a plate line address decoder (PL Address Decoder-a) shown in FIG. 12A.

FIG. 12C illustrates the internal configuration of the plate line address decoder 252-1 (PL Address Decoder-a) shown in the above described FIG. 12A.

Plate line address decoder 252-1 comprises 1) a serial-parallel conversion circuit 252a for the serial-to-parallel conversion of an external serially input address signal (PL_AD-DRa) into the number of bits of plate lines 232, and 2) an address detection unit includes EXOR circuits 252b and NOR circuits 252c, all of which are implemented for the number of bits of PL_ADDRa.

An externally input address signal (PL_ADDRa) is serial-to-parallel converted by serial-parallel conversion circuit 252a and is inputted in parallel to the respective EXOR circuits 252b.

If a plate line (PL) is the same as a plate line 232 (PL) selected by the parallel-converted value, the present PL is selected by the address detection unit (i.e., the EXOR circuit 252b and NOR circuit 252c) corresponding to individual plate line 232.

Although not specifically shown in a drawing, the internal configurations of plate line address decoder 252-2 (PL Address Decoder-b) and the first address decoder 230a (WL Address Decoder) can be similar to that of the above described plate line address decoder 252-1.

Figure 12D:
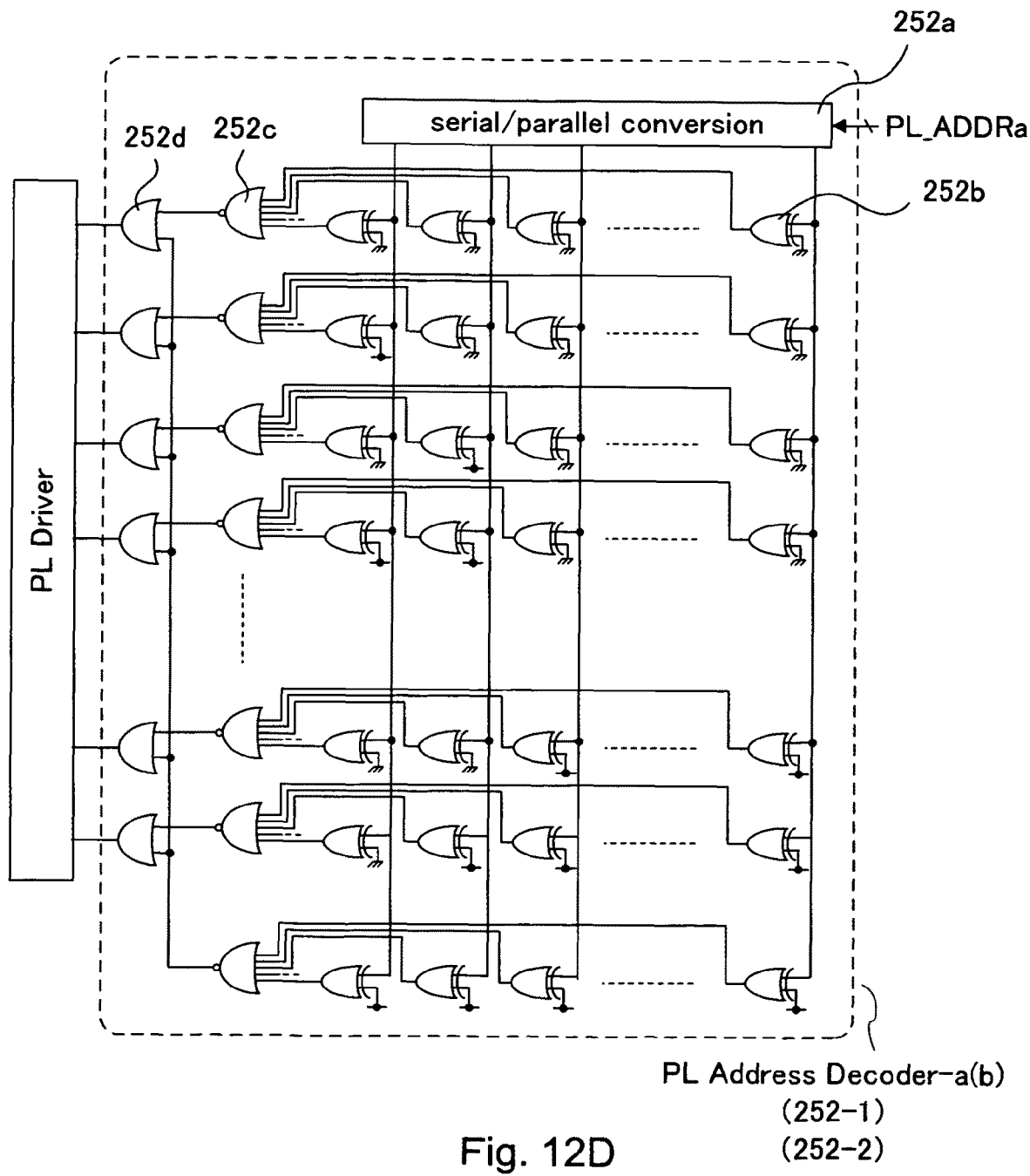
FIG. 12D is a conceptual diagram showing a possible modification configured by adding a function to the plate line address decoder (PL Address Decoder-a) shown in FIG. 12C.

FIG. 12D is a diagram showing an exemplary modification configured by adding a function to the address decoder shown FIG. 12C as described above.

If the number of plate lines 232 (PL) is, for example, 1080, the bit width required for the serial input of the PL_ADDRa is 11 bits. In this case, there is a surplus of 967 (=2047 (i.e., 11 bits)−1080).

Then, if there is an address input (PL_ADDRa) of 1080 or more, those addresses are detected and all plate lines 232 (PL) are selected in this case, and thereby reset operations of pixel unit 211 can be performed.

For this purpose, FIG. 12D shows a circuit that further includes an OR circuit 252d for taking the logic sum of the outputs of all address detection units, in addition to being equipped with the address detection units (i.e., the EXOR circuits 252b and NOR circuits 252c) corresponding to surplus address values.

This circuit as shown can detect surplus address(es) if there is an input of 1080 addresses or more and to select all plate lines 232 (PL) at the OR circuit 252d, thereby enabling a reset operation of pixel unit 211.

Figure 12E:
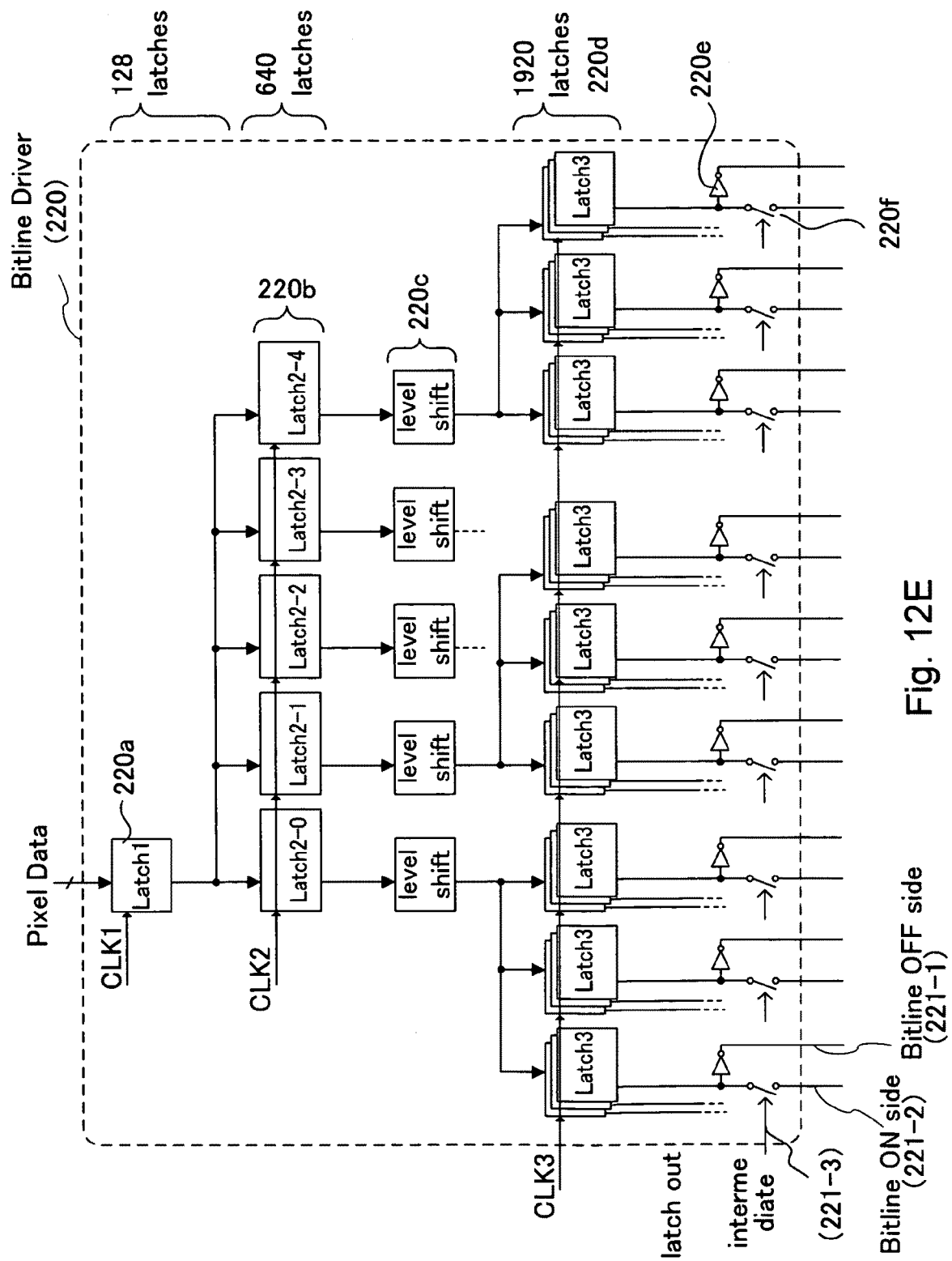
FIG. 12E is a diagram illustrating the internal configuration of a bit line driver unit (Bitline Driver) shown in FIG. 12A.

FIG. 12E is a diagram illustrating the internal configuration of bit line driver unit 220 (Bitline Driver) shown in the above described FIG. 12A.

Bit line driver unit 220, according to the present embodiment, comprises a first stage latch 220a, a second stage latch 220b, a level shift circuit 220c, a third stage latch 220d, an inverter 110e, and a mode changeover switch 220f.

The inverter 110e and mode changeover switch 220f function as a column decoder for controlling bit lines 221-1 and 221-2.

That is, inverter 220e logically inverts the output (latch out) from third stage latch 220d to branch out as a bit line 221-1, while mode changeover switch 220f turns ON/OFF the latch out output to the pre-branched bit line 221-2.

If one ROW is, for example, 1920 bits, bit line driver part 220 receives an external input that is 15 times 128-bit pixel data.

Bit line driver part 220 latches this volume of data in three stages as follows:

First stage: 128 latches (at the first stage latch 220a)
↓
Second stage: 640 latches (at the second stage latch 220b)
↓
Voltage conversion (level shift) (at the level shift circuit 220c)
↓
Third stage: 1920 latches (at the third stage latch 220d)

As such, after performing 1920 latches at the third stage latch 220d, and when the data is sent to the ON side (i.e., the bit line 221-2) and OFF side (i.e., the bit line 221-1) of the bit line, the respective logic states of bit line 221-1 and bit line 221-2 are determined by a judgment logic on the basis of the truth table shown in FIG. 12F.

Figure 13:
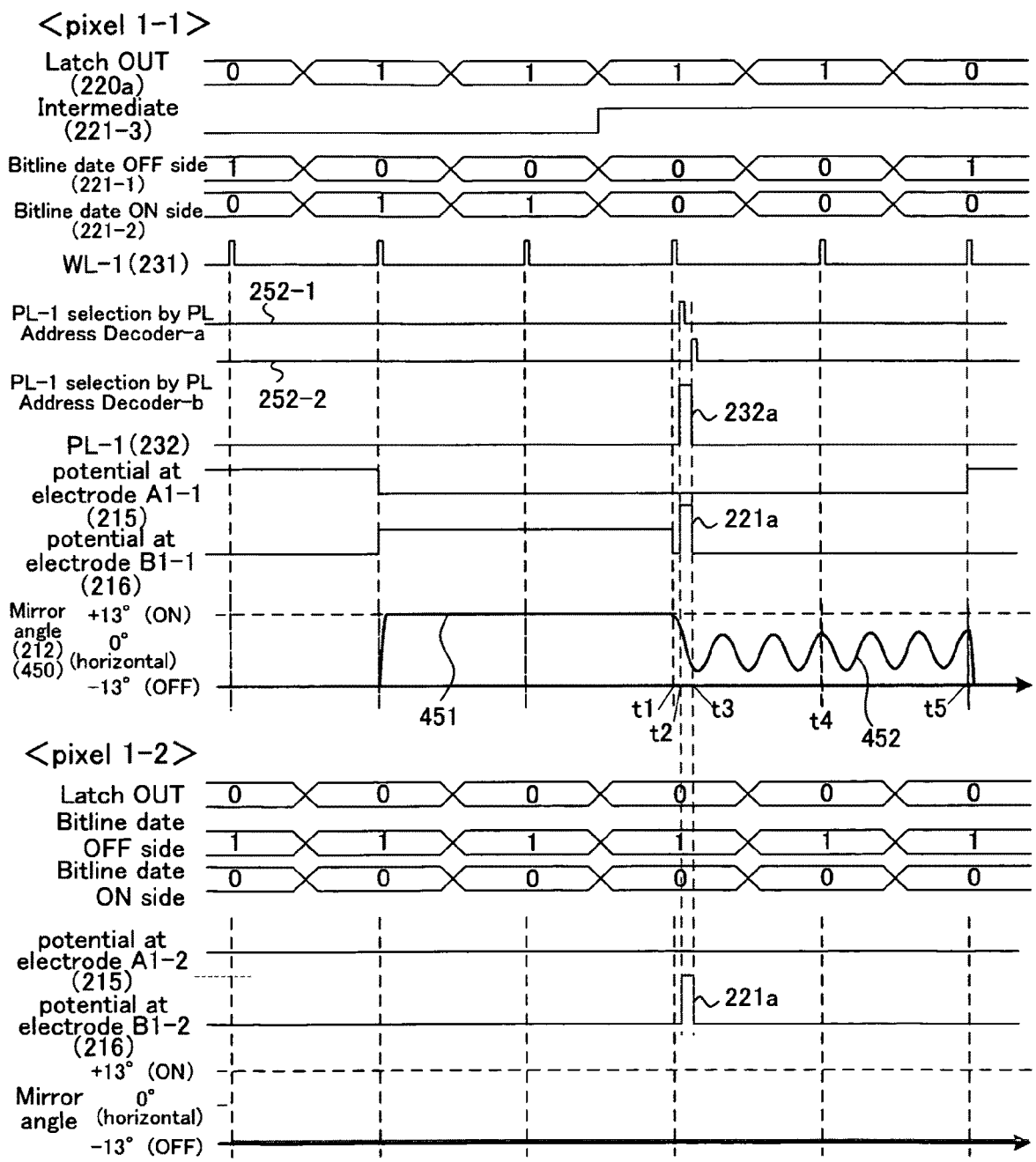
FIG. 13 is a timing chart illustrating the operation of a pixel array of the configuration shown in FIG. 10A.

FIG. 13 is a timing chart depicting the relationship between (i) and (ii), where (i) is the operation timing of the <pixel 1-1> (i.e., pixel unit 211) and <pixel 1-2> (i.e., pixel unit 211) belonging to the same ROW line, and (ii) is the behavior of mirror 212 in pixel array 210 shown in the above described FIG. 10A.

In this case, the respective display states of the two pixel units 211 are a gray display for the <pixel 1-1> and a black display for the <pixel 1-2>.

The <pixel 1-1> and <pixel 1-2> belong to the same ROW line and therefore the mode changeover signal 221-3 (Intermediate), word line 231 (WL-1), and plate line 232 (PL-1) are common signals.

In the example shown in FIG. 13, the signal (WL) on a word line 231 operates during a predetermined interval (i.e., one cycle of an interval between a control timing t1 and a control timing t4 in this case) in order to carry out the selection control of bit line 221-1 and bit line 221-2.

In contrast, the signal (PL) on plate line 232 operates during an interval (i.e., control timing t1 and control timing t2) that is shorter than one cycle of the signal (WL) on a word line 231.

For example, the signal (PL) operates at two consecutive times (refer to the changes in the potentials 232a that is turned ON with the pulse of plate line address decoder 252-1 and turned OFF with the pulse of plate line address decoder 252-2) within the period of one cycle of word line 231 in the example shown in FIG. 13.

Therefore, the transmission speed (i.e., the frequency) of a signal on plate line 232 is faster than the transmission speed (i.e., the frequency) of a signal on word line 231.

Until control time t1, the mirror 212 of the <pixel 1-1> is stationarily deflected to the side of ON electrode 216 if the Latch OUT (i.e., the output of the third stage latch 220d) is "1" and to the side of OFF electrode 215 if the Latch OUT is "0". That is, until control time t1, the operation of mirror 212 is controlled by means of a pulse width modulation (PWM) in accordance with a PWM control profile 451.

Immediately prior to control time t1, mirror 212 is stationarily deflected to the side of ON electrode 216; then, at control time t1, the mode changeover signal 221-3 (Intermediate) is turned to be "H", and (although the latch OUT is "1") OFF electrode 215 and ON electrode 216 are turned to be "0" volts, prompting mirror 212 to start a free oscillation.

At control time t2, plate line 232 (PL-1) is selected by plate line address decoder 252-1 (PL Address Decoder-a) and PL-1 is turned to be an H level potential 232a (i.e., a potential higher than the H level potential 221a of bit line 221 (bit line).

At control time t3, plate line 232 (PL-1) is selected by plate line address decoder 252-2 (PL Address Decoder-b) and plate line 232 is turned to be L level.

During the period between control time t2 and t3, mirror 212 is drawn back to the side of ON electrode 216 and starts an intermediate oscillation (OSC) as shown by an intermediate oscillation control profile 452.

Then, at control time t5, after control time t4, an "H" is set by bit line 221-1 (Bitline) at the side of OFF electrode 215, and mirror 212 is drawn to OFF electrode 215 to be stationary in the OFF state.

Meanwhile, the mirror 212 of the <pixel 1-2> must be continuously stationary on the side of OFF electrode 215, in order to display black.

Plate line 232 (PL-1) is common to the <pixel 1-2> and <pixel 1-1>, and therefore during the period between control time t2 and t3, a voltage (i.e., potential 221a) is generated at ON electrode 216. However, mirror 212 is stationary on the OFF side and the distance between ON electrode 216 and mirror 212 is far, and therefore the Coulomb force applied to the mirror 212 is weak and the position thereof will not be changed.

Note that the interval between control time t1 and t2 (i.e., a predetermined delay time) can be set to be the same (i.e., constant) within one frame.

Furthermore, the above described predetermined delay time can be determined by the intensity of illumination light or the quantity of reflection light of mirror 212 of a pixel unit 211.

Note that, in FIG. 13, the intermediate oscillation starts at a PWM ON. If it starts at OFF, the method comprises 1) connecting plate line (232) to the memory on the OFF side, 2) connecting the capacitor of the ON side memory to the ground, 3) setting the potential of the electrode A1-1 at "H" and the potential of the electrode B1-1 at "L" at the timing t1, and 4) applying a voltage to the electrode A1-1 from the plate line (232) at control time t2 and t3.

Figure 14:
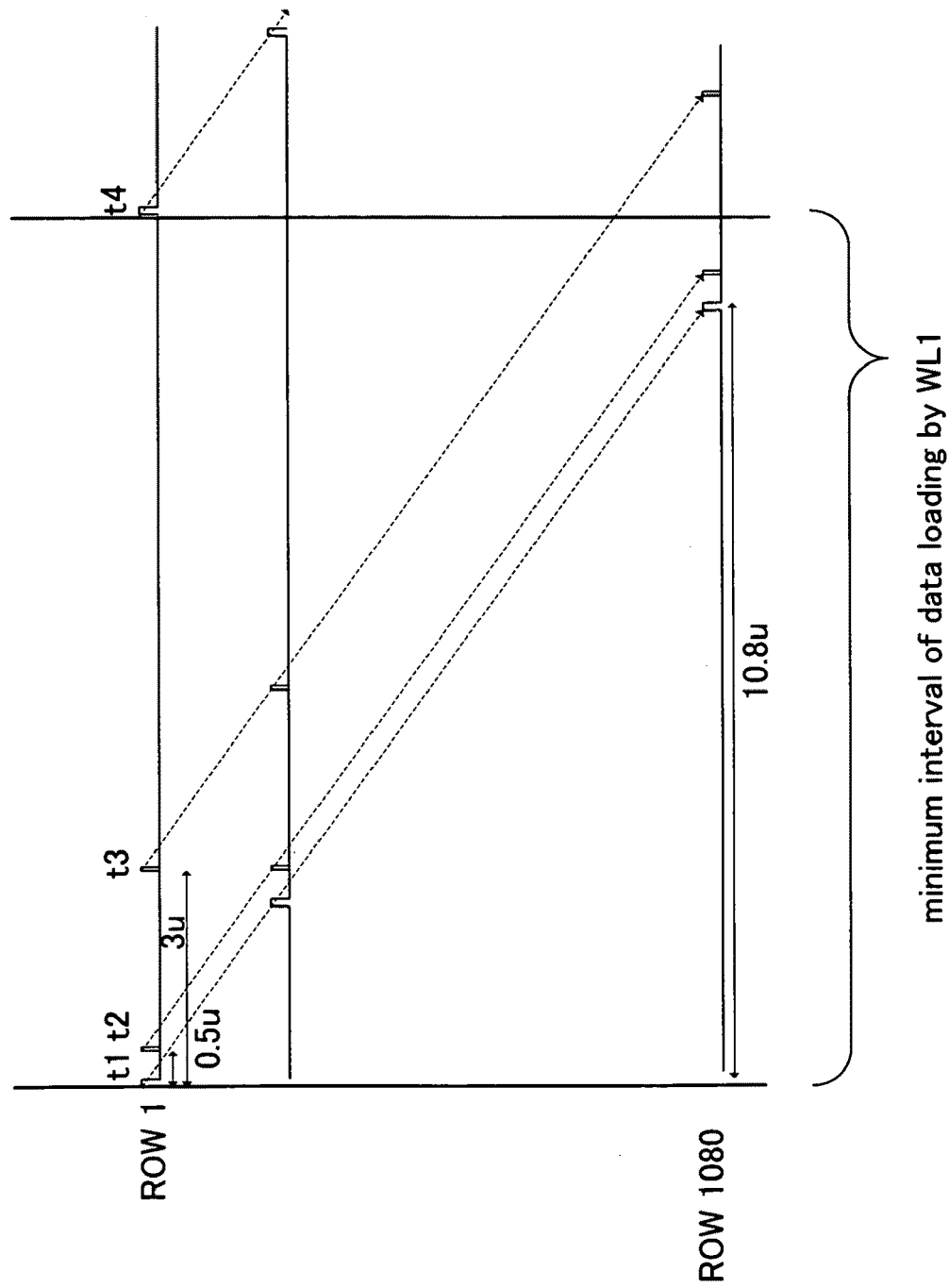
FIG. 14 is a timing chart of the address decoder for the ROW lines shown in FIG. 12A.

FIG. 14 is a timing chart of the ROW lines and address decoder which are shown in FIG. 12A.

In FIG. 14, control times t1, t2, t3, and t4 correspond to times t1 through t4 as shown in FIG. 13.

On ROW 1, at control time t1, word line 231 (WL-1) carries out data loading and then first address decoder 230a (WL_ADDR1) selects ROW 2, 3, 4 through 1080 sequentially to carry out data loading.

At control time t2, plate line address decoder 252-1 (PL_ADDRa) selects plate line 232 (PL-1).

Plate line address decoder 252-1 (PL_ADDRa) selects PL-2, 2-3, 2-4 through 2-1080 sequentially.

At control time t3, plate line address decoder 252-2 (PL_ADDRb) selects plate line 232 (PL-1).

Plate line address decoder 252-2 (PL_ADDRb) selects PL-2, 2-3, 2-4 through 2-1080 sequentially.

As such, the control of the intermediate oscillation of all ROW lines is enabled in the minimum interval (i.e., during the period between control time t1 and t4) of data loading performed by word line 231 (WL).

Figure 15:
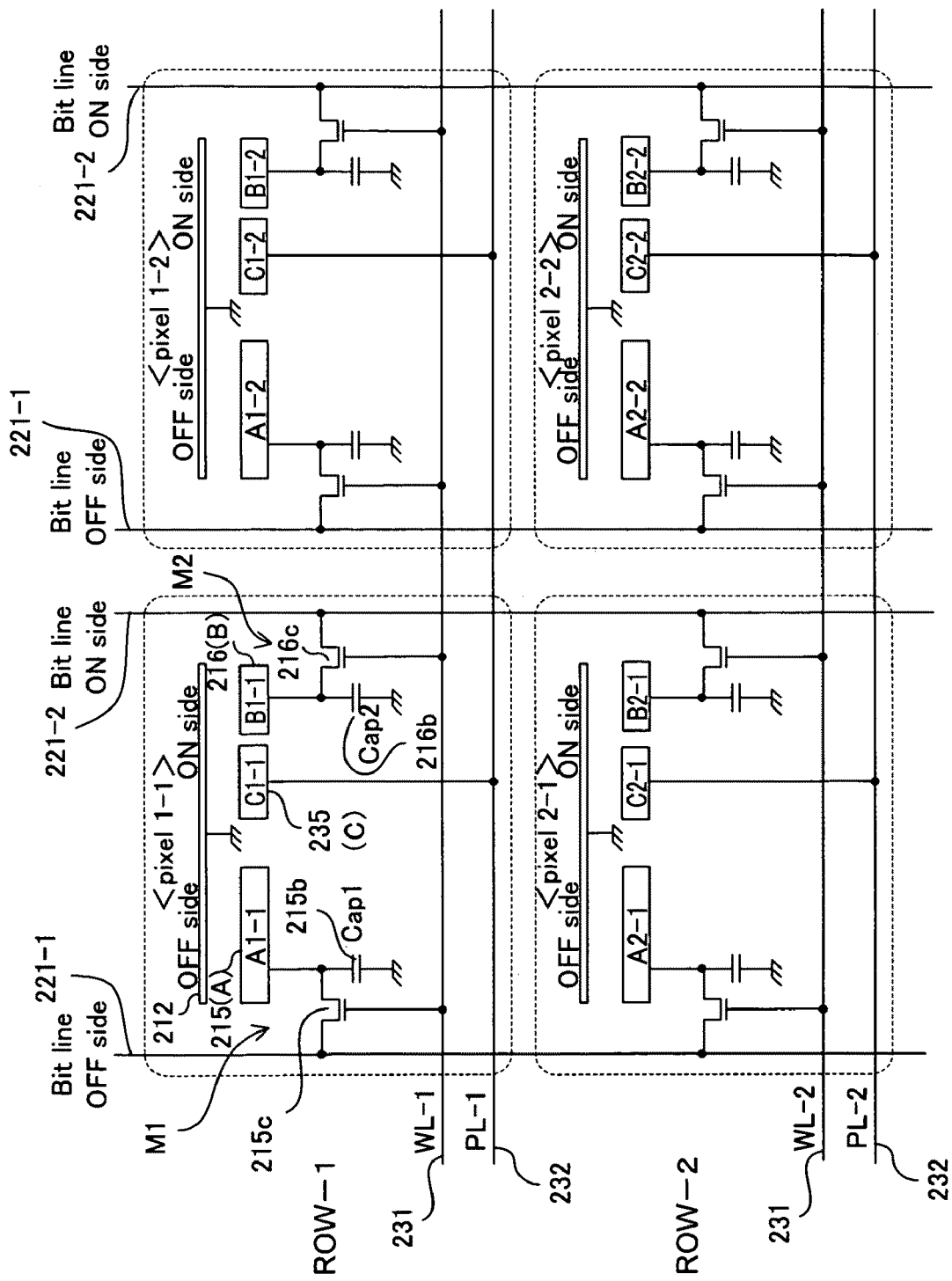
FIG. 15 is a conceptual diagram showing another possible modification of the pixel unit shown in FIG. 10A.

FIG. 15 is a conceptual diagram showing another possible modification of pixel unit 211.

FIG. 15 shows a second ON electrode 235 (i.e., an electrode C) connected directly to plate line 232, in addition to comprising the ON electrode 216 (i.e., the electrode B).

That is, in contrast to the configuration of controlling ON electrode 216 by means of plate line 232 (PL), as shown in the above described FIG. 12A (in which two electrodes, that is, OFF electrode 215 and ON electrode 216, are equipped for one pixel) pixel unit 211, as shown in FIG. 15, has a second ON electrode 235 (i.e., an electrode C) and connects plate line 232 (PL) directly to the electrode C without the intervention of a circuit element.

The drive circuit for pixel unit 211 shown in FIG. 15 is the same as that shown in FIG. 12A.

Figure 15A:
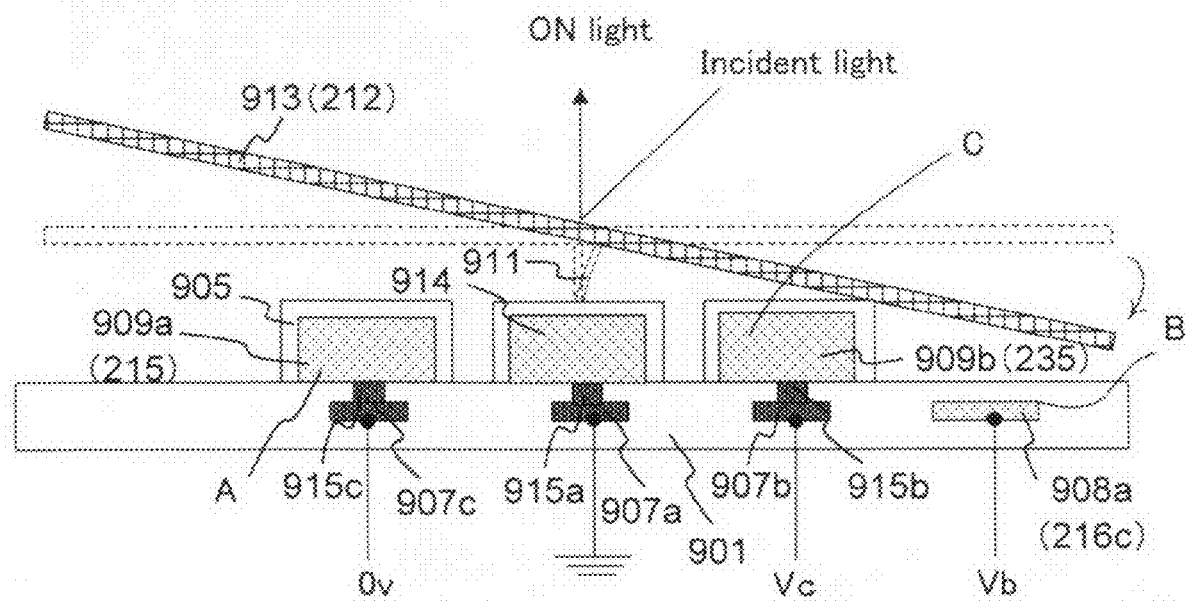
FIG. 15A is a cross-sectional diagram of a pixel unit in an ON state comprising two electrodes, i.e., an ON electrode and a second ON electrode, on the ON side shown in FIG. 15.
Figure 15B:
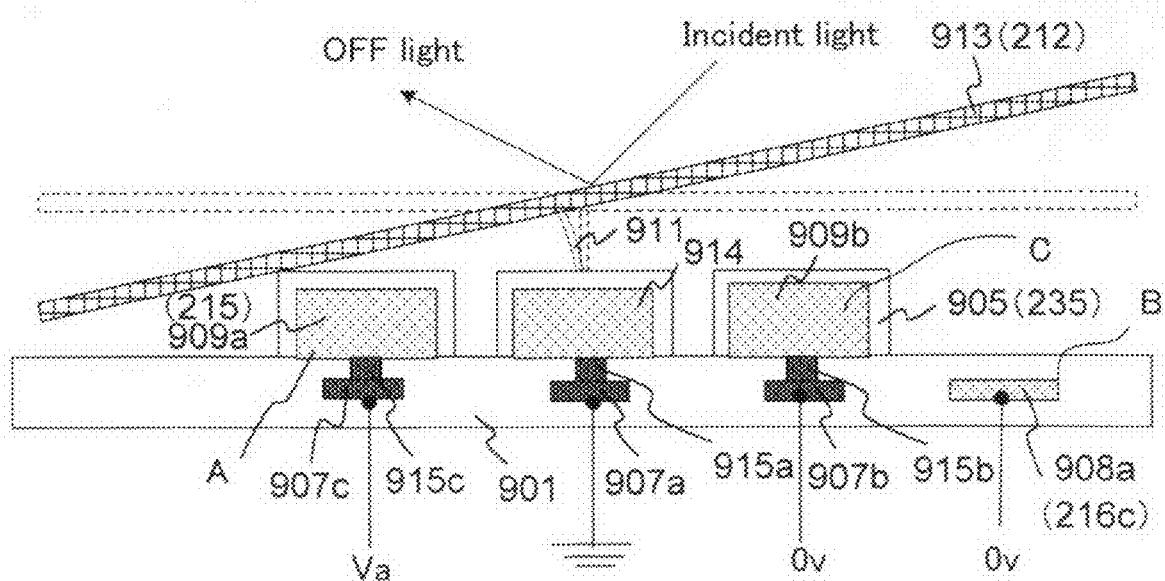
FIG. 15B is a cross-sectional diagram of a pixel unit in an OFF state comprising two electrodes, i.e., an ON electrode and a second ON electrode, on the ON side shown in FIG. 15.

FIGS. 15A and 15B are cross-sectional diagrams of a pixel unit 211, in an ON state and an OFF state, respectively, comprising two electrodes, i.e., an ON electrode 216 and a second ON electrode 235, on the ON side illustrated in FIG. 15.

Note that the delineation symbols used in FIGS. 15A and 15B are the same as those described in FIG. 8A.

Figure 15C:
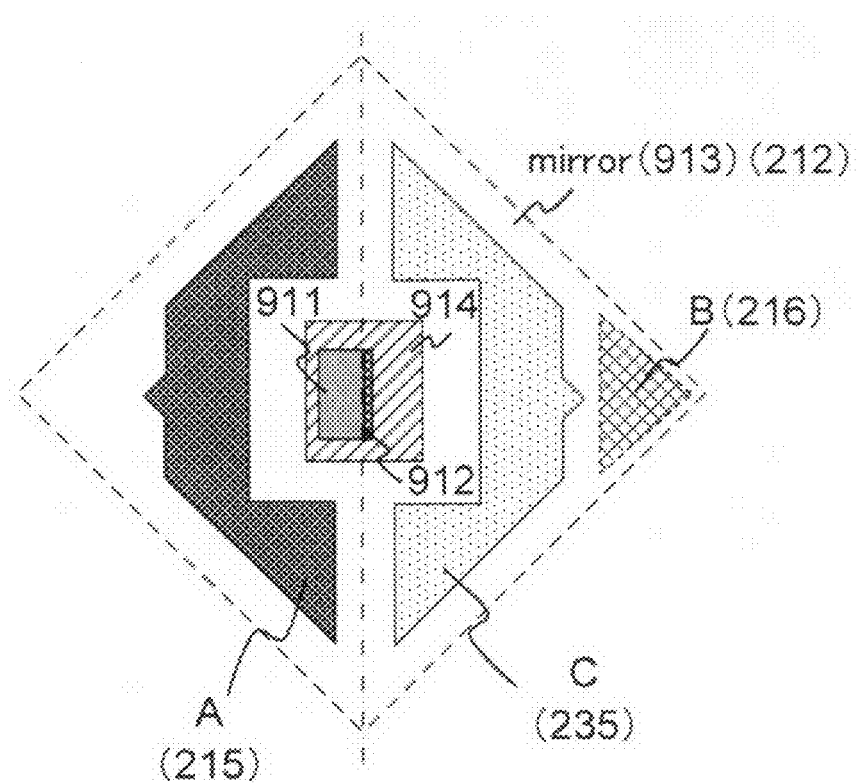
FIG. 15C is a plain view diagram showing a possible layout of the second ON electrode that is added to the pixel unit shown in FIG. 15.
Figure 15D:
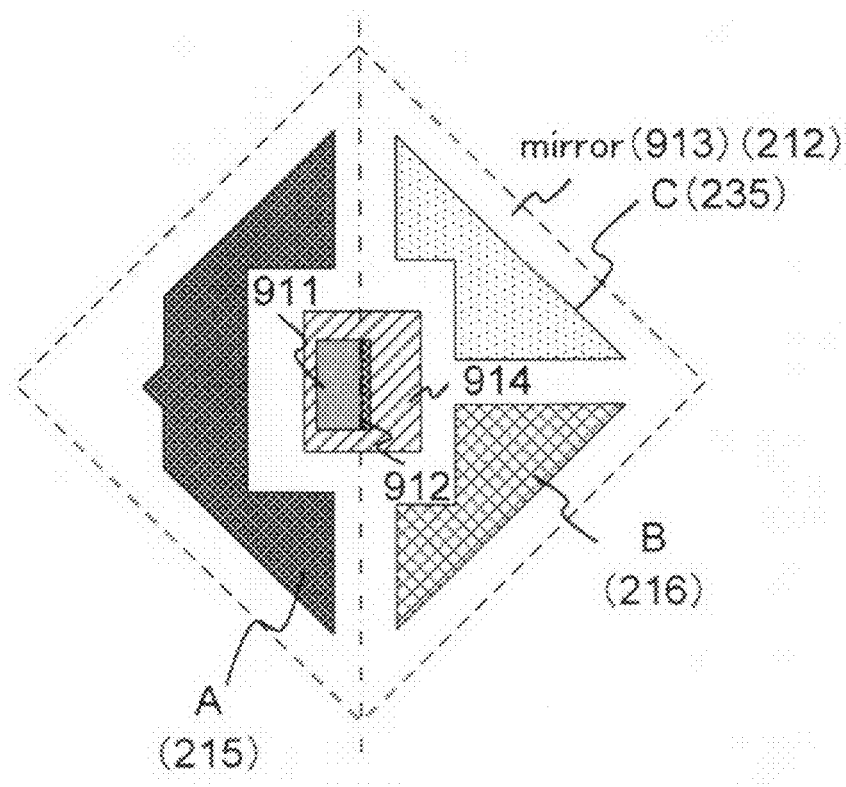
FIG. 15D is a plain view diagram showing another possible layout of the second ON electrode that is added to the pixel unit shown in FIG. 15.

FIGS. 15C and 15D are plain view diagrams showing possible layouts of the added second ON electrode.

The configuration of FIG. 15D shows surface electrodes 909b and 908a, which includes the ON electrode 216 in the configuration shown in the above described FIG. 8B, electrically mutually independent and connected to plate line 232 (PL), and thereby the function of the second ON electrode 235 (i.e., the electrode C) is achieved.

Furthermore, FIG. 15D shows a configuration in which surface electrode 908a, of surface electrodes 909b and 908a of above described FIG. 8C, is eliminated and the area of surface electrode 909b is enlarged and divided into two parts. Thereby the function of ON electrode 216 (i.e., the electrode B) and second ON electrode 235 (i.e., the electrode C) are achieved.

Figure 15E:
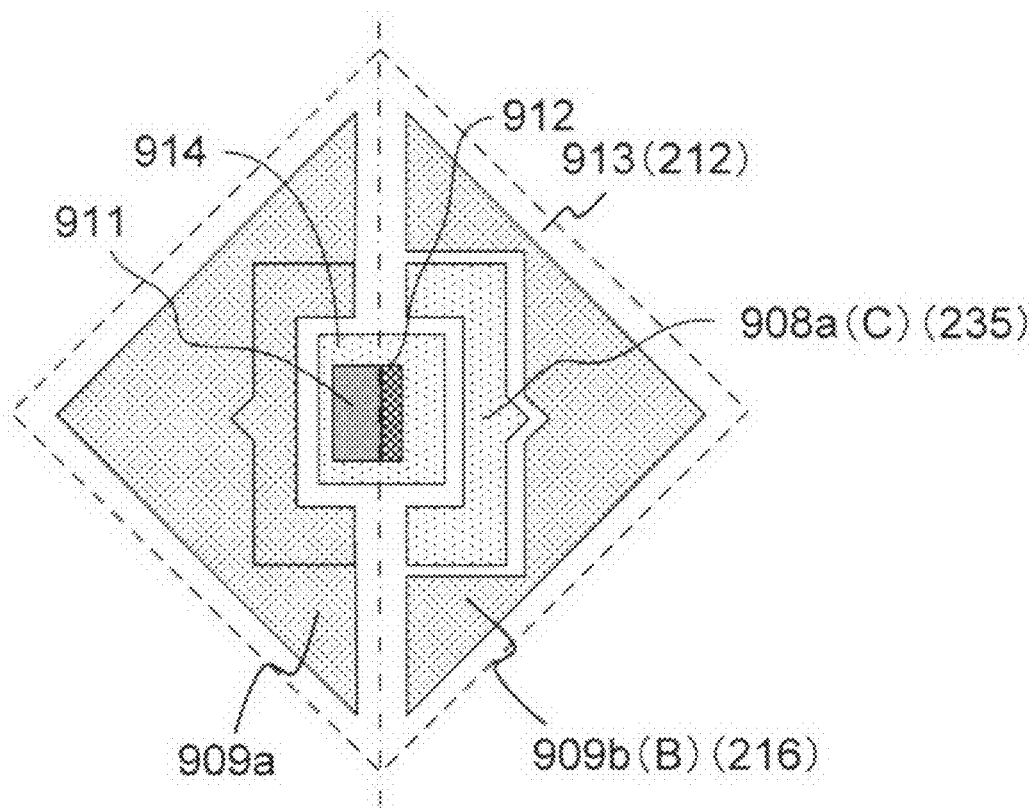
FIG. 15E is a plain view diagram showing another possible layout of the second ON electrode that is added to the pixel unit shown in FIG. 15.
Figure 15F:
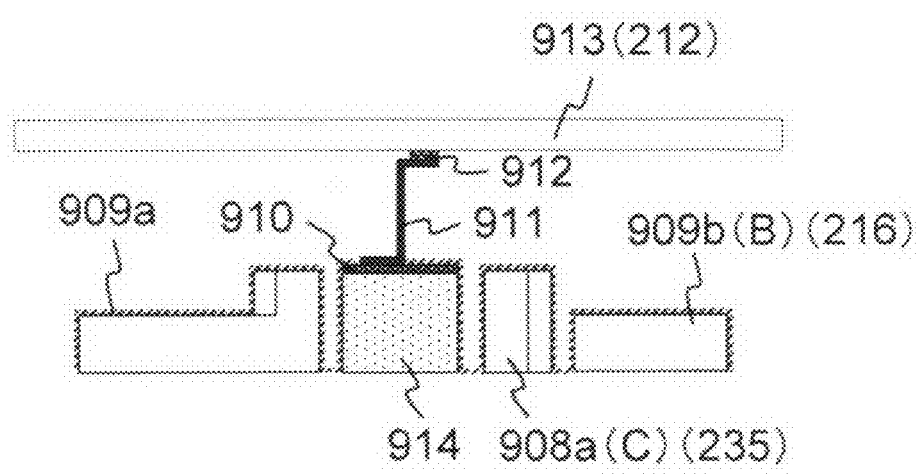
FIG. 15F is a plain view diagram showing another possible layout of the second ON electrode that is added to the pixel unit shown in FIG. 15.

FIG. 15E is a plain view diagram showing another possible layout of electrode B connected to word line 231 and electrode C connected to plate line 232. FIG. 15F is a cross-sectional diagram.

Electrode C (i.e., surface electrode 908a), which is connected to plate line 232, is placed near elastic hinge 911 in a rectangular-shaped character "C" so as to surround elastic hinge 911. Additionally, electrode B, which is connected to word line 231, is placed so as to surround three sides of electrode C.

Figure 15G:
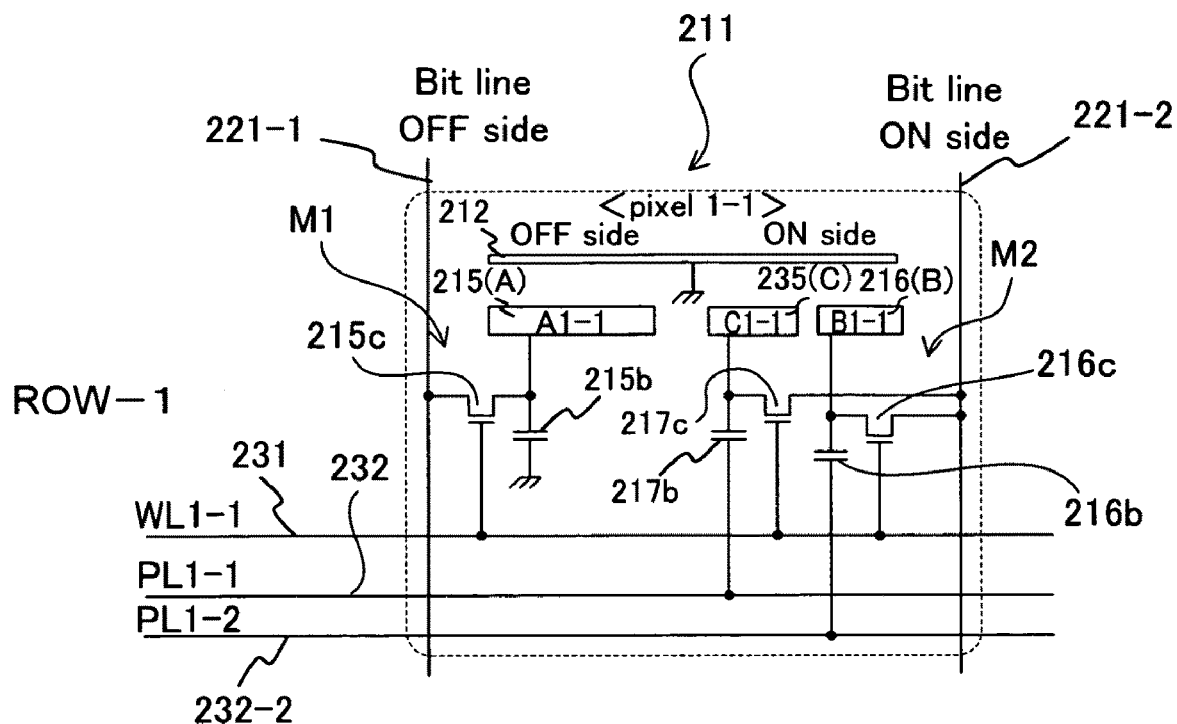
FIG. 15G is a conceptual diagram showing a modification of the memory cell on the ON side of the pixel unit shown in FIG. 15.

FIG. 15G is configured, in pixel unit 211 shown in the above described FIG. 15, with the additional of a second ON capacitor 217b and a second ON gate transistor 217c, both of which are used to control second ON electrode 235. A second plate line 232-2 is also added.

Additionally, the second ON capacitor 217b is connected to plate line 232, and the second ON capacitor 217b is also connected to the newly added second plate line 232-2.

Figure 15H:
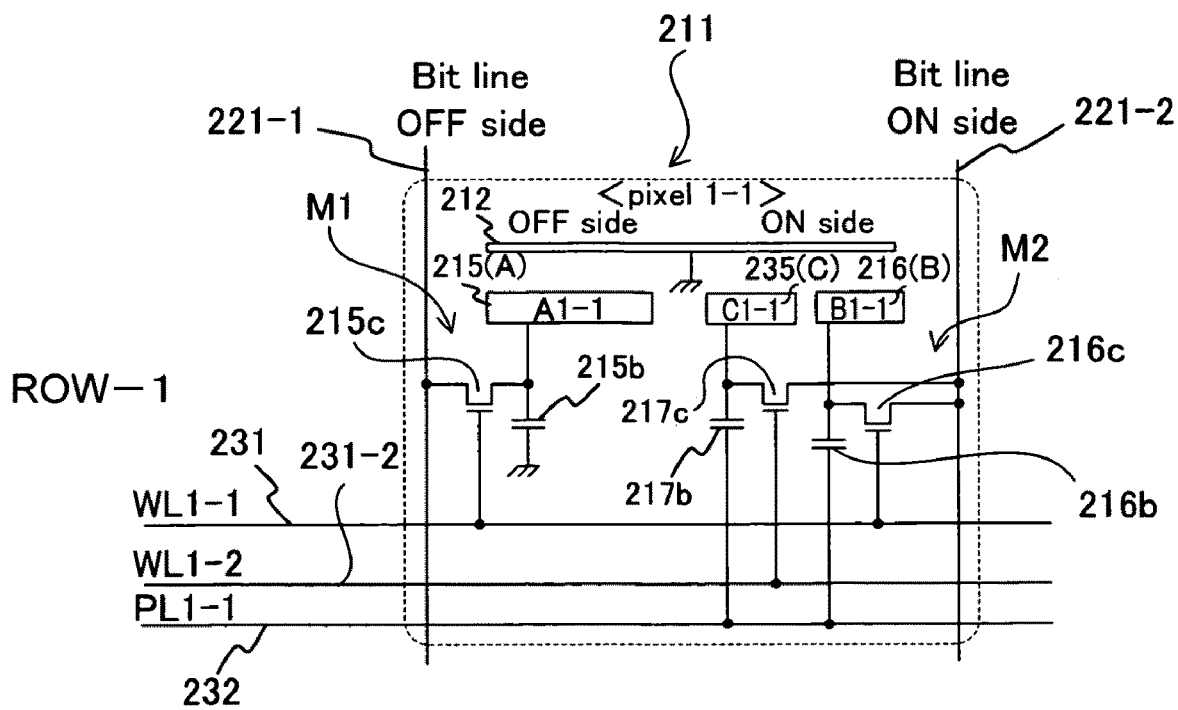
FIG. 15H is a conceptual diagram showing a modification of the connection between the memory cell on the ON side, a word line, and a plate line at the pixel unit shown in FIG. 15.

FIG. 15H differs from FIG. 15G in that the configuration of FIG. 15H is equipped with a second word line 231-2 instead of second plate line 232-2.

Furthermore, the gate of the second ON gate transistor 217 of the second ON electrode 235 is connected to, and controlled by, the second word line 231-2.

Figure 16:
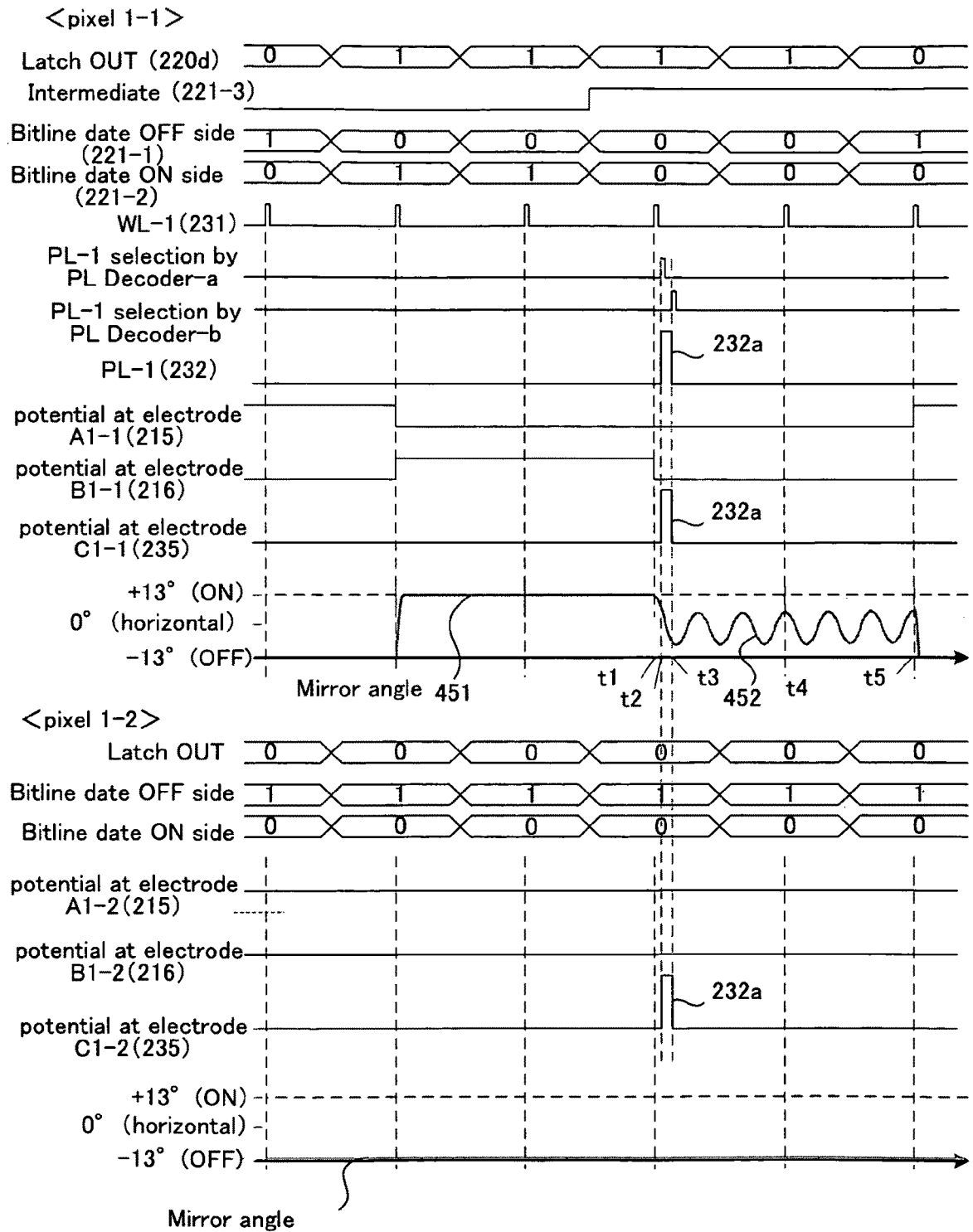
FIG. 16 is a timing chart showing the action of the pixel unit shown in FIG. 15.

FIG. 16 is a timing chart showing 1) the operation timings of the <pixel 1-1> and <pixel 1-2>, both of which belong to the same ROW line, and 2) the operation of mirror 212 in pixel unit 211, which is equipped with the second ON electrode 235 shown in the above described FIG. 15.

Additionally, the <pixel 1-1> displays gray, while the <pixel 1-2> displays black.

Since the two belong to the same ROW line, the mode changeover signal 221-3 (Intermediate), word line 231 (WL-1), and plate line 232 (PL-1) are common signals to the <pixel 1-1> and <pixel 1-2>.

In contrast to the timing chart shown in the above described FIG. 13, the chart shown in FIG. 16 are the waveforms of ON electrode 216 (i.e., the electrode B) and second ON electrode 235 (i.e., the electrode C) when attracting mirror 212 from the ON state to the oscillation state.

That is, in FIG. 16, mirror 212 is attracted to the oscillation state by changing the potential of second ON electrode 235 (i.e., the electrode C) to a potential 232a by plate line 232, instead of changing the potential of ON electrode 216.

As such, in this configuration the second ON electrode 235 is equipped in addition to ON electrode 216, and the potential of the second ON electrode 235 is controlled by plate line 232 as shown in FIG. 15, et cetera. This makes it possible to apply a voltage to the second ON electrode 235 independent from the signals from bit lines 221-1 and 221-2, thus enabling a more accurate control of operations than the control by means of only word line 231 or the like.

Furthermore, control by plate line 232 makes it possible to have multiple voltages applied to the address electrodes, such as the second ON electrode 235 and ON electrode 216, thereby attaining a more complex operation control.

This configuration enables a sufficient level of drive voltage for memory cell M2 and control of the high-speed timing for applying the voltage, thereby attaining a high-speed operation control for mirror 212.

Incidentally, bit data is ignored in the example configuration shown in FIG. 15, and, therefore, the drive voltage is increased for each line of plate lines 232. In this case, such a lump control for each line of plate lines 232 does not create a problem because it is an amplitude adjustment in the oscillation control for mirror 212.

FIGS. 17A, 17B, 17C, 17D, and 17E are timing diagrams for showing various exemplary PWM control profile 451 (PWM) (i.e., a PWM drive timing 440) and an intermediate oscillation control profile 452 (OSC) (i.e., an OSC drive timing 441) in mirror control profile 450 for one frame period of a mirror.

Figure 17A:
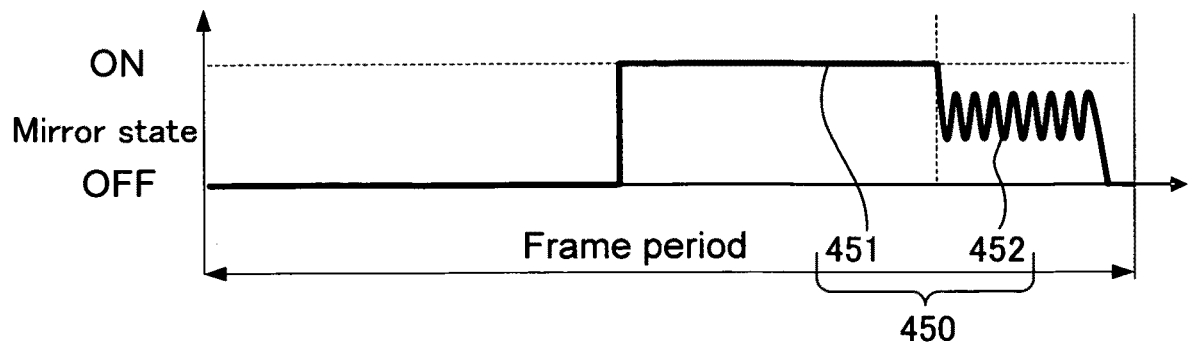
FIG. 17A is a chart illustrating the setup of a mirror control profile.

The mirror control profile shown in FIG. 17A illustrates the generation of a PWM control profile 451 and an intermediate oscillation control profile 452 sequentially, in the latter part of one frame.

Figure 17B:
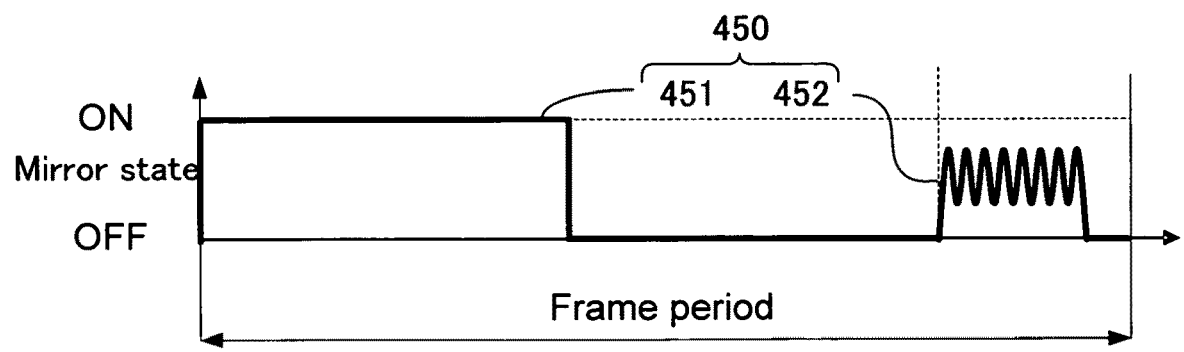
FIG. 17B is a chart illustrating the setup of a mirror control profile.

FIG. 17B illustrates the generation of PWM control profile 451 at the beginning of one frame and generation of intermediate oscillation control profile 452 toward the end of one frame.

Figure 17C:
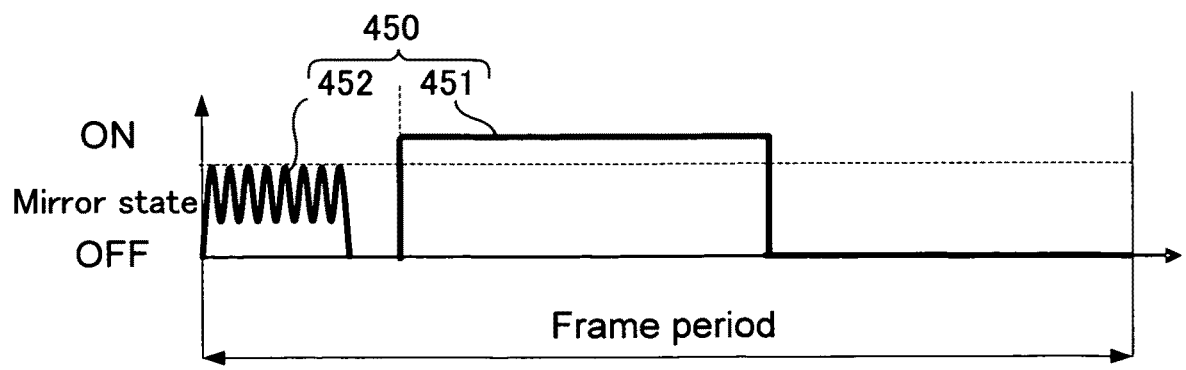
FIG. 17C is a chart illustrating the setup of a mirror control profile.

FIG. 17C illustrates the case of generation intermediate oscillation control profile 452 during the first half of one frame and then the generation of PWM control profile 451.

Figure 17D:
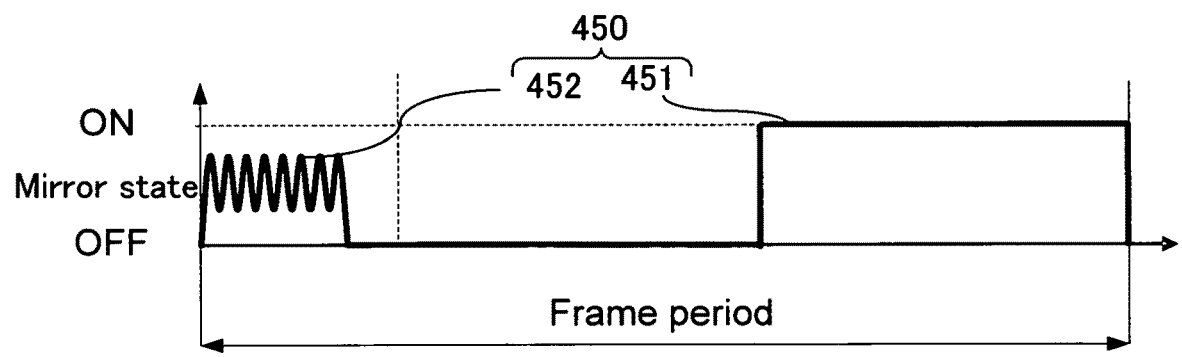
FIG. 17D is a chart illustrating the setup of a mirror control profile.

FIG. 17D illustrates the case of generation intermediate oscillation control profile 452 at the start of one frame and the generation of PWM control profile 451 at the end of the frame.

Figure 17E:
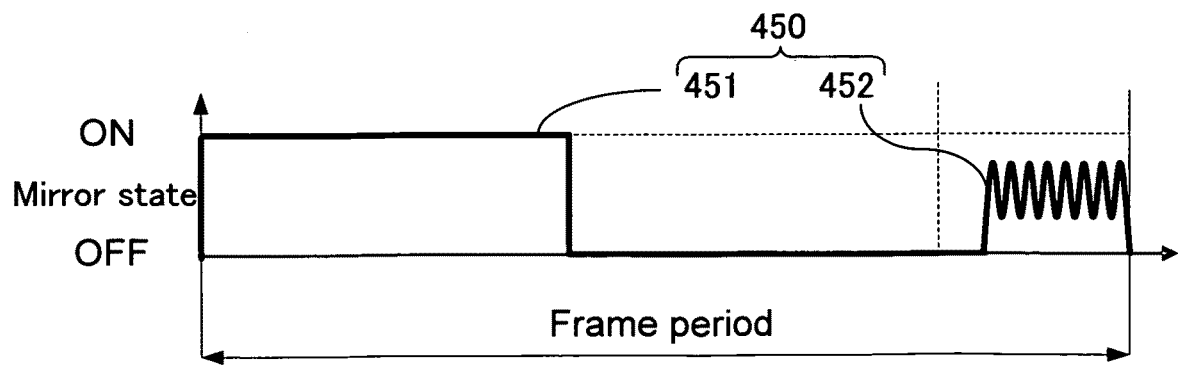
FIG. 17E is a chart illustrating the setup of a mirror control profile.

FIG. 17E illustrates the aligning of the ON position of PWM control profile 451 with the beginning of one frame and the aligning of the end of intermediate oscillation control profile 452 with the end of one frame.

The pattern (i.e., the intermediate oscillation control profile 452) of mirror 212 of the pixel displaying gray (i.e., <pixel 1-1>) shown in the above described FIGS. 13 and 16 corresponds to the above described FIG. 17A.

Note that the present embodiment is also configured to be capable of changing oscillation states in the midst of an intermediate oscillation (i.e., the intermediate oscillation control profile 452).

Figure 17F:
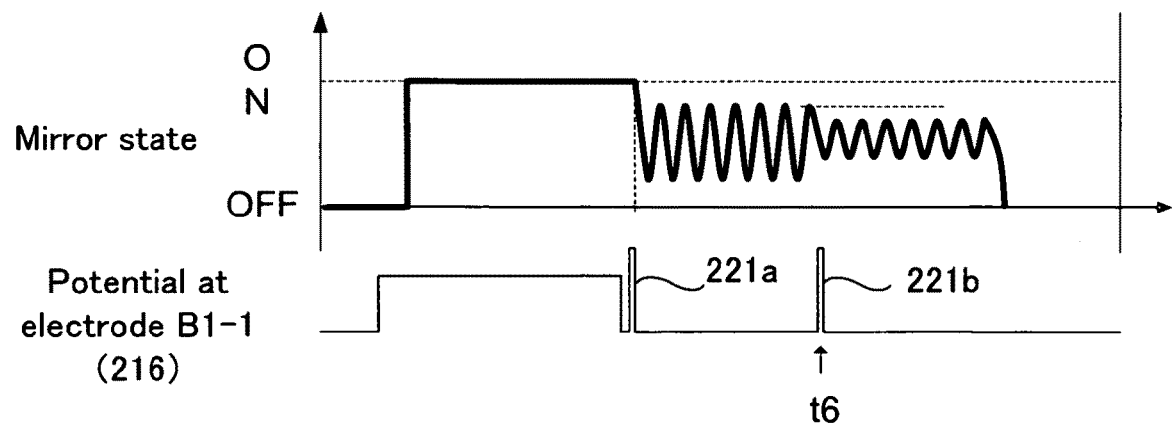
FIG. 17F is a chart illustrating the setup of a mirror control profile.
Figure 17G:
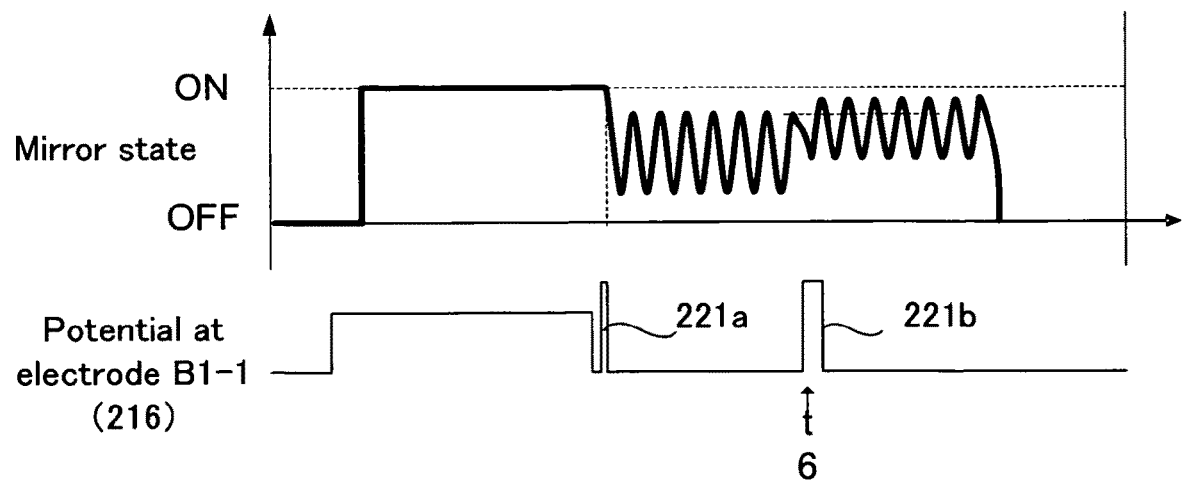
FIG. 17G is a chart illustrating the setup of a mirror control profile.

FIGS. 17F and 17G show the operation of mirror 212 when a voltage is re-applied, from plate line 232 (PL), to ON electrode 216 (i.e., the electrode B) in the midst of an intermediate oscillation, for example, under the control shown in FIG. 13.

Referring to FIGS. 17F and 17G, a re-application voltage is generated at ON electrode 216 at control time t6, so that the waveforms of the intermediate oscillation are changed by the timing of the application, the period of time of the application, and the voltage of the re-application.

In FIG. 17F, the period of application time of the re-application voltage 221b is relatively small and therefore the center of the oscillation of mirror 212 does not change and only the amplitude becomes smaller.

In contrast, FIG. 17G shows that the period of application time of the re-application voltage 221b is relatively large and therefore the center of the oscillation of mirror 212 is biased to the ON side instead of the center.

Figure 18:
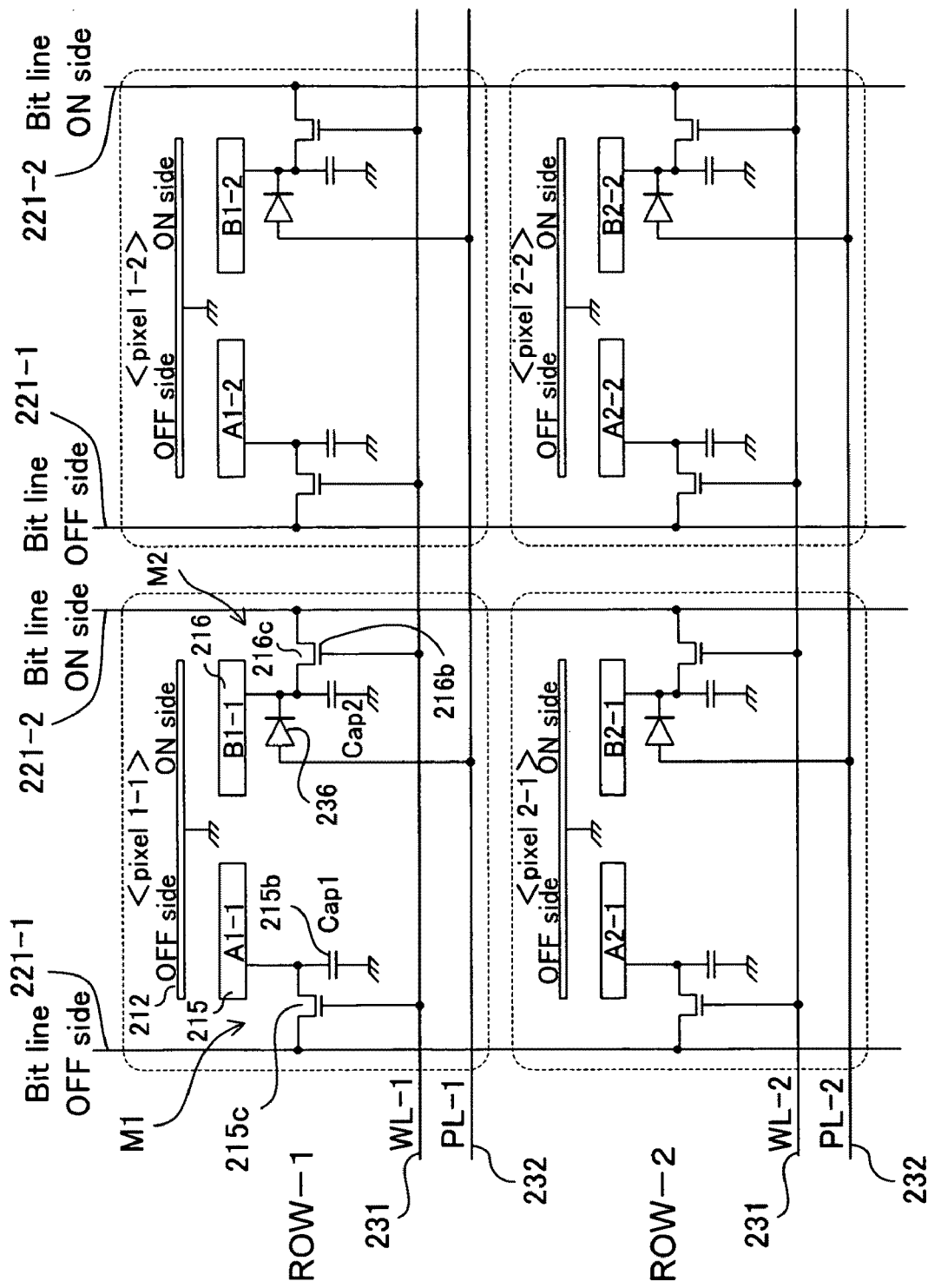
FIG. 18 is a conceptual diagram showing another possible modification of the pixel unit shown in FIG. 10A.

FIG. 18 illustrates the placing of a diode 236 in place of the second ON capacitor 233 in the configuration of pixel unit 211 as shown in the above described FIG. 10A.

The drive circuit for pixel unit 211 in this case is the same as FIG. 12A. The drive timing, however, uses bit line 221-1 (bit line) at the end of returning the mirror 212 as described below.

Figure 19:
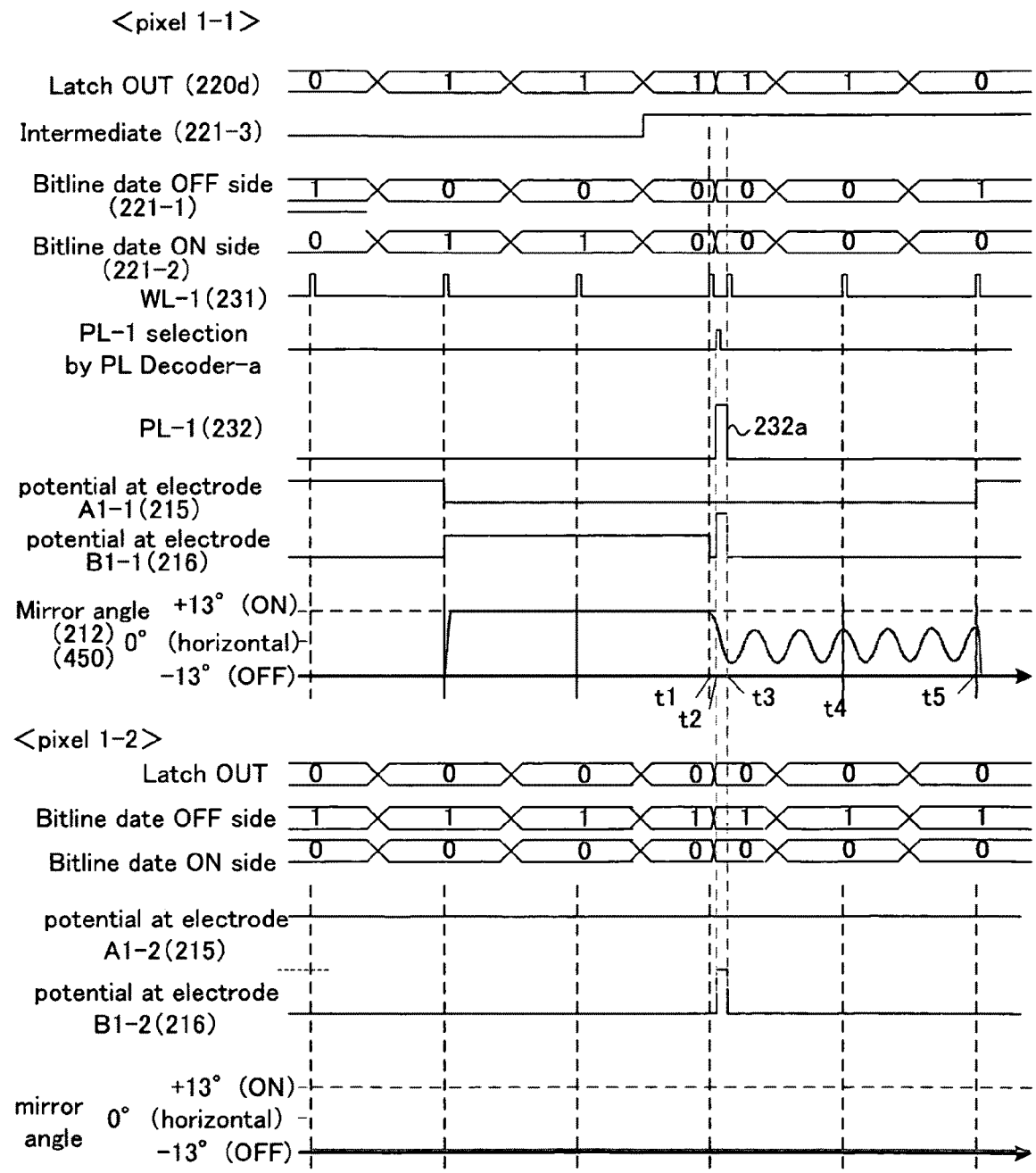
FIG. 19 is a timing chart showing the action of another possible modification of the pixel unit shown in FIG. 18.

FIG. 19 is a timing chart illustrating the operation of mirror 212 and the operation timing of the <pixel 1-1> and <pixel 1-2> that belong to the same ROW line of the pixel array 210 as shown in FIG. 18.

Also, in this case, of the two pixel units 211 in focus, the <pixel 1-1> displays gray, while the <pixel 1-2> displays black.

Since the two belong to the same ROW line, the mode changeover signal 221-3 (Intermediate), word line 231 (WL-1), and plate line 232 (PL-1) are common signals to the <pixel 1-1> and <pixel 1-2>.

The example control shown in FIG. 19 differs from the example control shown in the above described FIG. 13 since the former discharges ON electrode 216 at control time t3 with bit line 221-1 (bit line) and word line 231 (WL) (refer to the waveform at control time t3 in word line 231).

Therefore, only one PL Address Decoder (i.e., plate line address decoder 252-1 and plate line address decoder 252-2) is required.

Figure 20:
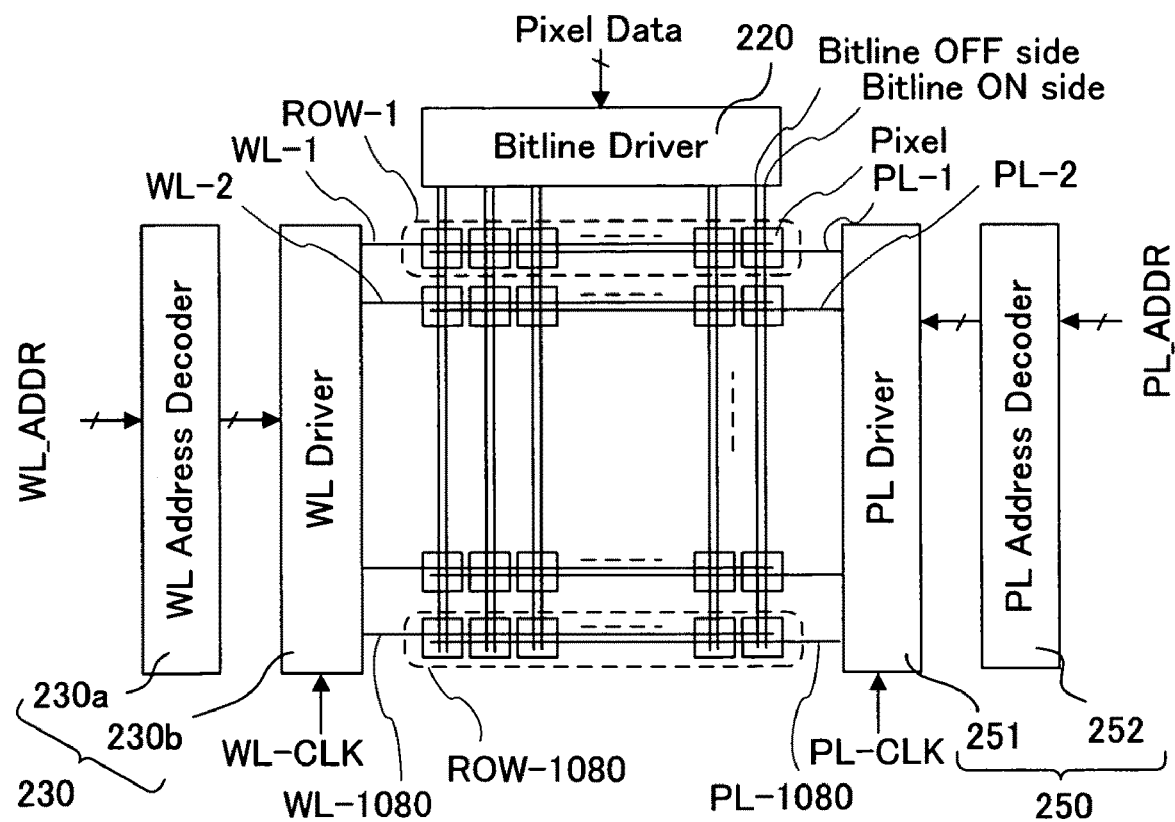
FIG. 20 is a conceptual diagram illustrating the layout of a peripheral circuit performing the action of the pixel unit shown in FIG. 18.

FIG. 20 illustrates the connection between the address decoder and bit line driver part 220 (bit line driver) that are used for selecting word line 231 (WL) and plate line 232 (PL) of pixel array 210.

As shown in FIG. 20, this is a simple configuration connecting one plate line address decoder 252 to plate line driver 251, in place of connecting two plate line address decoders 252-1 and 252-2 thereto.

Figure 21:
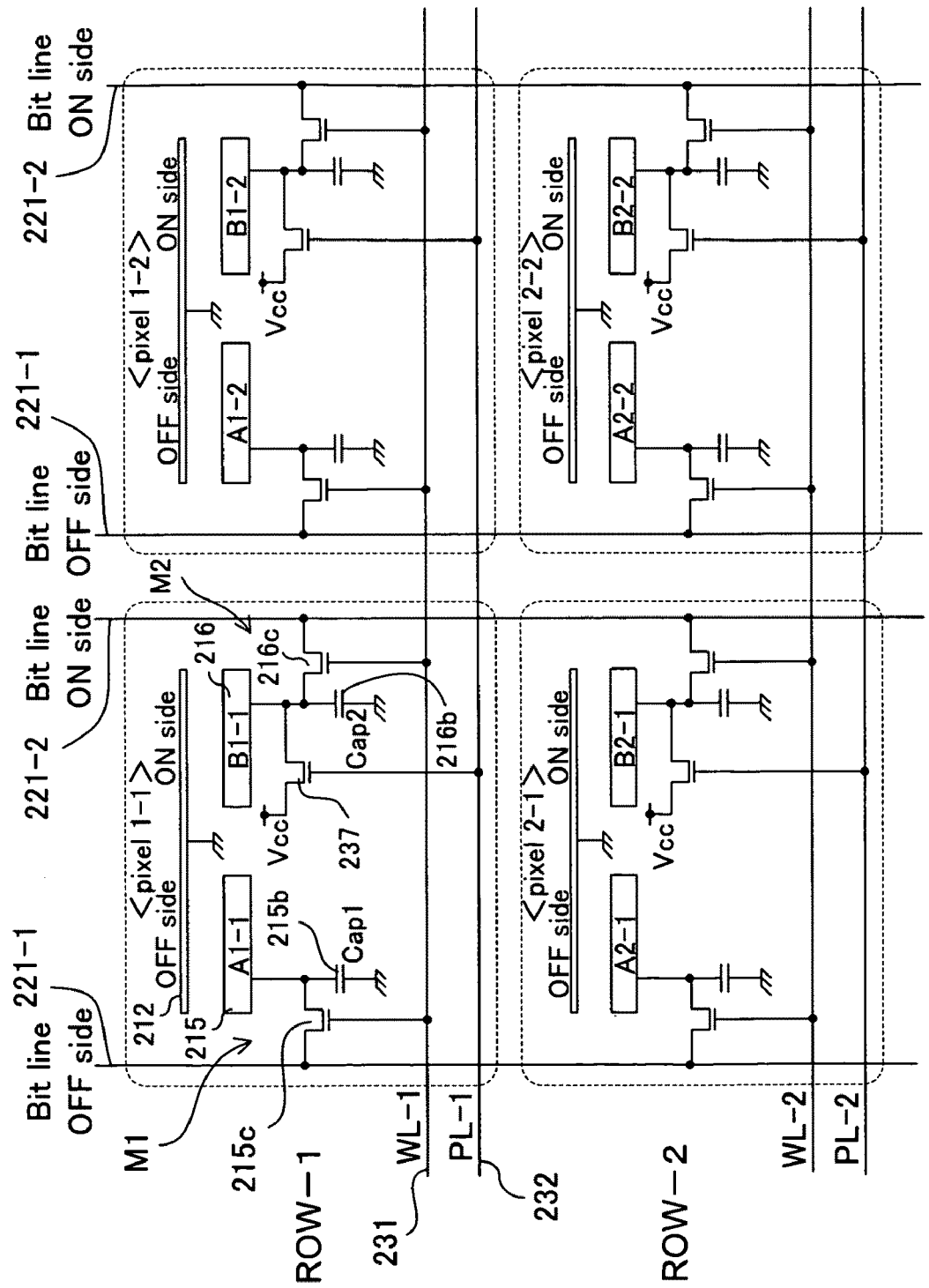
FIG. 21 is a conceptual diagram showing another possible modification of the pixel unit shown in FIG. 10A.

FIG. 21 shows another possible modification of the configuration of pixel unit 211 according to the present embodiment.

The configuration shown in FIG. 21 places a field effect transistor 237 (FET) in place of second ON capacitor 233 in the configuration of pixel unit 211 shown in the above described FIG. 10A.

That is, plate line 232 is connected to the gate electrode of field effect transistor 237, and the applied voltage from plate line 232 controls whether or not a power source voltage Vcc (to which the drain of field effect transistor 237 is connected is) is applied to ON capacitor 216b.

The drive circuit for pixel unit 211 according to the example modification shown in FIG. 21 is the same as that of the above described FIG. 12A.

The drive time of pixel unit 211, comprising field effect transistor 237, is controlled in the same manner as that of the circuit shown in FIG. 12A, where the setup voltage from plate line 232 (PL) to ON electrode 216 is determined by the power source voltage Vcc, to which the drain of the FET is connected, instead of being determined by the voltage of plate line 232 (PL).

Figure 22A:
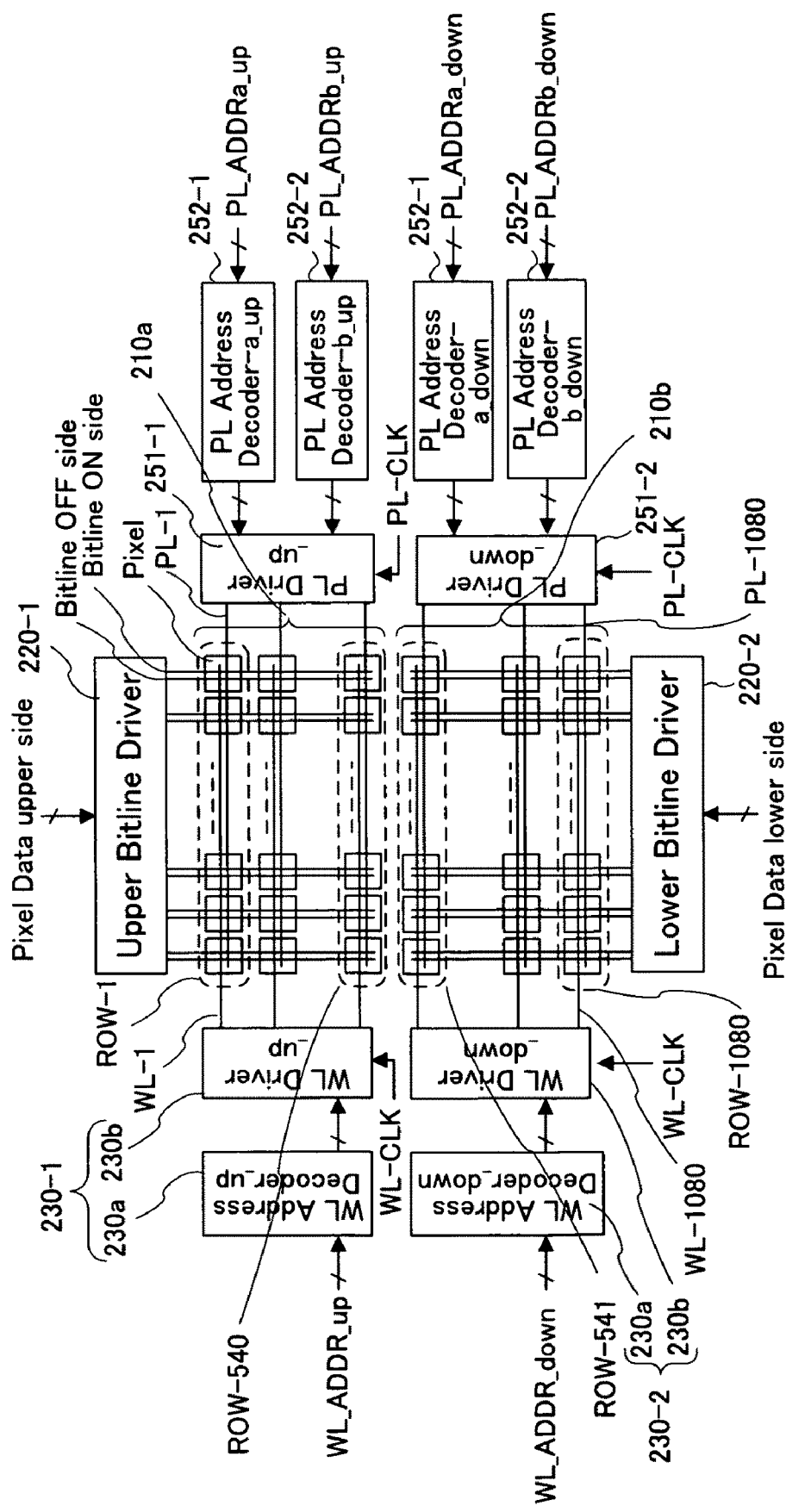
FIG. 22A is a conceptual diagram showing a possible modification of the placement of the peripheral circuit for a pixel array according to a preferred embodiment of the present invention.

FIG. 22A is a conceptual diagram showing an example modification of the configuration of pixel array 210 according to the present embodiment.

The configuration illustrated in FIG. 22A divides multiple ROW lines (ROW-1 through ROW-1080) into upper and lower groups (i.e., an upper row line area 210a and a lower row line area 210b, each comprising an upper bit line driver part 220-1 and a lower bit line driver part 220-2 (bit line Driver), a first address decoder 230a, a word line driver 230b (WL Address Decoder_up and WL Driver-up, WL Driver_down and WL Driver_down), a plate line driver 251-1, a plate line address decoder 252-1, and a plate line address decoder 252-2 (PL Address Decoder-a-up and PL Driver-up, PL Address Decoder-a_down, b_down and PL Driver-up, down)).

Specifically, multiple row lines are divided into the upper row line area 210a including row lines ROW-1 through ROW-540, and the lower row line area 210b that includes row lines ROW-541 through ROW-1080.

In this case, the level change (i.e., the potential 232a) of plate line 232 is accomplished by plate line address decoder 252-1 changing it to H level and plate line address decoder 252-2 changing it to L level.

Figure 22B:
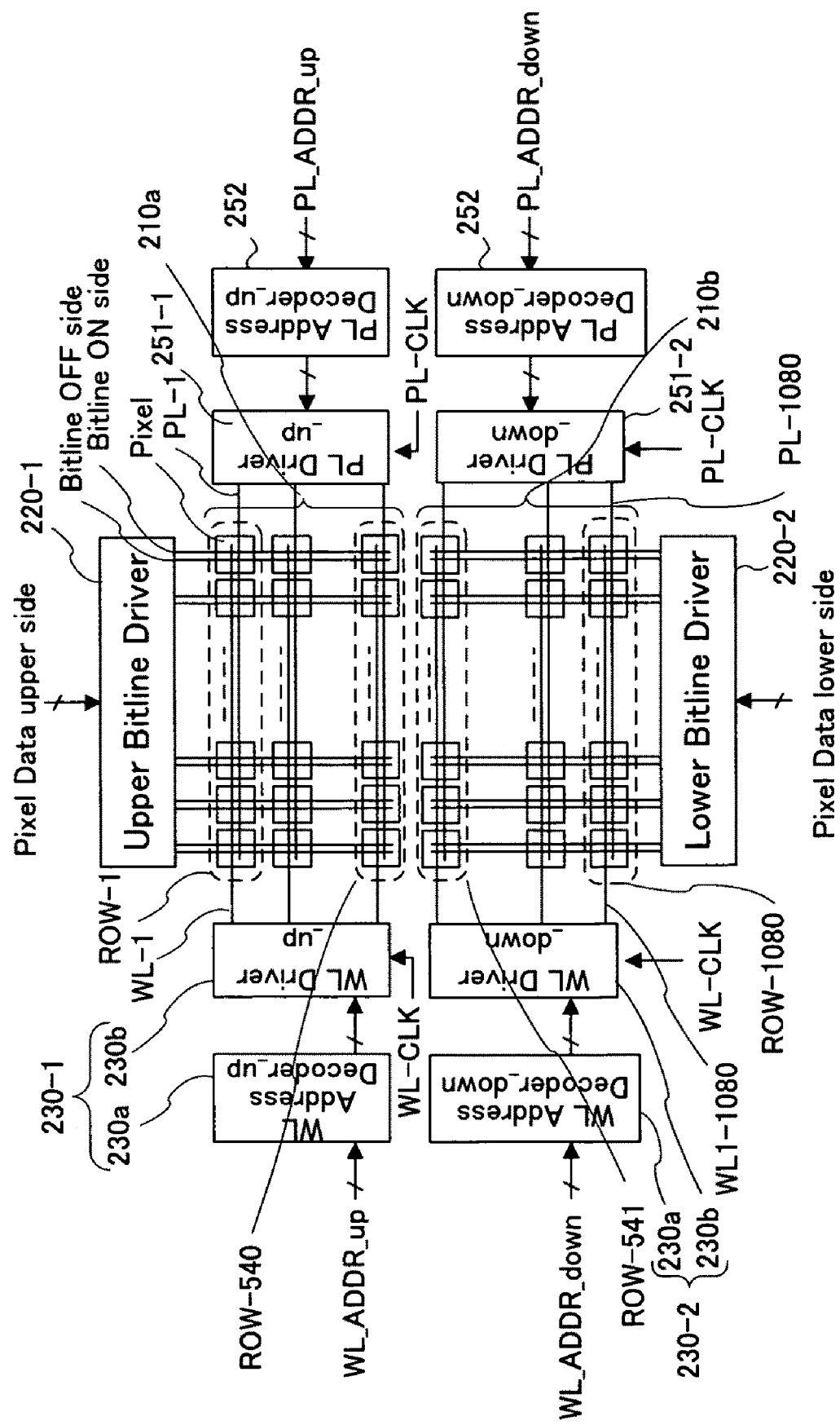
FIG. 22B is a conceptual diagram showing a possible modification of the placement of the peripheral circuit for a pixel array according to a preferred embodiment of the present invention.

FIG. 22B shows an example configuration in which plate line driver 251-1 (PL Driver_up) and plate line driver 251-2 (PL Driver_down) that are equipped for the upper and lower ROW line groups, each equipped with one plate line address decoder 252 (PL Address Decoder-up) and one plate line address decoder 252 (PL Address Decoder_down) in the comprisal of pixel array 210 as shown in the above described FIG. 22A.

In this case, the level change (i.e., the potential 232a) of plate line 232 (PL) is carried out by plate line 232 (PL).

Figure 22C:
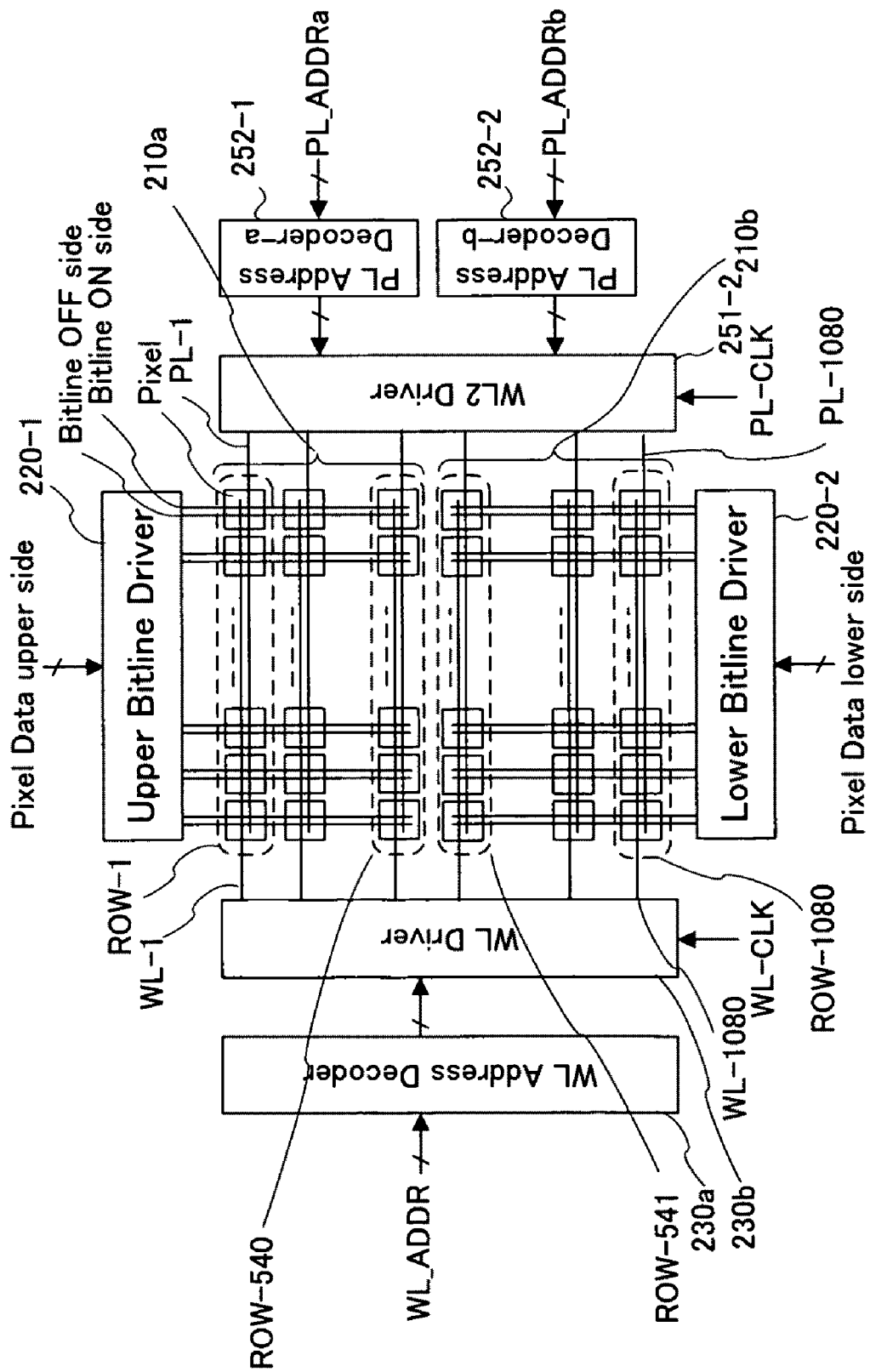
FIG. 22C is a conceptual diagram showing a possible modification of the placement of the peripheral circuit for a pixel array according to a preferred embodiment of the present invention.

FIG. 22C illustrates the configuration in which a first address decoder 230a and a word line driver 230b, a plate line driver 251 and a plate line address decoder 252-1, and a plate line address decoder 252-2 are equipped commonly for each group in the configuration in which multiple ROW lines of a pixel array 210 is divided into the upper and lower groups. Each of the upper and lower ROW line groups is equipped with upper bit line driver part 220-1 and lower bit line driver part 220-2.

In this case, the ROW lines (both upper and lower) applicable to the same address are driven simultaneously. The combination of the respective ROW lines in the upper and lower groups to be simultaneously driven is determined by wirings.

For example, the ROW lines applicable to the same address (in the example of FIG. 22C, the first ROW-1 in the upper group and the first ROW-541 in the lower group) are simultaneously driven.

Figure 22D:
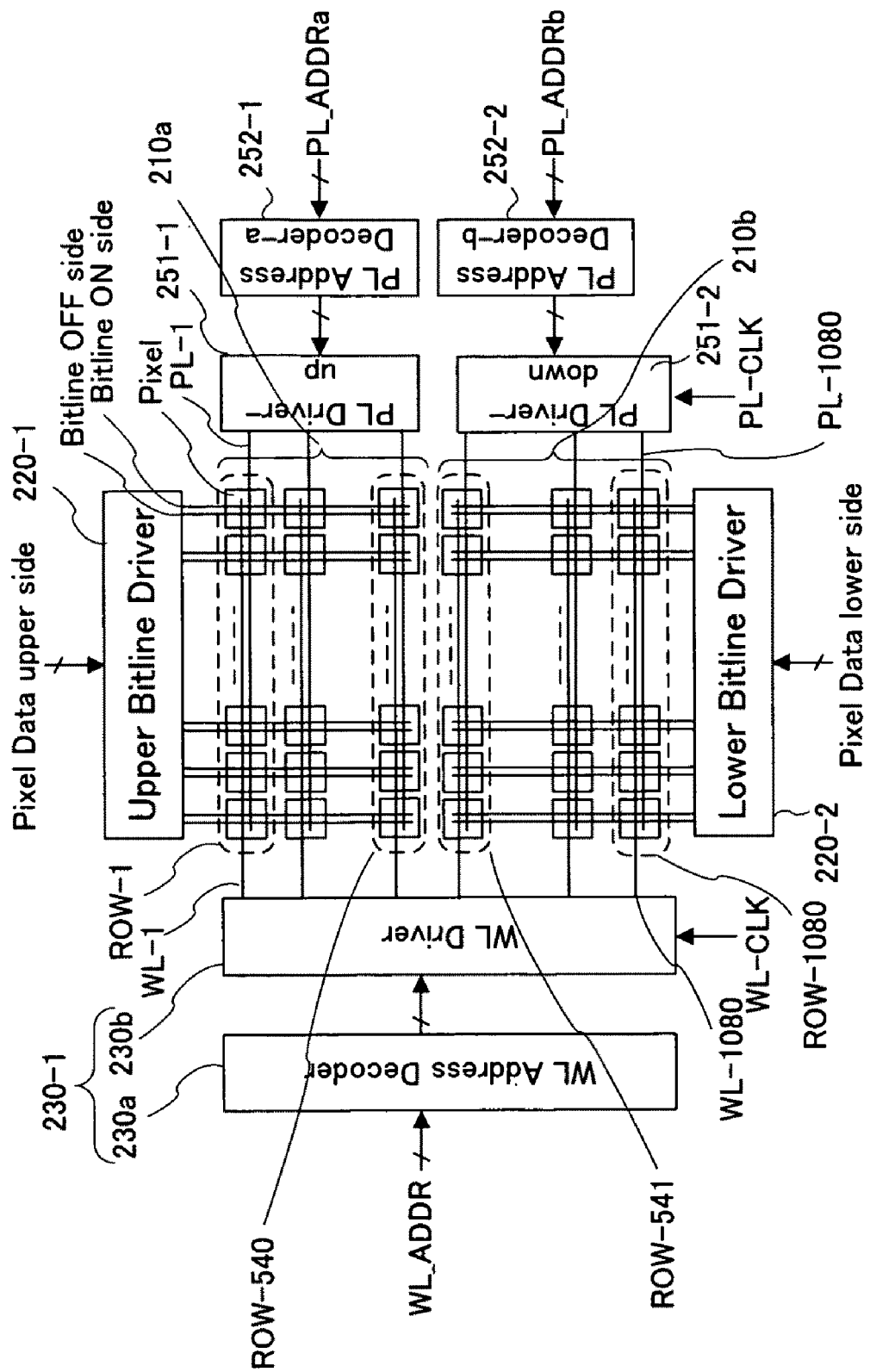
FIG. 22D is a conceptual diagram showing a possible modification of the configuration of placing the peripheral circuit for a pixel array according to a preferred embodiment of the present invention.

FIG. 22D shows an example configuration in which plate line driver 251 commonly equipped in the upper and lower groups is separated into a plate line driver 251-1 (PL Driver_up) corresponding to the upper group and a plate line driver 251-2 (PL Driver_down) corresponding to the lower group. The divided drivers are placed correspondingly at the respective groups, according to the configuration of pixel array 210 shown in FIG. 22C.

In this case, the ROW lines belonging to the upper and lower groups are individually driven, unlike the configuration shown in the above described FIG. 22C.

Figure 23A:
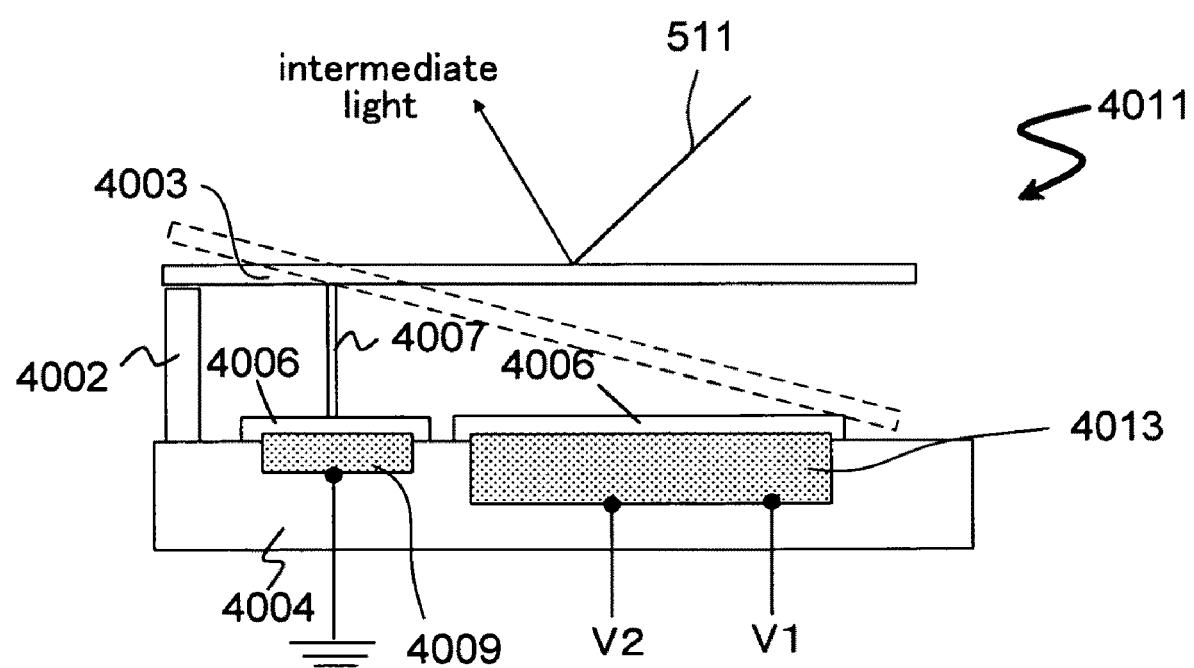
FIG. 23A is a cross-sectional diagram for showing an exemplary modification of the configuration of a pixel unit (i.e., a mirror element) comprising a mirror implemented with a cantilever structure according to a preferred embodiment of the present invention.
Figure 23B:
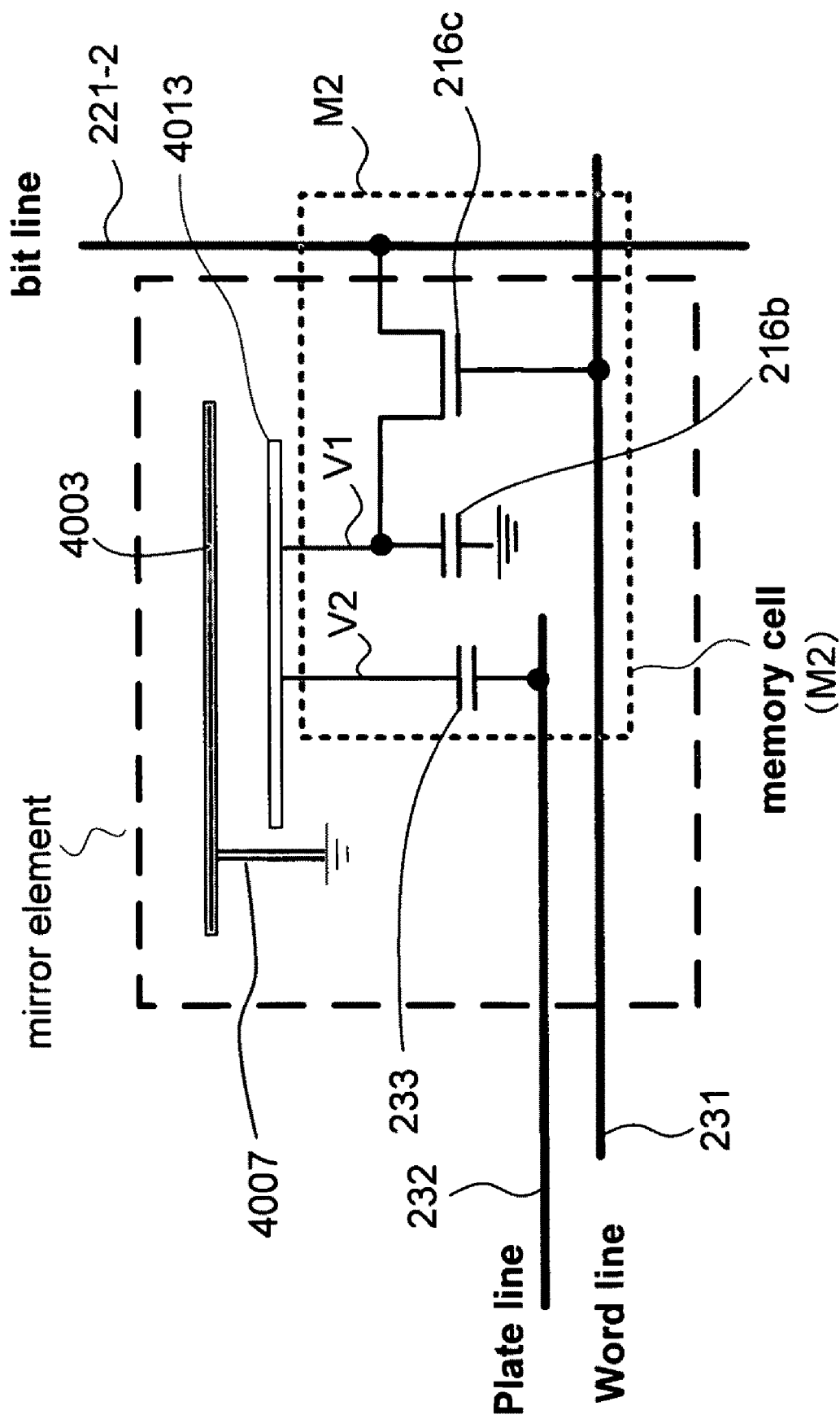
FIG. 23B is a cross sectional schematic diagram showing an exemplary configuration of the drive circuit shown in FIG. 23A.

FIG. 23A is a cross-sectional diagram showing an example modification of the configuration of a pixel unit 211 (i.e., a mirror element 4011) according to the present embodiment. FIG. 23B is a conceptual diagram showing an example configuration of the drive circuit for the pixel unit.

Mirror element 4011 (i.e., pixel unit 211) according to the present embodiment comprises a hinge electrode 4009 and an address electrode 4013, both of which are placed on a device substrate 4004 and covered with an insulation layer 4006.

A mirror 4003 is supported on insulation layer 4006 of hinge electrode 4009 by way of an elastic hinge 4007. In this case, mirror 4003 is supported as a cantilever against elastic hinge 4007, with the entirety of the mirror 4003 protruding over an address electrode 4013.

Furthermore, a stopper 4002 is placed on the other side of the address electrode 4013 across from the elastic hinge 4007, with the lower edge of the stopper 4002 fixed onto the device substrate 4004.

Furthermore, mirror 4003 is tilted to close to address electrode 4013 by a Coulomb force resulting from an application of a voltage V1 to address electrode 4013. Mirror 4003 is stopped at a position abutting on insulation layer 4006 covering address electrode 4013 (which is called an ON state).

Furthermore, when the application of voltage V1 to address electrode 4013 is cut off, mirror 4003 is restored by the elasticity of elastic hinge 4007 to its horizontal position, abutted by the stopper 4002 so that it does not move beyond this state (which is called an OFF state).

The following is a description of a control circuit for mirror element 4011, as illustrated in FIG. 23B. In this case, mirror element 4011 is supported by elastic hinge 4007 in a cantilever and therefore is a configuration equipped with bit line 221-2, gate transistor 216c, ON capacitor 216b, and word line 231, which are the circuit elements of memory cell M2 on the ON side, included in the circuit configuration shown in the above described FIG. 10A.

Furthermore, as shown in FIG. 10A, the present embodiment is equipped with plate line 232, in addition to word line 231, and connects plate line 232 to address electrode 4013 by way of the second ON capacitor 233.

Further, with the control using word line 231, plate line 232 and bit line 221-2, the OFF state, ON state, and the intermediate oscillation state that is between the ON state and OFF state, are achieved as described below.

The following is a description of an example method for controlling pixel array 210 comprising the cantilever-structured mirror 4003 as shown in the above described FIGS. 23A and 23B.

Note that the control system can use the configuration, as is, as shown in FIG. 12A.

Figure 24:
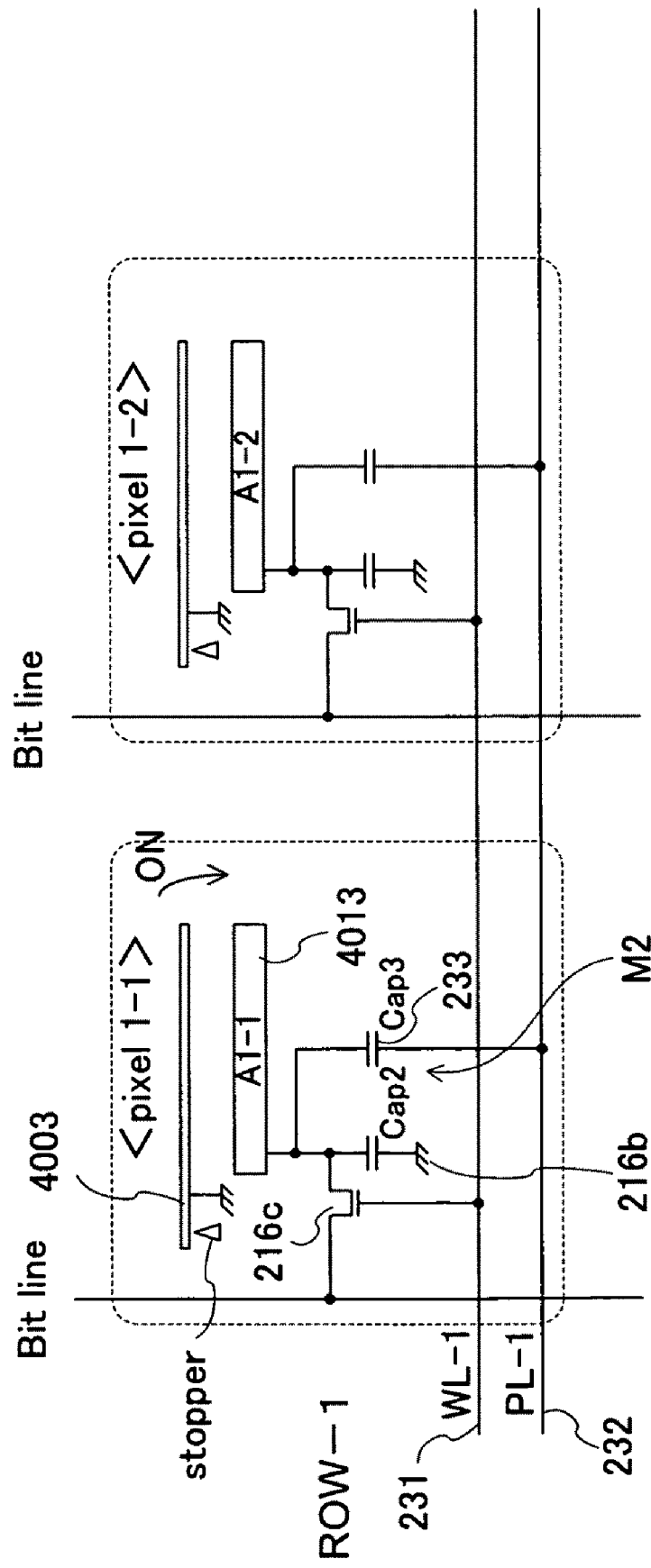
FIG. 24 is a circuit diagram illustrating in detail a part of the layout of the pixel unit comprising a mirror (shown in FIG. 23A) that is structured as a cantilever.

FIG. 24 is a circuit diagram illustrating in detail a part of the layout of pixel array 210 comprising a mirror 4003 (shown in the above described FIG. 23B) that is structured as a cantilever.

Figure 25:
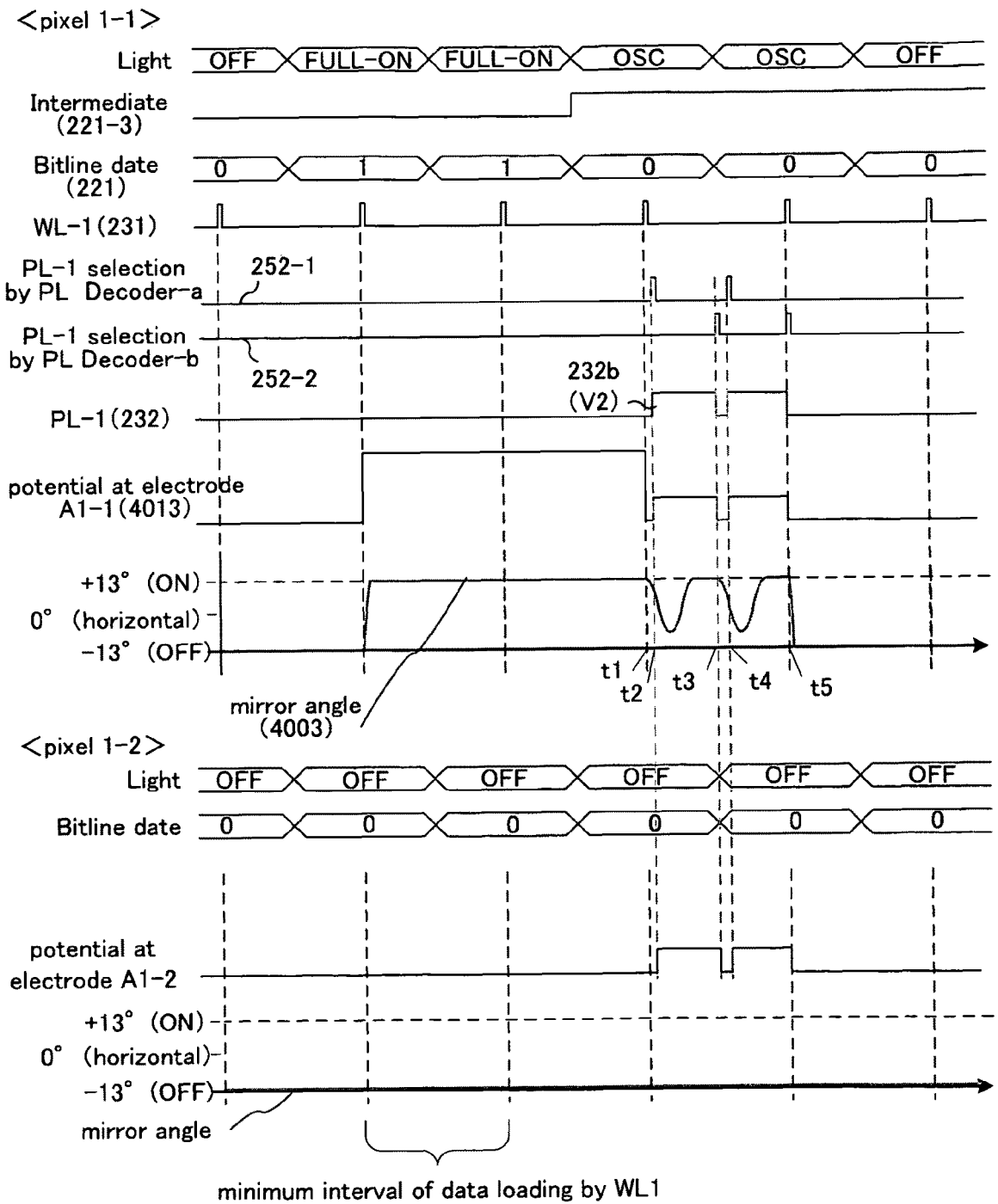
FIG. 25 is a timing chart illustrating the action of a pixel unit (i.e., a mirror element) comprising a mirror (shown in FIG. 23A) that is structured as a cantilever.

FIG. 25 is a timing chart depicting the operation of the mirror and the operation timings of the <pixel 1-1> and <pixel 1-2> belonging to the same ROW line as that of FIG. 24.

The example shown in FIGS. 24 and 25 presupposes that the <pixel 1-1> displays gray, while the <pixel 1-2> displays black.

In this case, since the <pixel 1-1> and <pixel 1-2> belong to the same ROW line, the mode changeover signal 221-3 (Intermediate), word line 231 (WL-1), and plate line 232 (PL-1) are common signals to the two of them.

Until control time t1, mirror 4003 of the <pixel 1-1> is in PWM operation and a voltage V1 in accordance with bit line 221 (bitline) is applied to the electrode.

Specifically, if the voltage at bit line 221 (bitline) is at the H level, mirror 4003 is drawn to address electrode 4013 so as to abut onto insulation layer 4006 of address electrode 4013 and is stationary. This is an ON state.

If the potential at bit line 221 (bitline) is L level, mirror 4003 separates from address electrode 4013, abuts on stopper 4002 and stops thereat. This is an OFF state.

Just prior to control time t1, mirror 4003 is stationary in the ON state, that is, abutting on address' electrode 4013. At control time t1, address electrode 4013 is changed by bit line 221 (bitline) to be "0" volts (i.e., discharged), and mirror 4003 starts to separate from address electrode 4013 by means of the elasticity of elastic hinge 4007.

At control time t2, that is, before mirror 4003 is far from address electrode 4013, plate line address decoder 252-1 (PL Address Decoder-a) selects plate line 232 (PL-1), and plate line 232 (PL-1) is changed to H level (i.e., a potential 232b, which is lower than the H level of bit line 221). A voltage is generated at the electrode by the potential 232b so that mirror 4003 is attracted by address electrode 4013 and is stationary thereat.

At control time t3, the plate line address decoder 252-2 (PL Address Decoder-b) selects plate line 232 (PL-1) and, if it is L level, mirror 4003 starts to separate from address electrode 4013 again.

At control time t4, that is before mirror 4003 is far from address electrode 4013, as at t2, the plate line address decoder 252-2 (PL Address Decoder-a) selects plate line 232 (PL-1) and is changed to H level (i.e., the potential 232b) and mirror 4003 is re-attracted to address electrode 4013 and is stationary thereat.

At control time t5, the plate line address decoder 252-2 (PL Address Decoder-b) selects plate line 232 (PL-1), and the PL-1 is changed to L level so that mirror 4003 is re-attracted by address electrode 4013 to be stationary thereat. Simultaneously, or a little thereafter, a memory cell is selected by word line 231, and "0" volts are set by bit line 221.

With this series of operation, mirror 4003 able 1) to generate a smaller quantity of light than the quantity during the minimum data-loading period in accordance with a PWM control with word line 231 (WL) and 2) to express an intermediate gray scale.

In this case, the mirror of the <pixel 1-2> adjacent to the <pixel 1-1> displays black and therefore the mirror needs to be continuously stationary on the side of stopper 4002 (i.e., the OFF side).

Plate line 232 (PL-1) is common to the <pixel 1-1> and <pixel 1-2> and therefore, between control times t2 and t5, a voltage is generated at address electrode 4013. However, mirror 4003 is stationary on the OFF side and the distance between address electrode 4013 and mirror 4003 is far, and, therefore, a Coulomb force applied to mirror 4003 is small, causing no change to the position of mirror 4003.

That is, the control is such as to maintain the following relationship in order not to change the position of mirror 4003:

[H level (V1) of the bit line 221 (Bitline)]>[H level (V2) of the PL]

As such, spatial light modulator 200 comprising mirror element 4011, configured as shown in FIGS. 23A and 23B, is configured to control mirror element 4011 with one memory cell M2, thereby making it possible to make the size of the mirror element 4011 more compact and express various gray scale by means of the intermediate oscillation of mirror 4003, in addition to the ON and OFF states, using plate line 232.

In a projection technique using spatial light modulator 200, a reduction in the size of mirror element 4011 makes it possible to obtain both a higher level of definition of the projection image by arraying a larger number of mirror elements 4011 and a higher grade of gray scale with the intermediate oscillation of mirror 4003 using plate line 232.

Figure 26A:
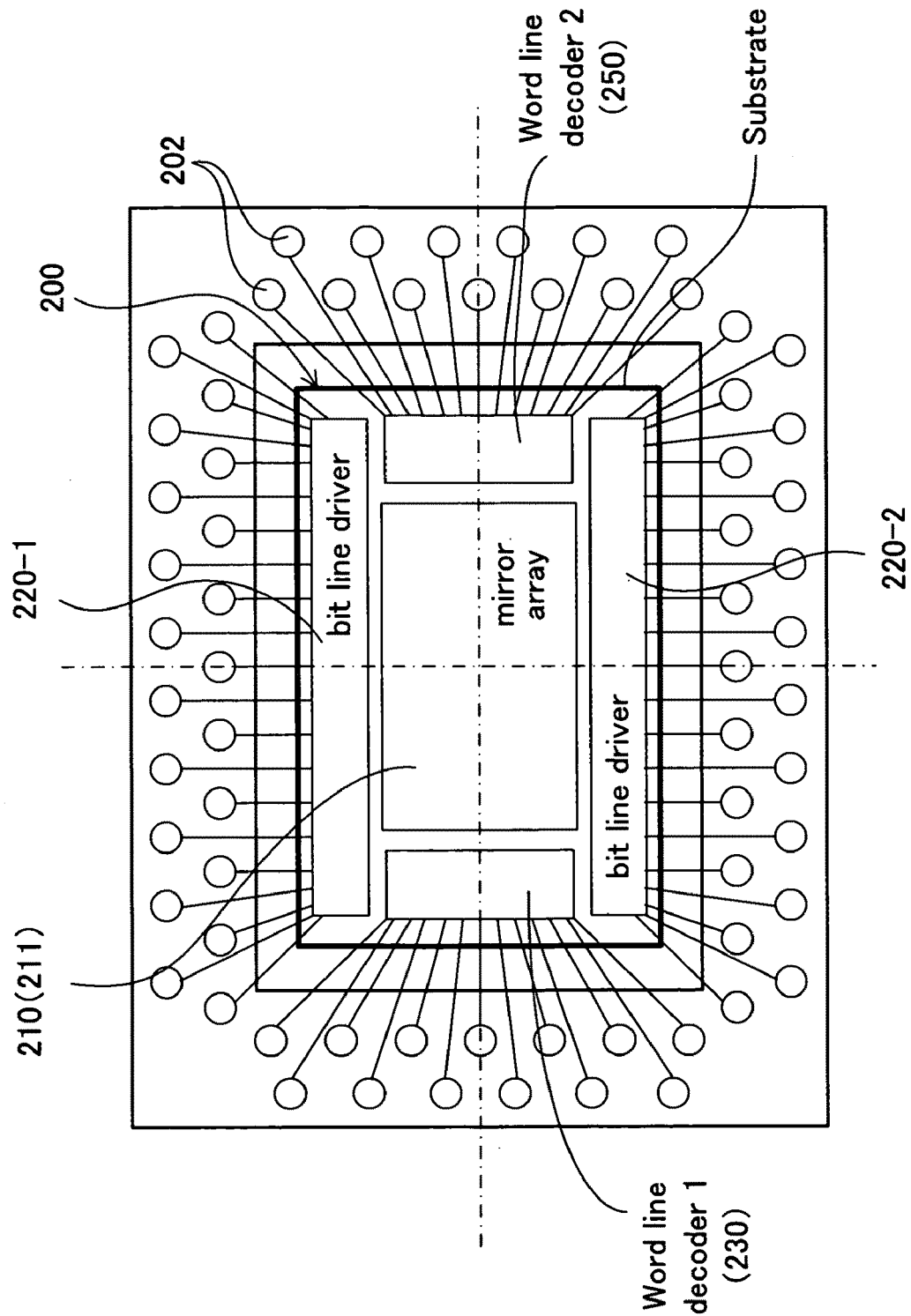
FIG. 26A is a plain view diagram illustrating the packaging structure of a package accommodating a spatial light modulator according to a preferred embodiment of the present invention.
Figure 26B:
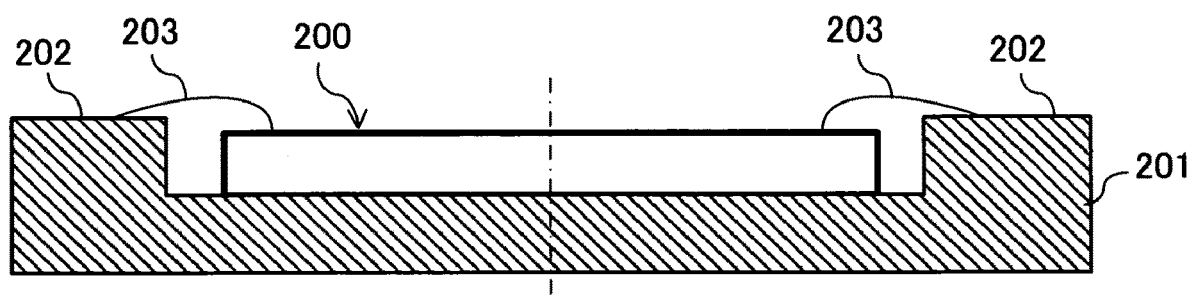
FIG. 26B is a cross-sectional diagram of FIG. 26A.

FIG. 26A is a plain view diagram illustrating the packaging structure of a package accommodating the spatial light modulator shown in the above described FIGS. 22A through 22D, et cetera. FIG. 26B is its cross-sectional diagram.

The spatial light modulator 200 according to the present embodiment places the upper bit line driver part 220-1 and lower bit line driver part 220-2 along the upper and lower sides, respectively, which are parallel to the ROW line in the surrounding area of pixel array 210, and places word line driver unit 230 and plate line driver unit 250 along the left and right sides, respectively, which cross the aforementioned upper and lower sides.

The spatial light modulator 200 is accommodated in the concave part 201a of package 201.

Multiple bonding pads 202 are placed in the surrounding area of the concave part 201a of package 201.

Bit lines and address lines placed in the upper bit line driver part 220-1, lower bit line driver part 220-2, word line driver unit 230, and plate line driver unit 250 are connected, by way of bonding wires, to bonding pads 202 provided in the surrounding area, and are further connected electrically, by way of external connection electrodes (which are not shown in a drawing here) that are placed on the bottom part of the package 201, to the wiring board or the like of a projection apparatus (which is described below) incorporating package 201.

The following is a description of an example configuration of a projection apparatus comprising spatial light modulator 200 equipped with the above described plate line 232. Note that the constituent component corresponding to the previously described constituent component is noted in the drawing with a corresponding sign in parenthesis as appropriate.

Figure 27:
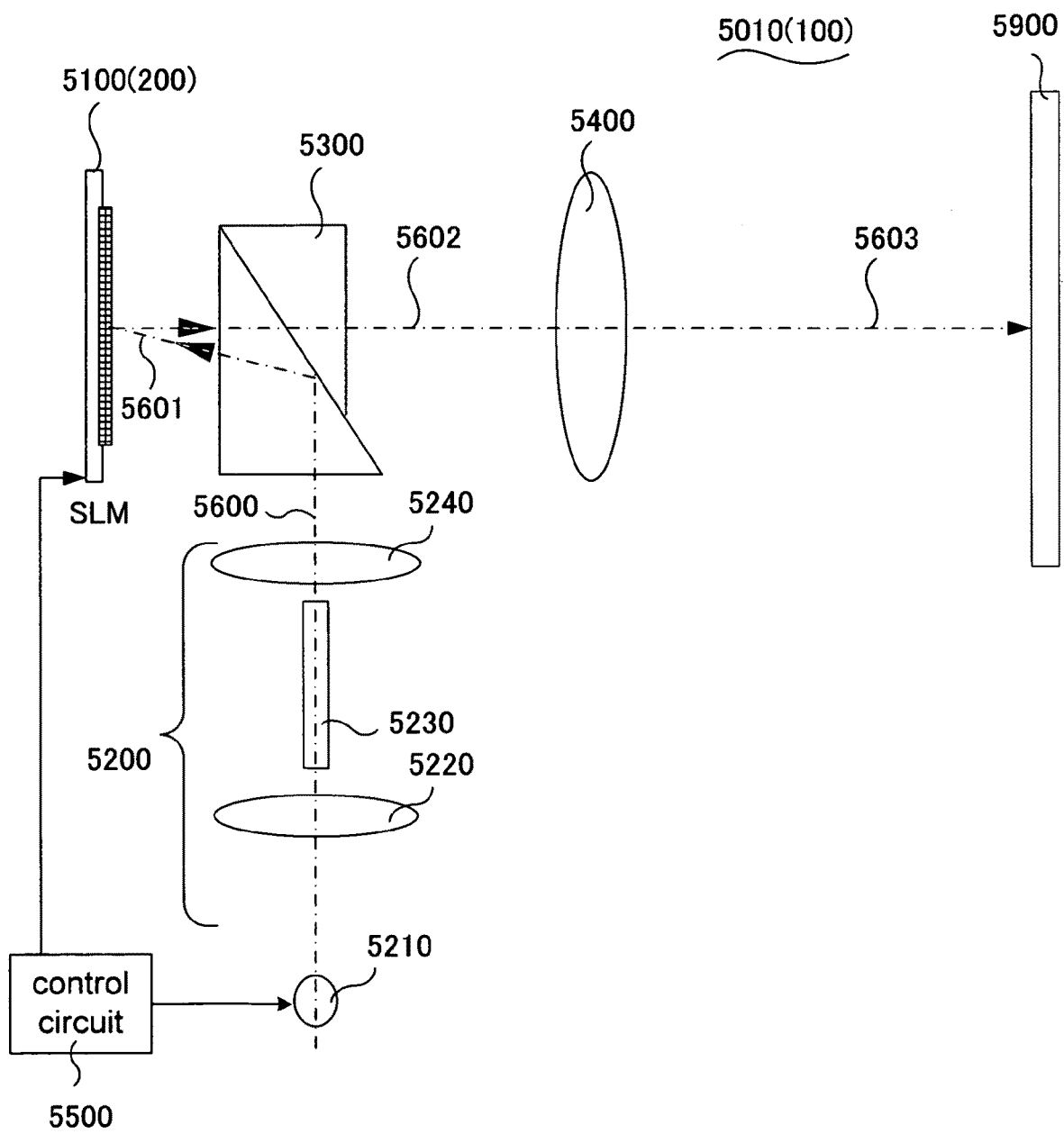
FIG. 27 is a conceptual diagram showing the configuration of a projection apparatus according to a preferred embodiment of the present invention.

FIG. 27 is a conceptual diagram showing the configuration of a projection apparatus according to a preferred embodiment of the present invention.

As shown in FIG. 27, a projection apparatus 5010 according to the present embodiment comprises a single spatial light modulator (SLM) 5100 (i.e., the spatial light modulator 200), a control unit 5500 (i.e., the control apparatus 300), a Total Internal Reflection (TIR) prism 5300, a projection optical system 5400, and a light source optical system 5200.

The spatial light modulator 5100 is implemented according to the above-described spatial light modulator 200 comprising plate line 232.

The projection apparatus 5010 is generally referred to as a single-panel projection apparatus 5010 implemented with a single spatial light modulator 5100.

The projection optical system 5400 is equipped with spatial light modulator 5100 and TIR prism 5300 in the optical axis of projection optical system 5400, and the light source optical system 5200 is equipped in such a manner that the optical axis thereof matches that of projection optical system 5400.

The TIR prism 5300 causes 1) an illumination light 5600 from light source optical system 5200, which is placed onto the side, to enter spatial light modulator 5100 at a prescribed inclination angle relative thereto as incident light 5601 and 2) a reflection light 5602 reflected by spatial light modulator 5100 so as to reach projection optical system 5400.

The projection optical system 5400 projects reflection light 5602, as projection light 5603, by way of spatial light modulator 5100 and TIR prism 5300 to a screen 5900 or the like.

The light source optical system 5200 comprises an adjustable light source 5210 for generating illumination light 5600, a condenser lens 5220 for focusing illumination light 5600, a rod type condenser body 5230, and a condenser lens 5240.

The adjustable light source 5210, condenser lens 5220, rod type condenser body 5230, and condenser lens 5240 are sequentially placed in the aforementioned order on the optical axis of illumination light 5600 emitted from adjustable light source 5210 and incident to the side face of TIR prism 5300.

The projection apparatus 5010 employs a single spatial light modulator 5100 for implementing a color display on the screen 5900 by means of a sequential color display method.

That is, adjustable light source 5210, comprising a red laser light source 5211, a green laser light source 5212, and a blue laser light source 5213 (which are not shown in a drawing here), which allows independent controls for the light emission states, performs the operation of dividing one frame of display data into multiple sub-fields (i.e., three sub-fields, that is, red (R), green (G) and blue (B) in the present case) and causes the red laser light source 5211, green laser light source 5212, and blue laser light source 5213 to emit each respective light in at the time frame corresponding to the sub-field of each color as described below.

Figure 28:
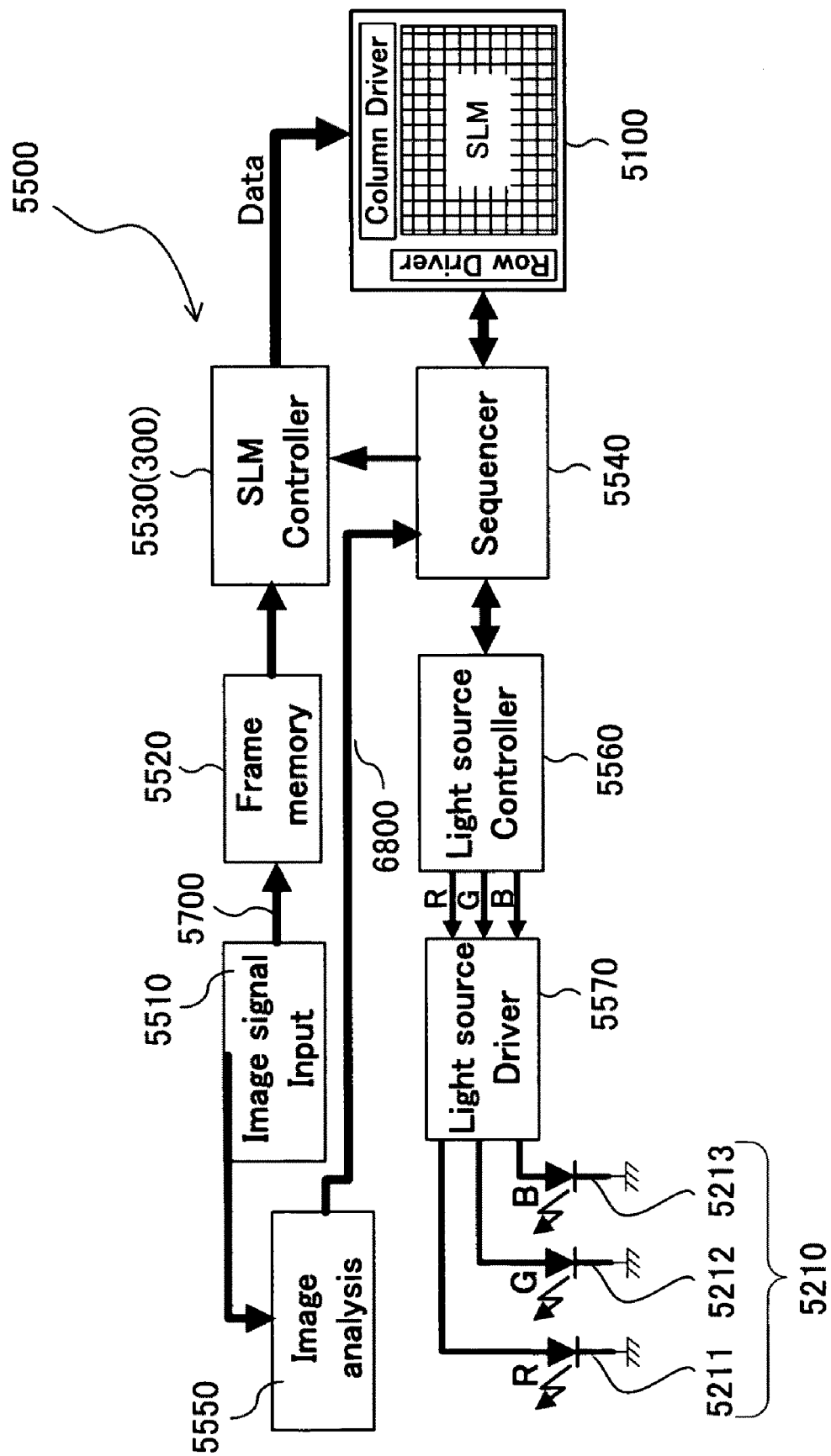
FIG. 28 is a block diagram illustrating the configuration of a control unit comprised in the projection apparatus shown in FIG. 27.

FIG. 28 is a block diagram showing an example configuration of control unit 5500 comprised in the above described single-panel projection apparatus 5010. Control unit 5500 comprises a frame memory 5520, an SLM controller 5530, a sequencer 5540, a video image analysis unit 5550, a light source control unit 5560, and a light source drive circuit 5570.

The sequencer 5540 implements a microprocessor and the like, controls the operation timing and the like of the entirety of control unit 5500 and spatial light modulator 5100.

The frame memory 5520 retains, for example, the equivalent to one frame, input digital video data 5700 (i.e., a binary video image signal 400) from an external device (not shown in a drawing herein) that is connected to a video signal input unit 5510. The input digital video data 5700 is updated, moment-by-moment, every time the display of one frame is completed.

The SLM controller 5530 processes the input digital video data 5700 read from the frame memory 5520 as described below, separating the read data into multiple sub-fields, and outputs them to the spatial light modulators 5100 as control data used for implementing the ON/OFF control and oscillation control (which are described below) of a mirror 5112 of spatial light modulator 5100.

The sequencer 5540 outputs a timing signal to the spatial light modulators 5100 synchronously with the generation of data at the SLM controller 5530.

The video image analysis unit 5550 outputs a video image analysis signal 6800 used for generating various light source pulse patterns on the basis of the input digital video data 5700 inputted from the video signal input unit 5510.

The light source control unit 5560 controls, by way of the light source drive circuit 5570, the operation of adjustable light source 5210 emitting illumination light 5600 on the basis of the video image analysis signal 6800 obtained from the video image analysis unit 5550 by way of the sequencer 5540.

The light source drive circuit 5570 drives the red laser light source 5211, green laser light source 5212, and blue laser light source 5213 of adjustable light source 5210 to emit light on the basis of an instruction from the light source control unit 5560.

Figure 29:
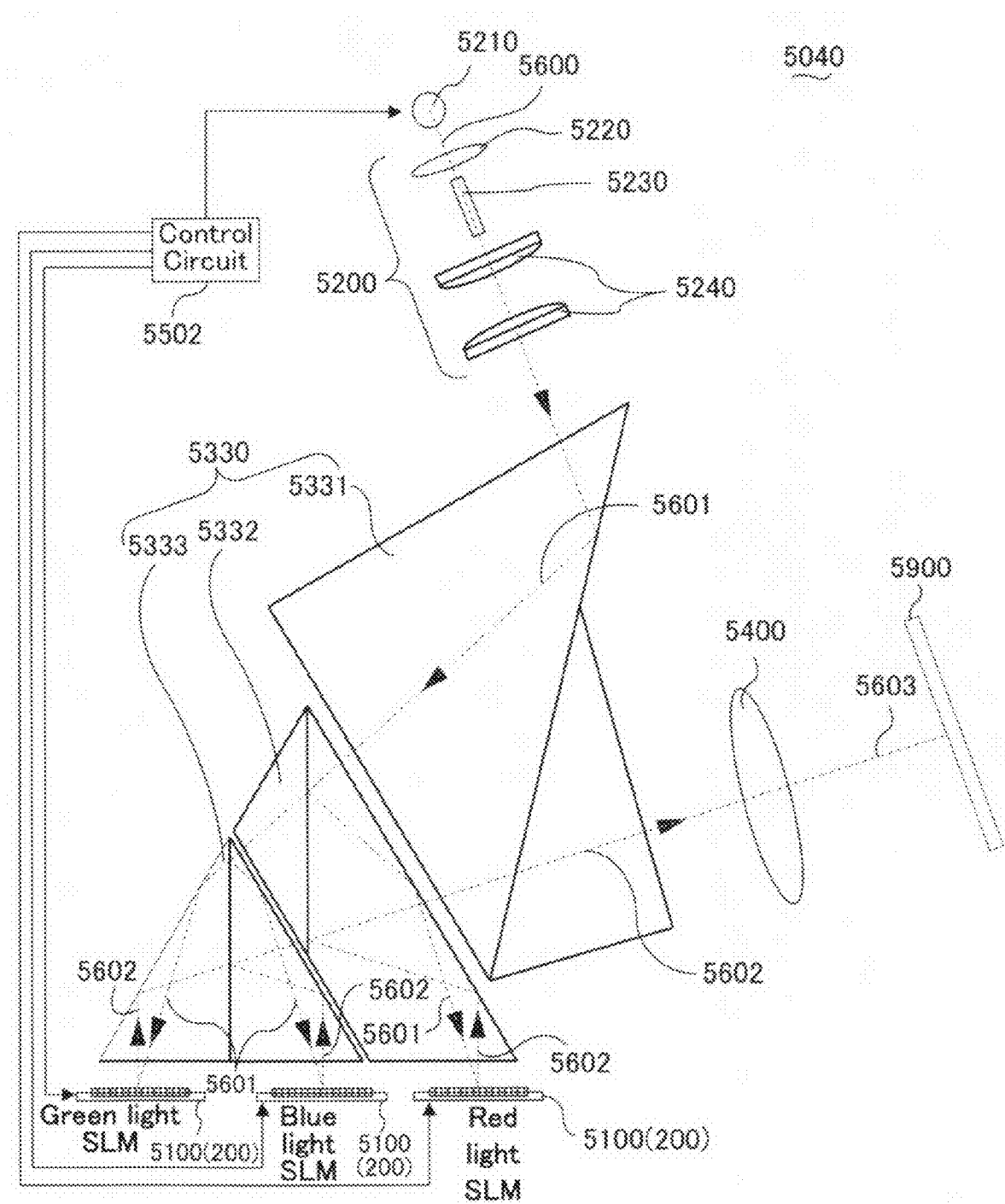
FIG. 29 is a conceptual diagram showing another possible modification of a multi-panel projection apparatus according to a preferred embodiment of the present invention.

FIG. 29 is a conceptual diagram showing another exemplary modification of a multi-panel projection apparatus according to the present embodiment.

The projection apparatus 5040 is configured so that multiple to place spatial light modulators 5100 (i.e., the spatial light modulator 200) corresponding to the three respective colors R, G and B, so as to be adjacent to one another in the same plane on one side of a light separation/synthesis optical system 5330.

This configuration makes it possible consolidate spatial light modulators 5100 into the same packaging unit, for example, a package 201 or the like, and thereby save space.

The light separation/synthesis optical system 5330 comprises a TIR prism 5331, a TIR prism 5332, and a TIR prism 5333.

TIR prism 5331 has guides to spatial light modulators 5100 illumination light 5600, incident in the lateral direction of the optical axis of projection optical system 5400, as incident light 5601.

TIR prism 5332 separates a red color light from the incident light 5601 and guides it to the red color-use spatial light modulator 5100, and also captures reflection light 5602 of the separated incident light and guides it to projection optical system 5400.

Likewise, TIR prism 5333 separates the incident lights of green and blue colors from incident light 5601, makes them incident to the individual spatial light modulators 5100, equipped correspondently to their respective colors, and captures reflection lights 5602 of the respective colors and guides them to projection optical system 5400.

Figure 30:
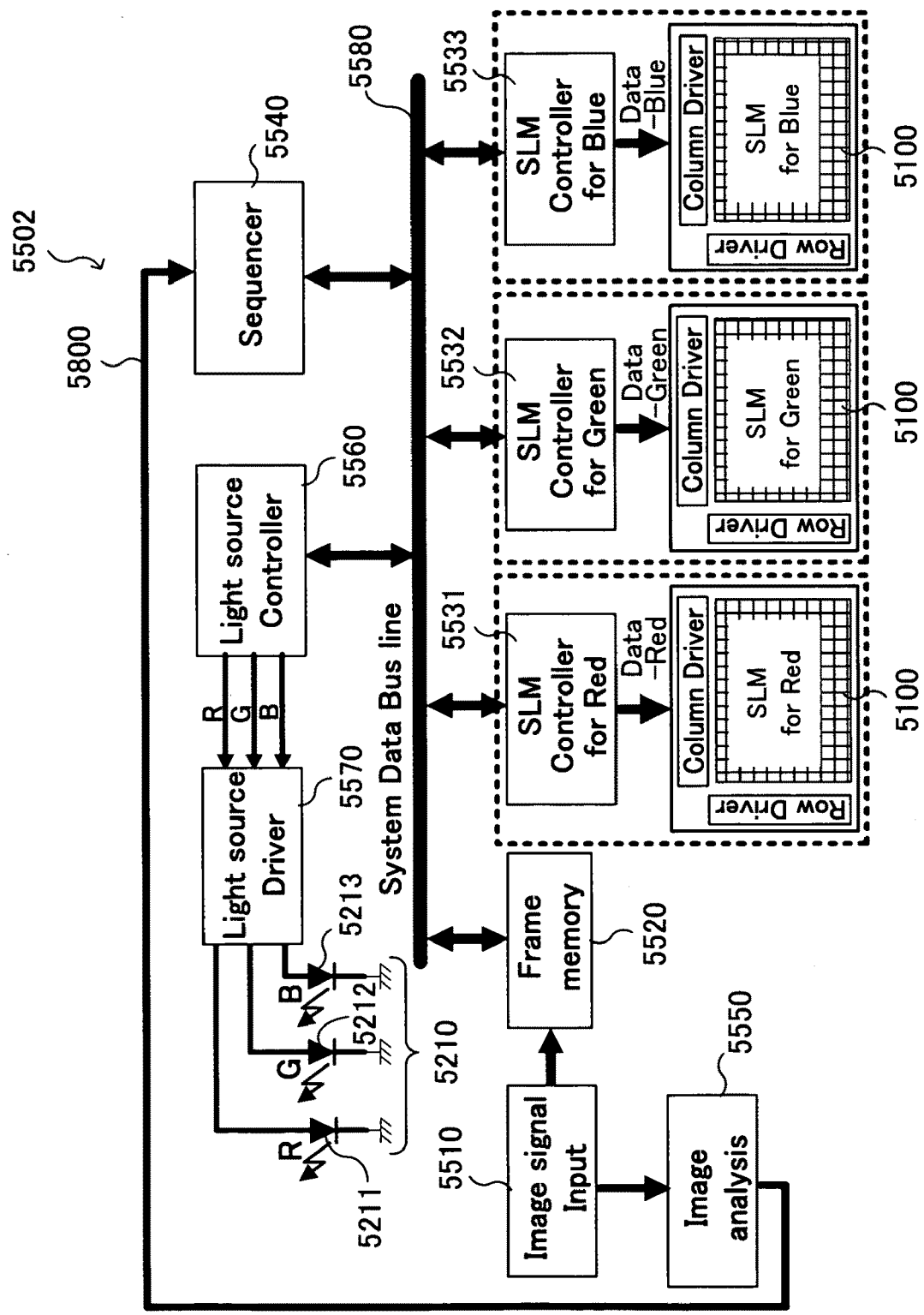
FIG. 30 is a block diagram showing a possible configuration of the control unit of a multi-panel projection apparatus according to a preferred embodiment of the present invention.

FIG. 30 is a block diagram showing an example configuration of the control unit of a multi-panel projection apparatus according to the present embodiment.

Control unit 5502 comprises SLM controllers 5531, 5532, and 5533, which are used for controlling each of the spatial light modulators 5100 equipped for the colors R, G and B. The comprisal of the controllers is different from the above described control unit 5500, which is otherwise similar.

That is, SLM controller 5531, SLM controller 5532, and SLM controller 5533 correspond to their respective color-use spatial light modulators 5100, which are formed on the same substrates as those of their respective spatial light modulators 5100 (i.e., the spatial light modulators 200). This configuration makes it possible to place the individual spatial light modulators 5100 and the respectively corresponding SLM controller 5531, SLM controller 5532, and SLM controller 5533 close to each other, thereby enabling a high speed data transfer rate.

Furthermore, a system bus 5580 is formed to connect to the frame memory 5520, light source control unit 5560, sequencer 5540, and SLM controllers 5531 through 5533, in order to speed up and simplify the connection path of each connecting element.

Figure 31:
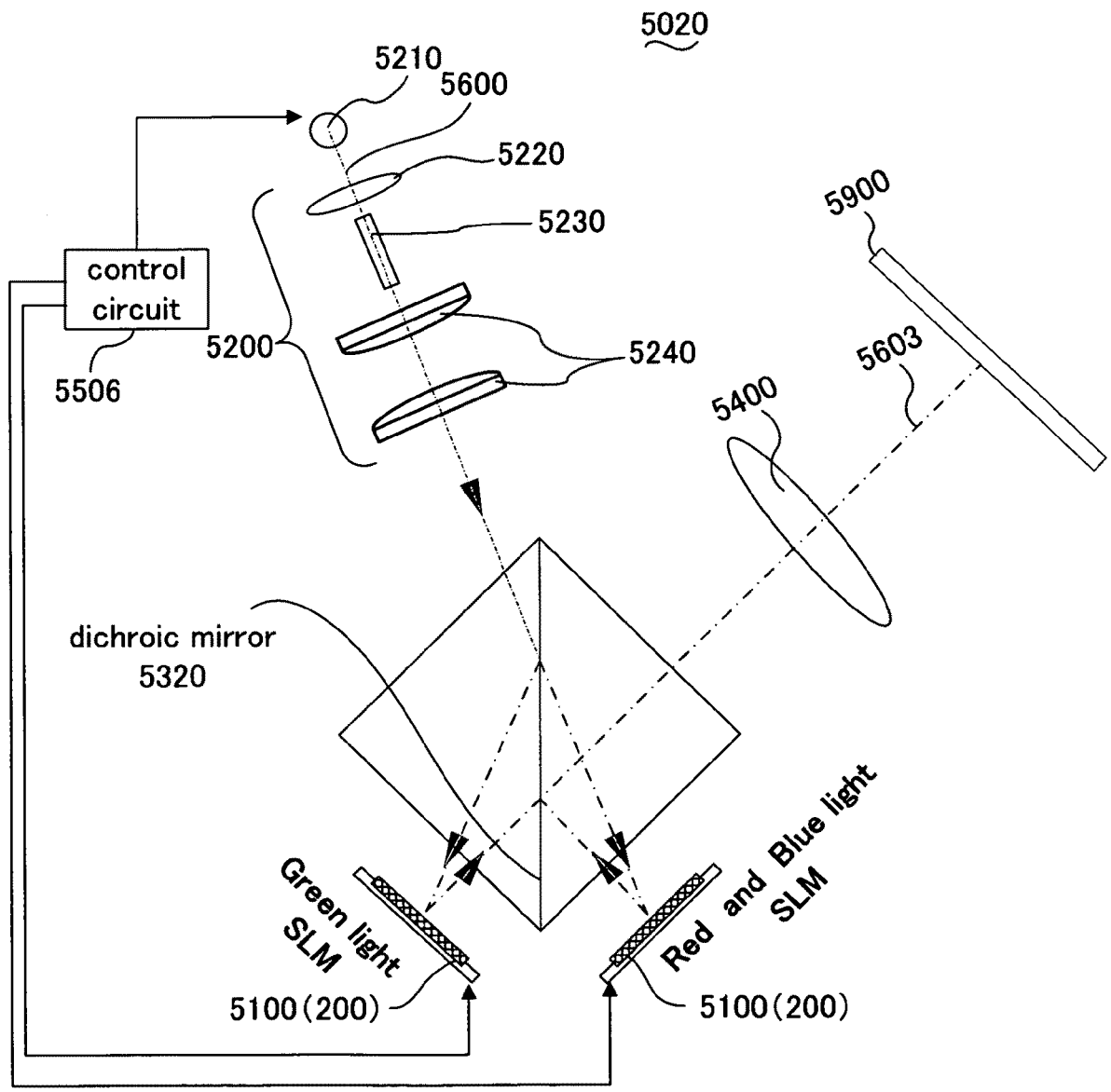
FIG. 31 is a conceptual diagram showing a possible modification of a multi-panel projection apparatus according to another preferred embodiment of the present invention.

FIG. 31 is a functional block diagram for showing an exemplary modification of a multi-panel projection apparatus according to another preferred embodiment of the present invention.

The projection apparatus 5020 shown in FIG. 31 is implemented with two spatial light modulators 5100 (i.e., the spatial light modulators 200), each of which comprises the above described plate line 232, wherein one spatial light modulator 200 modulates the green light while the other spatial light modulator 200 modulates the red and blue lights.

Specifically, projection apparatus 5020 comprises a dichroic mirror 5320 as a light separation/synthesis optical system.

Dichroic mirror 5320 separates the wavelength component of a green light and the wavelength components of red and blue lights from incidence light 5601, which is incident from light source optical system 5200, causing them to branch into two spatial light modulators 200, respectively, synthesizing reflection light 5602 of the green light reflected (i.e., modulated) by the corresponding spatial light modulator 200 with the reflection light of the red and blue light reflected (i.e., modulated) by the corresponding spatial light modulator 200 to guide the synthesized light to the optical axis of projection optical system 5400, and projecting the synthesized light onto a screen 5900 as projection light 5603.

Figure 32:
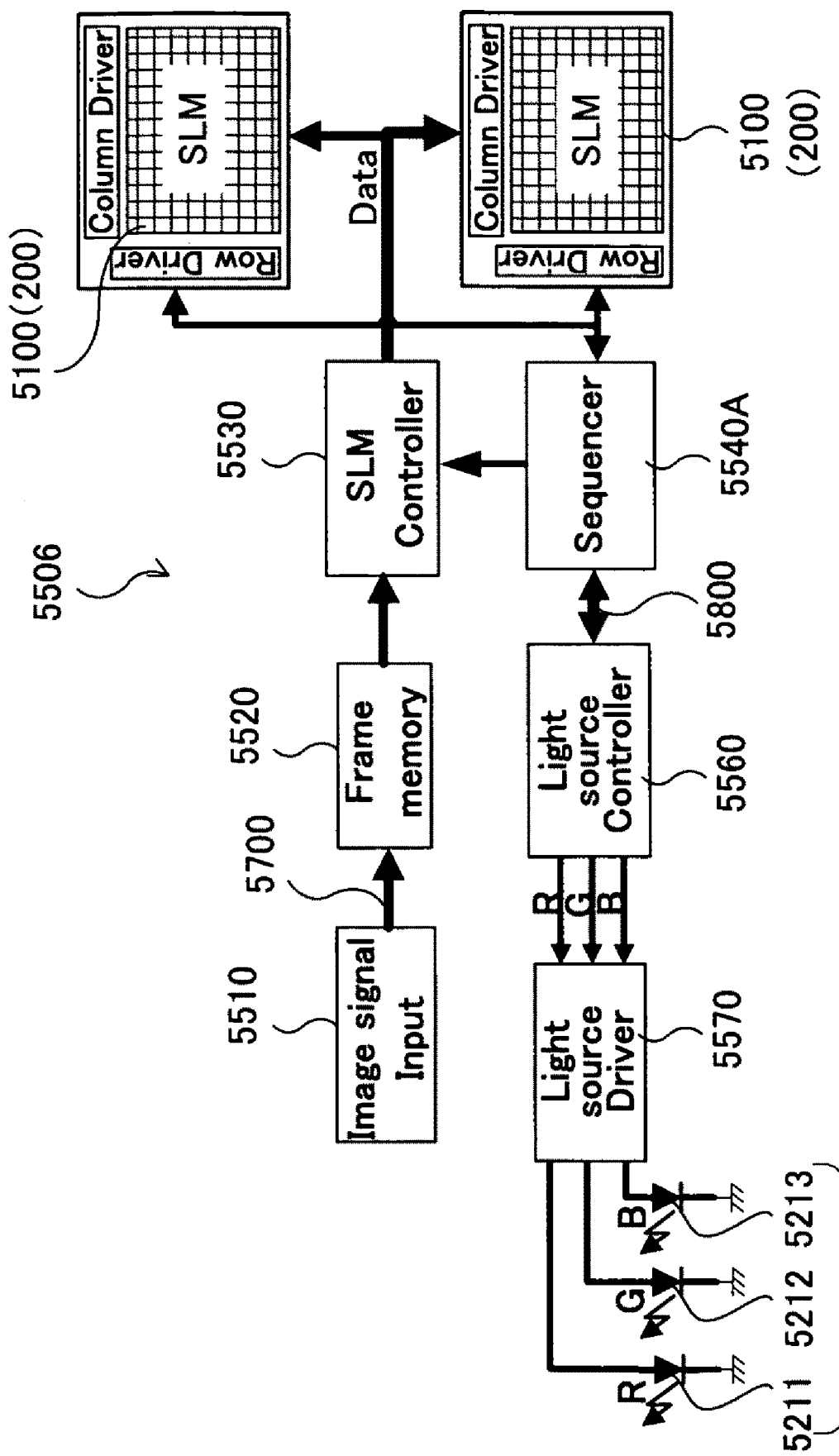
FIG. 32 is a block diagram showing a possible configuration of a control unit comprised in the projection apparatus shown in FIG. 31.

FIG. 32 is a block diagram for showing an example configuration of a control unit 5506 provided in projection apparatus 5020 comprising the above-described two spatial light modulators 200. In this case, SLM controller 5530 controls two spatial light modulators 5100 (i.e., the spatial light modulators 200), which is the only difference from the configuration shown in FIG. 28.

Figure 33:
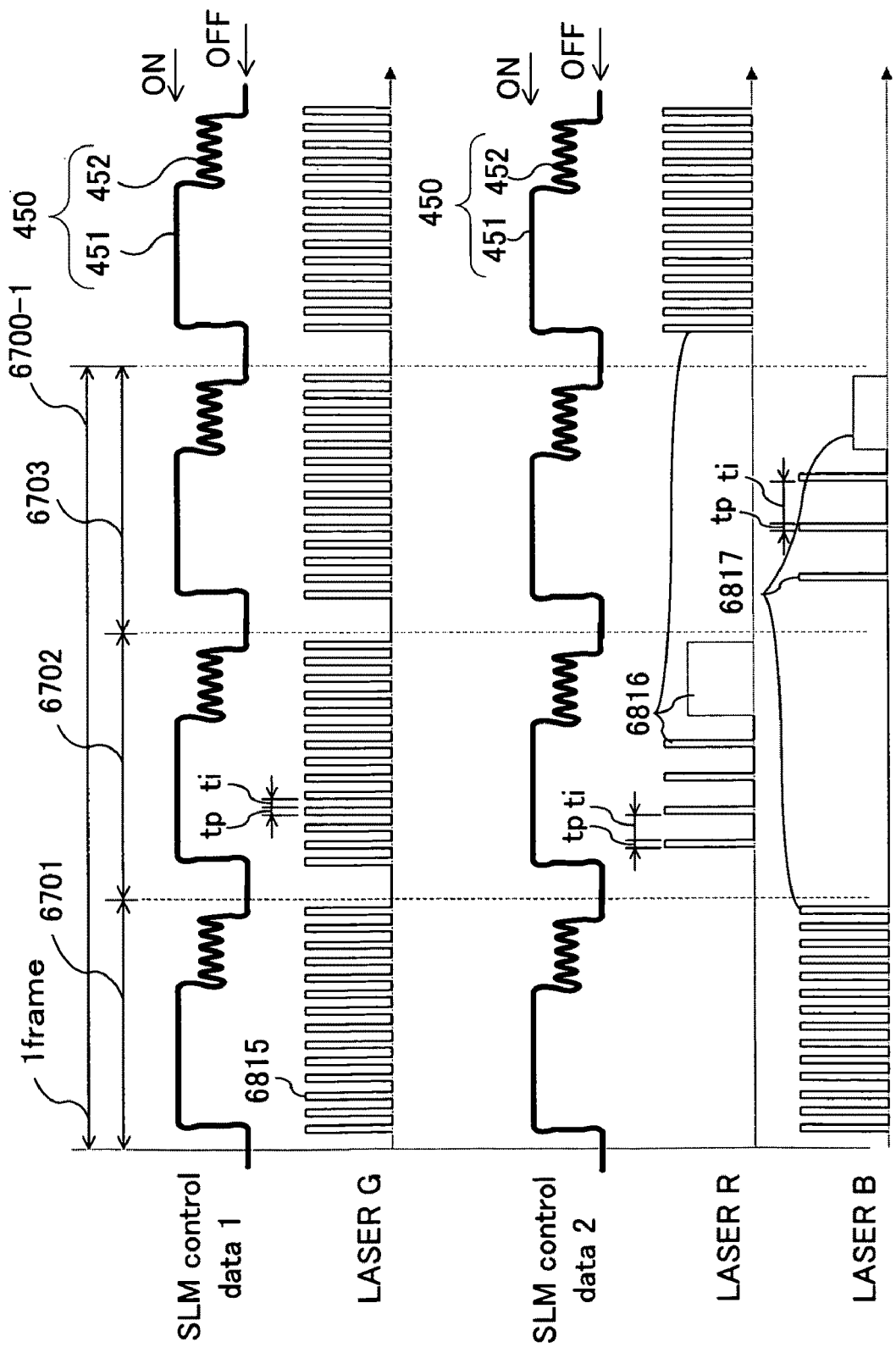
FIG. 33 is a chart showing the waveform of a control signal of the projection apparatus shown in FIG. 31.

FIG. 33 is a timing diagram for showing the waveform of a control signal of the projection apparatus according to the present embodiment.

A drive signal (i.e., a mirror control profile 450 shown in FIG. 33) generated by SLM controller 5530 drives multiple spatial light modulators 5100.

The light source control unit 5560 generates a light source profile control signal 5800 corresponding to mirror control profile 450, which is a signal for driving individual spatial light modulators 5100 for inputting the signal generated to light source drive circuit 5570, which then adjusts the intensity of the laser light (i.e., the illumination light 5600) emitted from the red laser light source 5211, the green laser light source 5212, and the blue laser light source 5213.

The control unit 5506 comprised in the projection apparatus 5020 is configured such that a single SLM controller 5530 drives the spatial light modulators 5100, thereby enabling the irradiation of illumination light 5600 on the respective spatial light modulators 5100 with the optimal quantity of light, without a requirement to configure the light source control unit 5560 or light source drive circuit 5570 for each spatial light modulator 5100. This configuration simplifies the circuit configuration of the control unit 5506.

As shown in FIG. 33, the light source control unit 5560 and light source drive circuit 5570 drives the red laser light source 5211, green laser light source 5212, and blue laser light source 5213 so as to adjust the intensities of individual lasers (i.e., illumination light 5600) of the colors R, G, and B synchronously with the irrespective SLM drive signals (i.e., the mirror control profile 450) generated by the SLM controller 5530.

In this case, two colors, R and B, share one spatial light modulator 5100, and therefore the control is a color sequential method.

That is, one frame includes multiple subfields, that include subfields 6701, 6702, and 6703, and the same light source pulse pattern 6815 is repeated in each subfield in one spatial light modulator 5100 corresponding to green (G).

Meanwhile, the pulse emission of the red laser light source 5211 and blue laser light source 5213 for the red (R) and blue (B) lights that share one spatial light modulator 5100 are separately controlled. Therefore, the subfields that include subfields 6701 through 6703 are alternately applied in a time series as the light source pulse pattern 6816 and light source pulse pattern 6817.

Furthermore, with the light source as described, the emission pulse intervals ti and emission pulse widths tp can be changed in the light source pulse pattern 6815 of the green laser, the light source pulse pattern 6816 of the red laser, and the light source pulse pattern 6817 of the blue laser.

Therefore, the present embodiment can improve the levels of the gray scale for each of the R, G, and B colors.

According to above descriptions, the present invention discloses a system configuration and method for increasing the definition of the projection image while improving the levels of the gray scale for an image projection system implemented with a spatial light modulator.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A spatial light modulator, comprising:
a plurality of pixel units configured as a pixel array; each of the pixel units further comprises a memory circuit; a bit line for transmitting a data signal to the memory circuit; a word line for selecting and writing the data signal to the selected memory circuit; a plate line for controlling the memory circuit; and a plate line address decoder for selecting the plate line for selectively enabling the memory circuit to receive the data signal transmitted from the bit line, wherein the address decoder comprises a plurality of first judgment units and a plurality of second judgment units for generating an output from the second judgment units depending on a result generated by the first judgment units in decoding and selecting the plate line in transmitting the data signal to the memory circuit through the bit line and selected by the word line.

2. The spatial light modulator according to claim 1, wherein:
the plate line address decoder comprises more or the same number of said first judgment units than said plate lines.

3. The spatial light modulator according to claim 1, wherein:
the plate line address decoder further comprise a plurality of third judgment units for generating an output from the third judgment units depending on a result generated by the second judgment units.

4. A spatial light modulator, comprising:
a plurality of pixel units configured as a pixel array; each of the pixel units comprises a memory circuit ; a bit line for transmitting a data signal to the memory circuit; a word line for selecting and writing the data signal to the selected memory circuit; and a word line address decoder for selecting the word line, wherein the word line address decoder comprises a plurality of first judgment units, each comprises an EXOR (exclusive-or) logic circuit, and plurality of second judgment units, each comprises an NOR (not-or) logic circuit for generating an output from the second judgment units depending on a result generated by the first judgment units.

5. The spatial light modulator according to claim 4, wherein:
the word line address decoder comprises more or the same number of said first judgment units than said word lines.

6. The spatial light modulator according to claim 4, wherein the word line address decoder further comprise a plurality of third judgment units, each comprises an OR logic circuit, for generating an output from the third judgment units depending on a result generated by the second judgment units.

7. A spatial light modulator, comprising:
a plurality of pixel units configured as a pixel array; each of the pixel units comprises a memory circuit ; a bit line for transmitting a data signal to the memory circuit; a word line for controlling the memory circuit; and a word line address decoder, wherein the word line address decoder comprises a plurality of first, second and third digital circuits implemented with a plurality of EXOR (exclusive-or) logic circuits, a plurality of NOR (not-or) logic circuits and a plurality of OR logic circuits for selecting or resetting a word line.

* * * * *